US012621670B2

(12) United States Patent
Lee et al.

(10) Patent No.: US 12,621,670 B2
(45) Date of Patent: May 5, 2026

(54) ELECTRONIC DEVICE AND METHOD FOR OPERATING ELECTRONIC DEVICE

(71) Applicant: Samsung Electronics Co., Ltd., Gyeonggi-do (KR)

(72) Inventors: Bona Lee, Suwon-si (KR); Eunjung Huh, Suwon-si (KR); Jonghyun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 18/326,276

(22) Filed: May 31, 2023

(65) Prior Publication Data

US 2023/0308880 A1 Sep. 28, 2023

Related U.S. Application Data

(63) Continuation of application No. PCT/KR2021/017331, filed on Nov. 24, 2021.

(30) Foreign Application Priority Data

Dec. 3, 2020 (KR) ........................ 10-2020-0167648

(51) Int. Cl.
*G06F 3/048* (2013.01)
*H04W 12/45* (2021.01)
*H04W 12/72* (2021.01)

(52) U.S. Cl.
CPC ........... *H04W 12/45* (2021.01); *H04W 12/72* (2021.01)

(58) Field of Classification Search
CPC ........ G06F 3/0481; G06F 3/0484; G06F 1/16; H04B 1/3816; H04W 12/72; H04W 12/45;

(Continued)

(56) References Cited

U.S. PATENT DOCUMENTS 7,970,434 B2 6/2011 Juang
8,738,101 B1 5/2014 Myr
(Continued)

FOREIGN PATENT DOCUMENTS

CN 102461326 A * 5/2012 ........... H04W 88/06
CN 203278901 U 11/2013
(Continued)

OTHER PUBLICATIONS

Ro_ et_al._WO2018034427, WO2018034427—Method and Apparatus for Performing Display in Electronic Device, Feb. 22, 2018, Patent Cooperation Treaty (PCT)—WIPO, 36 pages. (Year: 2018).*
(Continued)

*Primary Examiner* — Linh K Pham
(74) *Attorney, Agent, or Firm* — NIXON & VANDERHYE P.C.

(57) ABSTRACT

An electronic device may include: a first subscriber identity module (SIM); a second SIM; a flexible display having at least a portion which can be folded or unfolded, and including an area corresponding to the first SIM and an area corresponding to the second SIM; a communication circuit; a memory; and a processor operatively coupled, directly or indirectly, to the first SIM, the second SIM, the flexible display, the communication circuit, and the memory. The processor(s) may be configured to: receive, through the communication circuit, a notification related to the first SIM from the outside; provide the notification related to the first SIM to a designated area on the basis of a state of the flexible display when at least a portion of the area corresponding to the first SIM in the flexible display is in a folded state; and display an execution screen of an application corresponding to the notification related to the first SIM on the flexible display when the area corresponding to the first SIM is (Continued)

changed to an unfolded state while the notification related to the first SIM is provided.

19 Claims, 43 Drawing Sheets

(58) Field of Classification Search
CPC .............. H04W 8/18; H04M 1/72403; H04M 1/72466; G06K 7/00
See application file for complete search history.

(56) References Cited

U.S. PATENT DOCUMENTS

| | | | | |
|---|---|---|---|---|
| 10,021,544 | B2 | 7/2018 | Shi et al. | |
| 10,082,996 | B2 | 9/2018 | Jung | |
| 10,159,017 | B2 * | 12/2018 | Wang .................... | H04M 19/04 |
| 10,433,438 | B2 | 10/2019 | Moon et al. | |
| 10,514,879 | B2 | 12/2019 | Jung | |
| 10,945,346 | B2 | 3/2021 | Moon et al. | |
| 11,012,850 | B1 * | 5/2021 | Zhu ....................... | H04W 4/021 |
| 11,372,446 | B2 | 6/2022 | Wi et al. | |
| 11,385,734 | B2 | 7/2022 | Gupta et al. | |
| 11,460,882 | B2 | 10/2022 | Ro et al. | |
| 11,495,651 | B2 | 11/2022 | Qiu et al. | |
| 12,273,958 | B2 * | 4/2025 | Li ......................... | H04W 8/183 |
| 2012/0129495 | A1 * | 5/2012 | Chae ..................... | G06F 3/0486 |
| | | | | 345/173 |
| 2012/0149372 | A1 * | 6/2012 | Lee ....................... | H04W 4/029 |
| | | | | 455/435.1 |
| 2013/0225239 | A1 * | 8/2013 | Wu ....................... | H04W 88/06 |
| | | | | 455/558 |
| 2015/0116218 | A1 * | 4/2015 | Yang ..................... | G06F 3/0486 |
| | | | | 345/158 |
| 2016/0224304 | A1 * | 8/2016 | Hong ..................... | G06T 1/20 |
| 2017/0359762 | A1 * | 12/2017 | Yoo ....................... | H04W 76/10 |
| 2018/0046832 | A1 * | 2/2018 | Lee ....................... | G06F 3/0632 |
| 2018/0077152 | A1 * | 3/2018 | Lipovkov ........... | H04L 63/0853 |
| 2018/0375541 | A1 | 12/2018 | Yoo et al. | |
| 2019/0042066 | A1 * | 2/2019 | Kim ....................... | H04M 1/725 |
| 2020/0245128 | A1 * | 7/2020 | Obaidi .................. | H04W 8/183 |
| 2020/0333835 | A1 * | 10/2020 | Wi ........................... | G09G 5/38 |
| 2021/0089081 | A1 * | 3/2021 | Ro ......................... | G06F 3/0487 |
| 2021/0200494 | A1 * | 7/2021 | Zhu .................. | H04M 1/72469 |
| 2021/0327989 | A1 * | 10/2021 | Qiu ........................ | H01L 25/18 |
| 2022/0330007 | A1 * | 10/2022 | Li ......................... | H04W 8/183 |
| 2023/0188172 | A1 * | 6/2023 | Han ....................... | H04W 8/183 |

FOREIGN PATENT DOCUMENTS

| | | | | | |
|---|---|---|---|---|---|
| CN | 104184899 | A | | 12/2014 | |
| CN | 105072257 | A | | 11/2015 | |
| CN | 102480313 | B | * | 8/2016 | |
| CN | 107613058 | A | | 1/2018 | |
| CN | 109144394 | A | * | 1/2019 | |
| CN | 110167006 | | | 8/2019 | |
| CN | 110621013 | A | * | 12/2019 | ............. H04W 8/24 |
| KR | 100498331 | B1 | | 7/2005 | |
| KR | 20160103599 | A | | 9/2016 | |
| KR | 20170088563 | A | | 8/2017 | |
| KR | 20180020737 | A | | 2/2018 | |
| KR | 20200014878 | A | | 2/2020 | |
| KR | 20200052679 | A | * | 5/2020 | ........ H04M 1/72519 |
| KR | 20200066602 | A | | 6/2020 | |
| KR | 20200122076 | A | | 10/2020 | |
| WO | 2018052192 | A1 | | 3/2018 | |

OTHER PUBLICATIONS

Office Action for KR Application No. 10-2020-0167648 dated Apr. 30, 2025 and English translation, 14 pages.

* cited by examiner

730

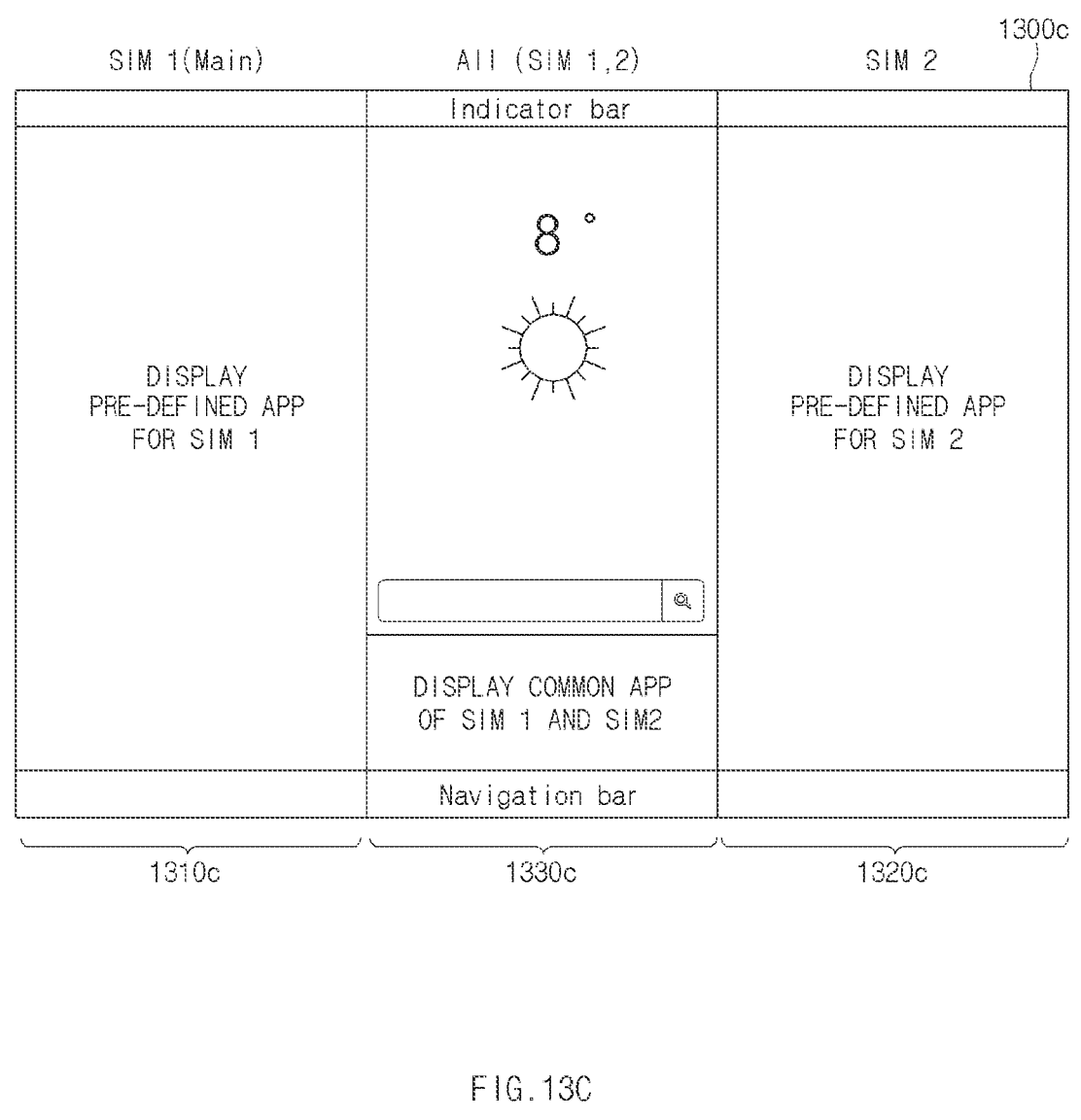

1300c

SIM 1(Main)          All (SIM 1,2)          SIM 2

Indicator bar

8°

DISPLAY
PRE-DEFINED APP
FOR SIM 1

DISPLAY
PRE-DEFINED APP
FOR SIM 2

DISPLAY COMMON APP
OF SIM 1 AND SIM2

Navigation bar 1310c          1330c          1320c

FIG.13C

Figure 13D:
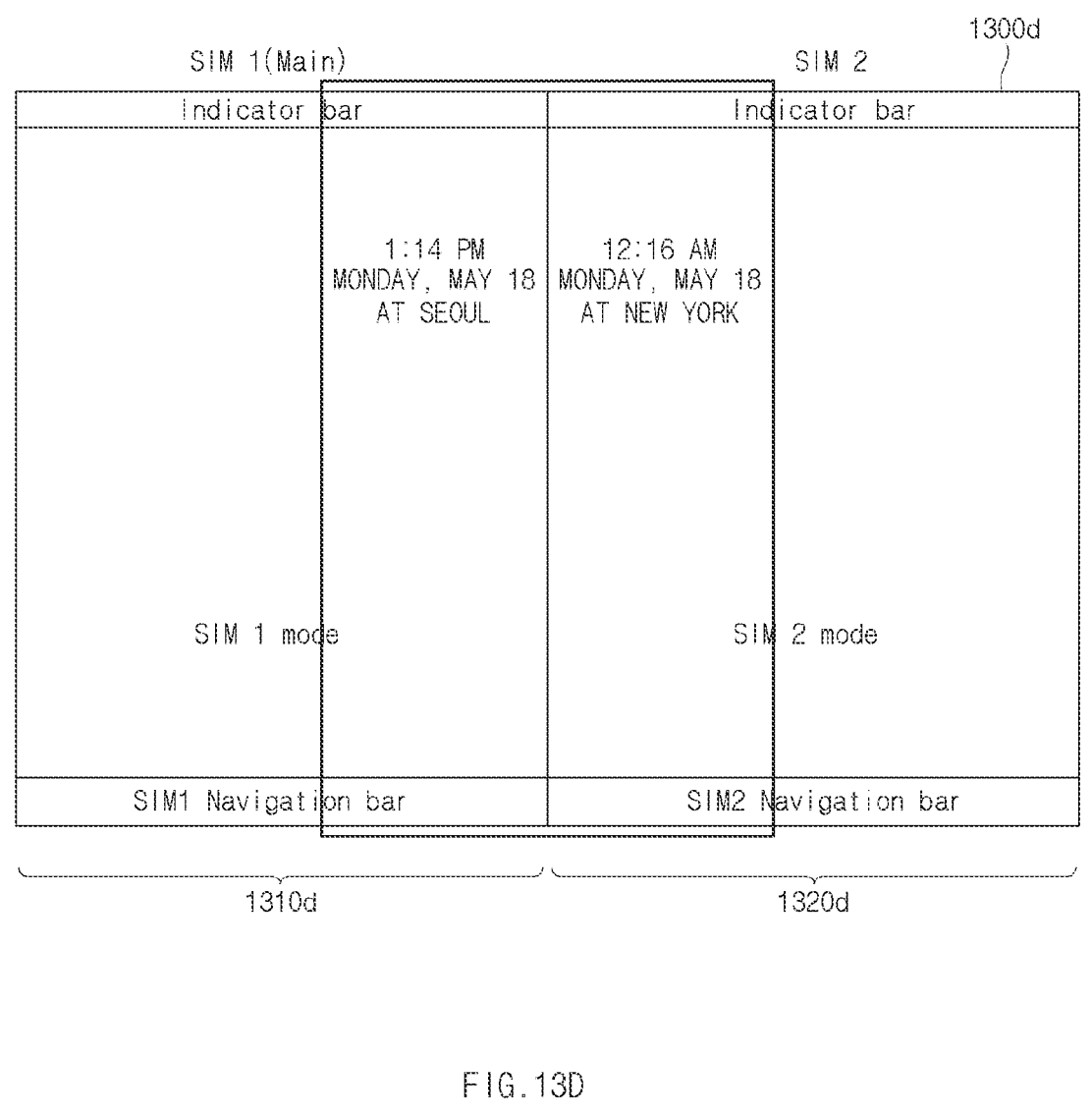

SIM 1(Main)                                              SIM 2                    1300d

| Indicator bar | Indicator bar |
|---|---|
|  |  |

1:14 PM          12:16 AM
MONDAY, MAY 18   MONDAY, MAY 18
AT SEOUL          AT NEW YORK

SIM 1 mode                         SIM 2 mode

| SIM1 Navigation bar | SIM2 Navigation bar |
|---|---|

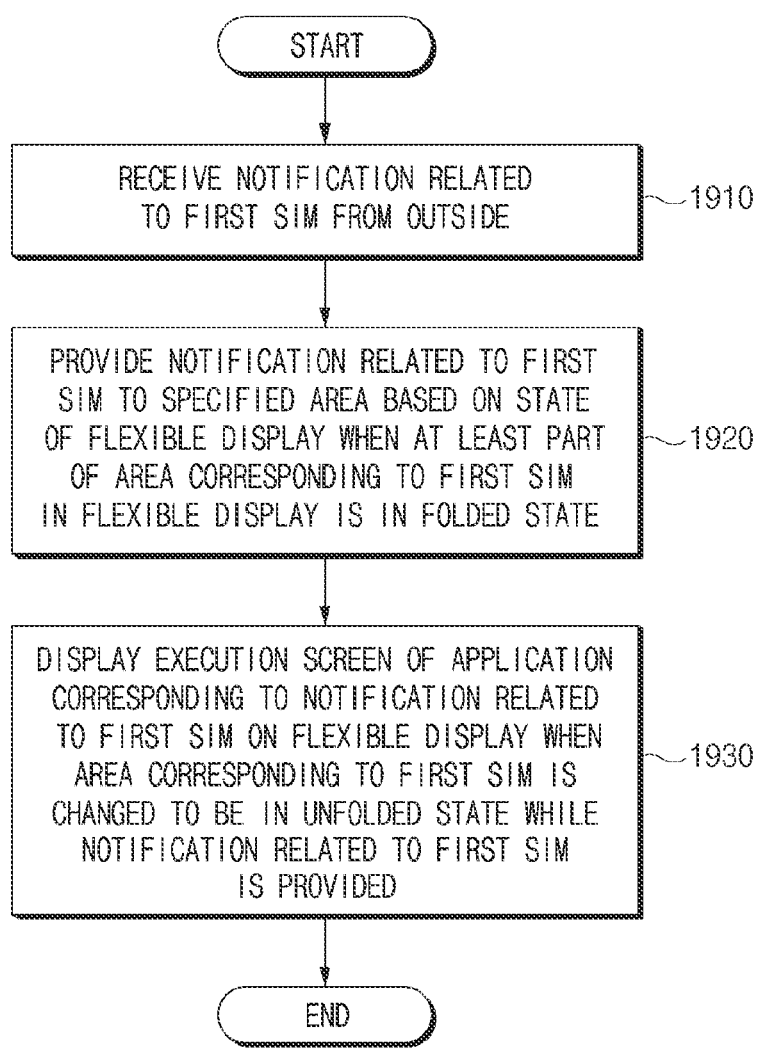

START

RECEIVE NOTIFICATION RELATED
TO FIRST SIM FROM OUTSIDE ~1910

PROVIDE NOTIFICATION RELATED TO FIRST
SIM TO SPECIFIED AREA BASED ON STATE
OF FLEXIBLE DISPLAY WHEN AT LEAST PART ~1920
OF AREA CORRESPONDING TO FIRST SIM
IN FLEXIBLE DISPLAY IS IN FOLDED STATE

DISPLAY EXECUTION SCREEN OF APPLICATION
CORRESPONDING TO NOTIFICATION RELATED
TO FIRST SIM ON FLEXIBLE DISPLAY WHEN
AREA CORRESPONDING TO FIRST SIM IS ~1930
CHANGED TO BE IN UNFOLDED STATE WHILE
NOTIFICATION RELATED TO FIRST SIM
IS PROVIDED

END

FIG.19

START

DISPLAY EXECUTION SCREEN OF APPLICATION RELATED
TO FIRST SIM ON FLEXIBLE DISPLAY WHILE AT LEAST PART
OF AREA CORRESPONDING TO SECOND SIM IS FOLDED                    ~2110

DISPLAY HOME SCREEN IN UNFOLDED AREA CORRESPONDING
TO SECOND SIM WHEN AT LEAST PART OF AREA CORRESPONDING
TO SECOND SIM CHANGES FROM FOLDED STATE TO UNFOLDED STATE        ~2120

END

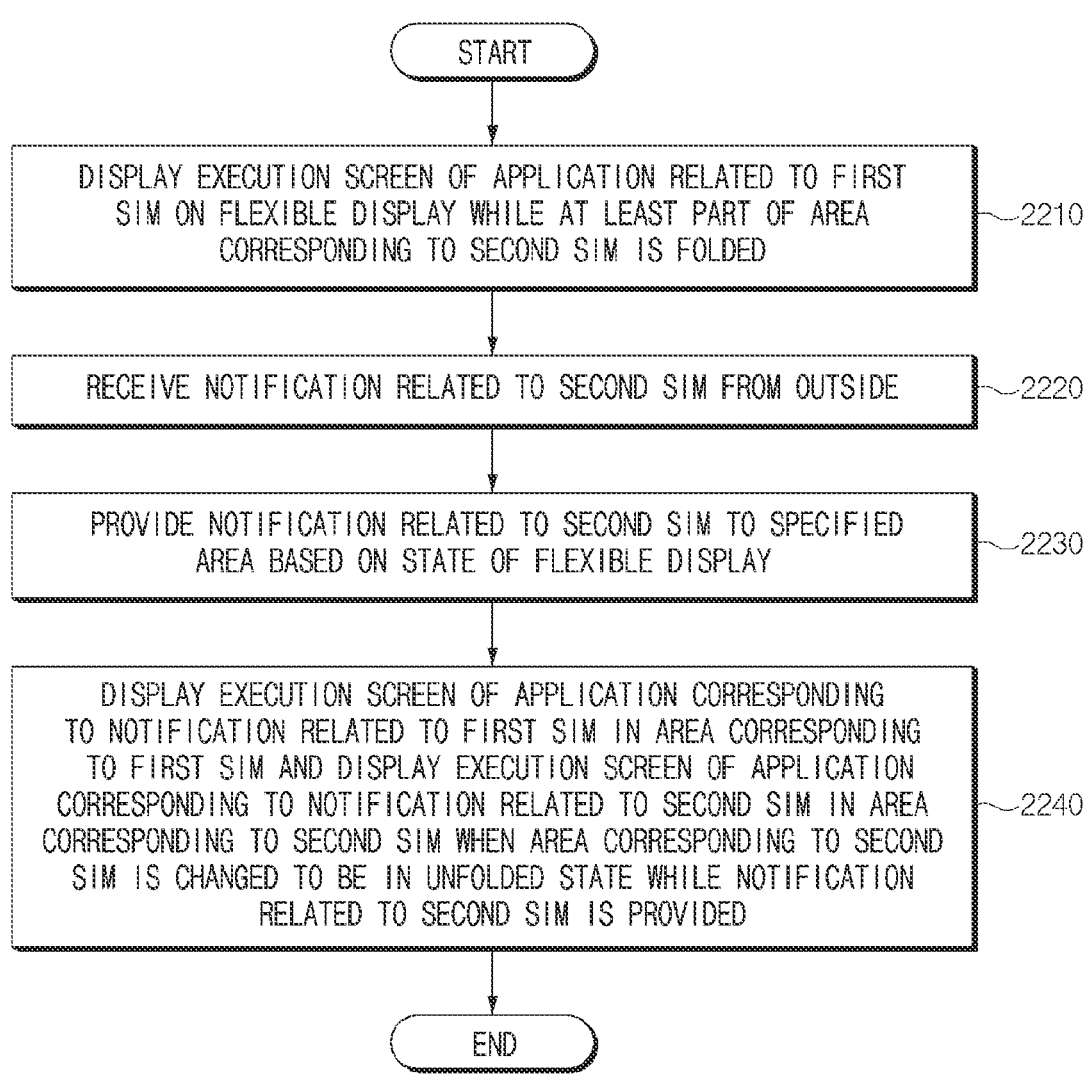

START

DISPLAY EXECUTION SCREEN OF APPLICATION RELATED TO FIRST SIM ON FLEXIBLE DISPLAY WHILE AT LEAST PART OF AREA CORRESPONDING TO SECOND SIM IS FOLDED ~2210

RECEIVE NOTIFICATION RELATED TO SECOND SIM FROM OUTSIDE ~2220

PROVIDE NOTIFICATION RELATED TO SECOND SIM TO SPECIFIED AREA BASED ON STATE OF FLEXIBLE DISPLAY ~2230

DISPLAY EXECUTION SCREEN OF APPLICATION CORRESPONDING TO NOTIFICATION RELATED TO FIRST SIM IN AREA CORRESPONDING TO FIRST SIM AND DISPLAY EXECUTION SCREEN OF APPLICATION CORRESPONDING TO NOTIFICATION RELATED TO SECOND SIM IN AREA CORRESPONDING TO SECOND SIM WHEN AREA CORRESPONDING TO SECOND SIM IS CHANGED TO BE IN UNFOLDED STATE WHILE NOTIFICATION RELATED TO SECOND SIM IS PROVIDED ~2240

END

FIG.22

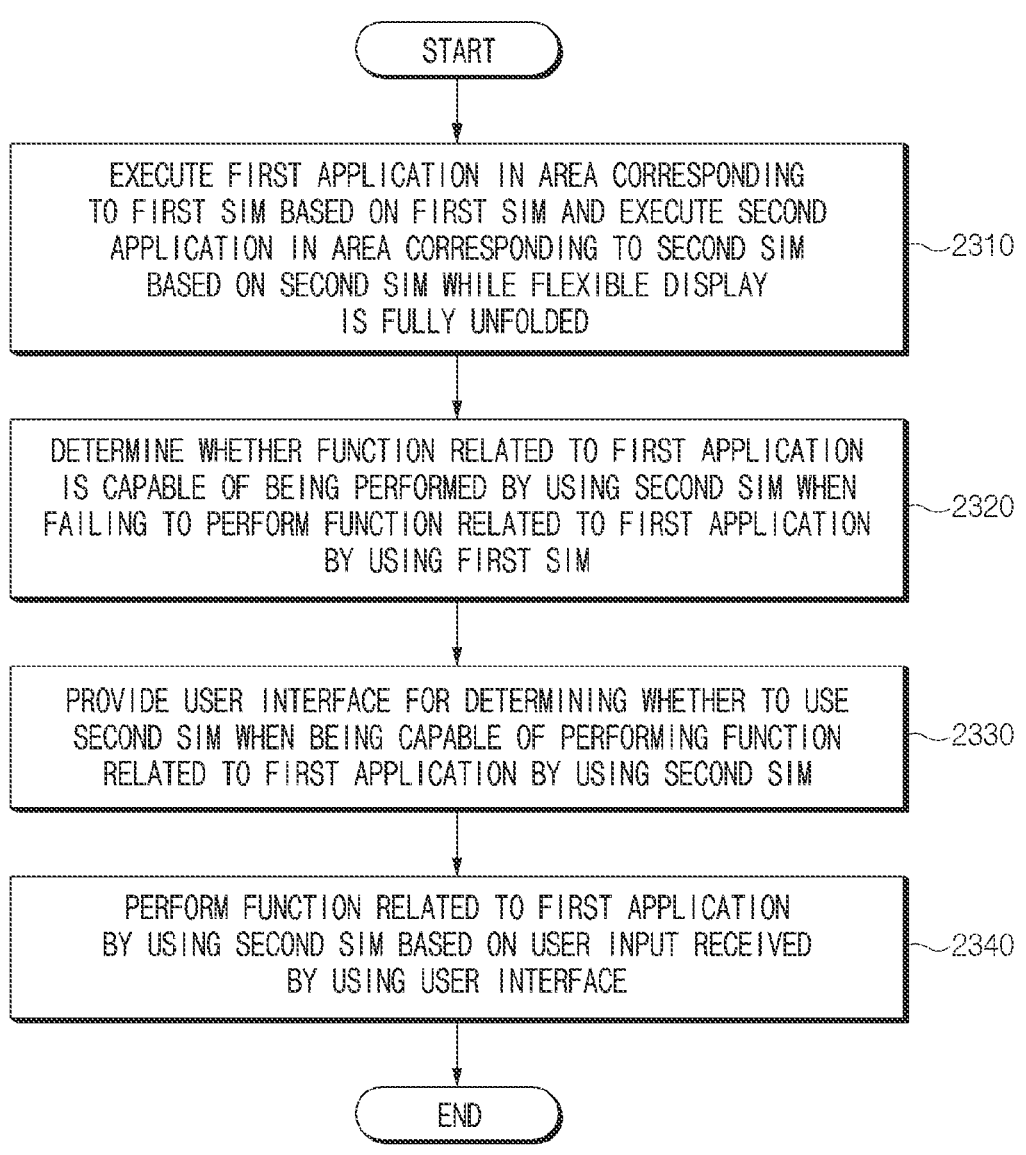

START

EXECUTE FIRST APPLICATION IN AREA CORRESPONDING
TO FIRST SIM BASED ON FIRST SIM AND EXECUTE SECOND
APPLICATION IN AREA CORRESPONDING TO SECOND SIM
BASED ON SECOND SIM WHILE FLEXIBLE DISPLAY
IS FULLY UNFOLDED — 2310

DETERMINE WHETHER FUNCTION RELATED TO FIRST APPLICATION
IS CAPABLE OF BEING PERFORMED BY USING SECOND SIM WHEN
FAILING TO PERFORM FUNCTION RELATED TO FIRST APPLICATION
BY USING FIRST SIM — 2320

PROVIDE USER INTERFACE FOR DETERMINING WHETHER TO USE
SECOND SIM WHEN BEING CAPABLE OF PERFORMING FUNCTION
RELATED TO FIRST APPLICATION BY USING SECOND SIM — 2330

PERFORM FUNCTION RELATED TO FIRST APPLICATION
BY USING SECOND SIM BASED ON USER INPUT RECEIVED
BY USING USER INTERFACE — 2340

END

FIG.23

ELECTRONIC DEVICE AND METHOD FOR OPERATING ELECTRONIC DEVICE

CROSS-REFERENCE TO RELATED APPLICATIONS

This application is a continuation of International Application No. PCT/KR2021/017331, filed on Nov. 24, 2021, designating the United States, in the Korean Intellectual Property Receiving Office, and claiming priority to KR 10-2020-0167648 filed on Dec. 3, 2020, the disclosures of which are all hereby incorporated by reference herein in their entireties.

BACKGROUND

Field

Certain example embodiments relate to an electronic device capable of using a plurality of SIMs and/or an operating method of the electronic device.

Description of Related Art

Nowadays, various types of electronic devices are being developed and supplied. In particular, as well as the conventional desktop PC, the distribution of mobile devices having various functions such as smartphones, tablet PCs, and wearable devices is expanding. Moreover, with the development of technology, not only electronic devices having fixed displays but also electronic devices including flexible displays capable of being physically bent or folded have been developed and spread. Furthermore, an electronic device may provide various functions suitable for a user by using a unique subscriber identity module (SIM) for each user.

Conventionally, it is difficult for a user to easily identify information corresponding to each SIM in an electronic device including a plurality of SIMs.

SUMMARY

Various example embodiments may provide information corresponding to each of a plurality of SIMs, and may provide an electronic device capable of efficiently and easily providing a function or user interface related to each SIM, and an operating method of the electronic device.

Various example embodiments may provide an electronic device capable of efficiently managing a user interface and an area of a display corresponding to a plurality of SIMs.

According to an example embodiment, an electronic device may include a first subscriber identity module (SIM), a second SIM, a flexible display, of which at least part is capable of being folded or unfolded and which includes an area corresponding to a first SIM and an area corresponding to a second SIM, a communication circuit, a memory, and a processor operatively connected, directly or indirectly, to the first SIM, the second SIM, the flexible display, the communication circuit, and the memory. The memory may store instructions that, when executed, may cause the processor to receive a notification related to the first SIM from an outside through the communication circuit, to provide the notification related to the first SIM in a specified area based on a state of the flexible display when at least part of the area corresponding to the first SIM is folded in the flexible display, and to display an execution screen of an application corresponding to the notification related to the first SIM on the flexible display when the area corresponding to the first SIM is changed to be unfolded while the notification related to the first SIM is provided.

Moreover, according to an example embodiment, an operating method of an electronic device including a flexible display, of which at least part is capable of being folded or unfolded and which includes an area corresponding to a first SIM and an area corresponding to a second SIM may include receiving a notification related to the first SIM from an outside, providing a notification related to the first SIM in a specified area based on a state of the flexible display when at least part of the area corresponding to the first SIM is folded in the flexible display, and displaying an execution screen of an application corresponding to the notification related to the first SIM on the flexible display when the area corresponding to the first SIM is changed to be unfolded while the notification related to the first SIM is provided.

According to certain example embodiments, it is possible to provide information corresponding to each of a plurality of SIMs, and/or to provide a function or user interface related to each SIM.

According to certain example embodiments, it is possible to efficiently managing a user interface and an area of a display corresponding to a plurality of SIMs.

Besides, a variety of effects directly or indirectly understood through the specification may be provided.

BRIEF DESCRIPTION OF DRAWINGS

The above and other aspects, features, and advantages of certain example embodiments will be more apparent from the following detailed description, taken in conjunction with the accompanying drawings, in which:

FIGS. 13A to 13D illustrate examples of a screen displayed on a display according to setting an area corresponding to a SIM in an electronic device, according to various example embodiments.

FIG. 19 is a flowchart of an operating method of an electronic device, according to an example embodiment.

FIG. 22 is a flowchart of an operating method of an electronic device, according to an example embodiment.

FIG. 23 is a flowchart of an operating method of an electronic device according to an example embodiment.

With regard to description of drawings, the same or similar components will be marked by the same or similar reference signs.

DETAILED DESCRIPTION

Figure 1:
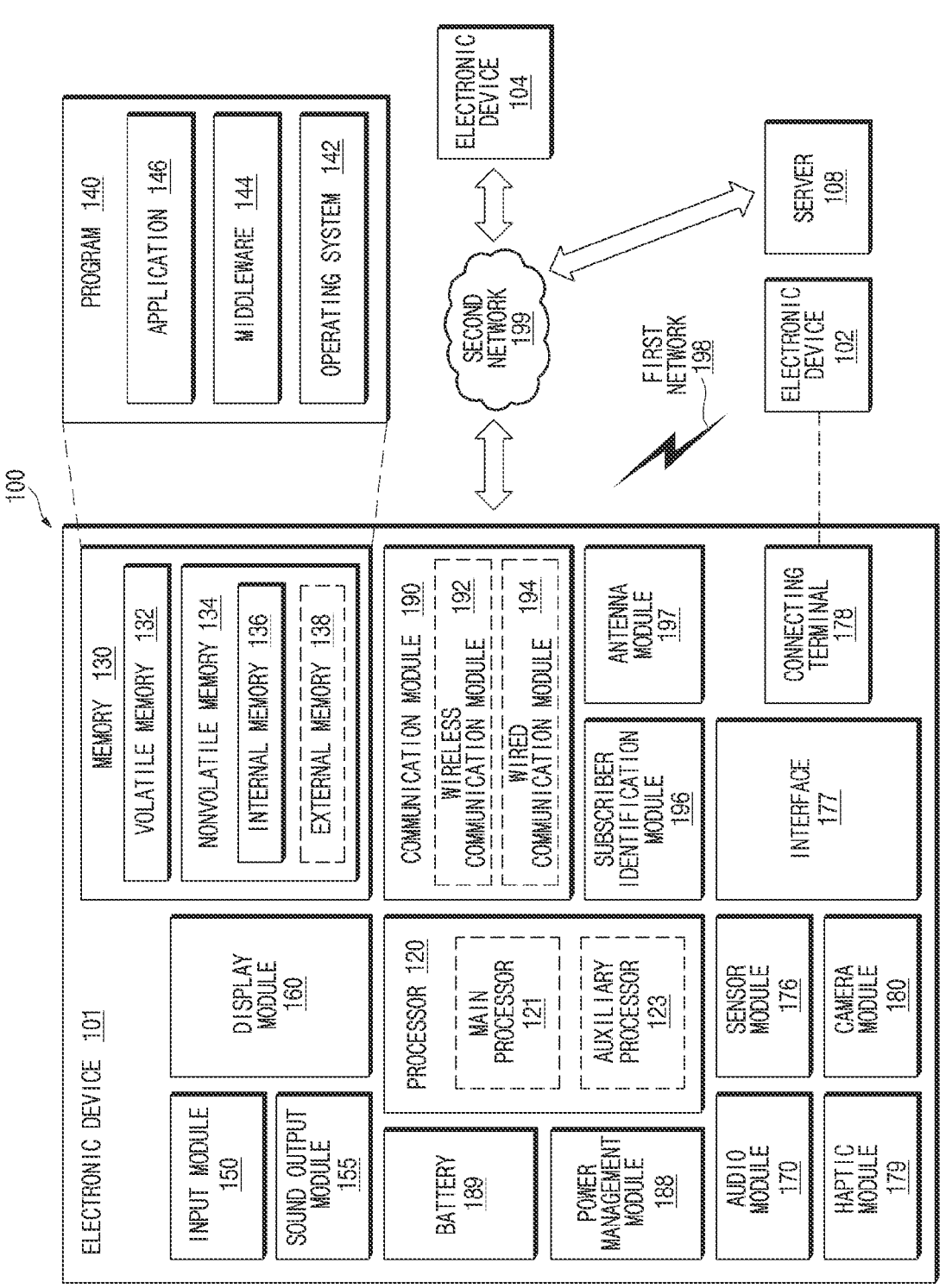
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to an embodiment, as at least part of the data processing or computation, the processor 120 may store a command or data received from another component (e.g., the sensor module 176 or the communication module 190)

in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device

104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
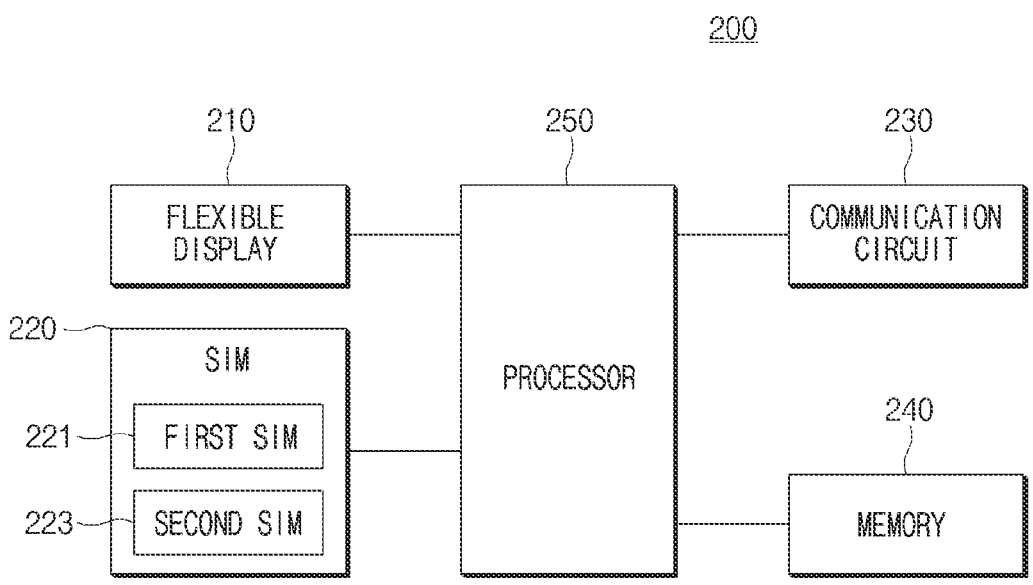
FIG. 2 is a block diagram of an electronic device, according to an example embodiment.

FIG. 2 is a block diagram of an electronic device, according to an embodiment.

According to an embodiment, an electronic device 200 (e.g., the electronic device 101 in FIG. 1) may include a flexible display 210 (e.g., the display module 160 in FIG. 1, comprising a display), a plurality of SIMs 220 (e.g., the SIM 196 in FIG. 1), a communication circuit 230 (e.g., the communication module 190 of FIG. 1, comprising communication circuitry), a memory 240 (e.g., the memory 130 of FIG. 1), and a processor 250 (e.g., the processor 120 of FIG. 1, comprising processing circuitry). Each SIM herein may comprise circuitry.

According to an embodiment, the flexible display 210 may visually provide information to the outside (e.g., a user) of the electronic device 200. According to various embodiments, the flexible display 210 may include at least one of a foldable display, a slideable display, and a rollable display. According to an embodiment, the flexible display 210 may have various form factors. For example, the form factor may indicate various forms of the flexible display 210. For example, each of a folded or unfolded form of a foldable display, an expanded or contracted form of a slideable display (e.g., an area of the slideable display exposed to the outside of the electronic device), or an expanded or contracted form of a rollable display (e.g., an area of the rollable display exposed to the outside of the electronic device) may become a form factor of a flexible display. For example, the expanded or contracted state of a slideable display or rollable display may indicate a state where the size of the display itself is not expanded or contracted, but an area of the display exposed to the outside of the electronic device (e.g., housing) is expanded or contracted. For example, the expanded or contracted state of a slideable display or rollable display may indicate a state where the area of the display covered by the housing of the electronic device is changed, rather than the size of the display itself being changed. For example, the contracted state may refer to a state where at least part of the slideable display or the rollable display is inserted into the housing of the electronic device and covered by the housing. For example, the expanded state may be a state in which at least part of the slideable display or rollable display covered by the housing is exposed to the outside of the housing.

According to an embodiment, the plurality of SIMs 220 may include a first SIM 221 and a second SIM 223. According to an embodiment, each of the plurality of SIMs 220 may be a SIM physically separated from (or detached from) the electronic device 200 or a SIM embedded in the electronic device 200. For example, the SIM embedded in the electronic device 200 may include an embedded-SIM (e-SIM) capable of being stored in the electronic device 200 (e.g., the memory 240). For example, the plurality of SIMs 220 embedded in the electronic device 200 may be the SIMs 220 identified in a software manner. According to an embodiment, each of the plurality of SIMs 220 may correspond to a different user, a different telecommunications service provider, and/or a different function (e.g., application).

According to an embodiment, the communication circuit 230 may establish a direct (or wired) communication channel or a wireless communication channel between the electronic device 200 and an external device (e.g., the electronic device 102, the electronic device 104, or the server 108 in FIG. 1) and may perform communication through the established communication channel. According to an embodiment, the communication circuit 230 may receive information (e.g., a notification) corresponding to each of the plurality of SIMs 220 from an external device.

According to an embodiment, the memory 240 may include instructions that, when executed by the processor 250, cause the processor 250 to control an operation of the electronic device 200. According to an embodiment, the memory 240 may include various pieces of information or data necessary for the operation or function of the electronic device 200.

According to an embodiment, the processor 250 may receive a notification related to the first SIM 221 from the outside. For example, the notification may include various types of information including phone calls, messages, and SNS.

According to an embodiment, while at least part of the area corresponding to the first SIM 221 is folded in the flexible display 210, the processor 250 may provide a notification related to the first SIM 221 to a specified area based on the state of the flexible display 210. According to an embodiment, the specified area may be an area formed along a folded portion of an area corresponding to the first SIM 221 in the flexible display 210. For example, the specified area may be an area adjacent to the folded area corresponding to the first SIM 221 while an area corresponding to the first SIM 221 is folded. For example, the specified area may include at least part of an edge area of the flexible display 210 in a state where an area corresponding to the first SIM 221 is folded.

According to an embodiment, when the processor 250 receives a specified user input (e.g., a touch input (e.g., swipe)) in the specified area within a specified time after the notification related to the first SIM 221 is provided, the processor 250 may change a provision form of the notification. For example, when the processor 250 receives a specified user input in the specified area within a specified time, the processor 250 may provide a notification in a form of a pop-up window.

According to an embodiment, while an area corresponding to the first SIM 221 is unfolded when the processor 250 receives a notification related to the first SIM 221, the processor 250 may output a pop-up window indicating the notification in the area corresponding to the first SIM 221. According to an embodiment, when the processor 250 receives a specified user input (e.g., a touch input) within a specified time after outputting the pop-up window, the processor 250 may display an execution screen of an application corresponding to the notification on the flexible display 210. For example, the processor 250 may execute the application corresponding to the notification and then may display the execution screen of the application in an area corresponding to the first SIM 221 of the flexible display 210. According to an embodiment, when the specified time elapses after the processor 250 outputs the pop-up window, the processor 250 may remove the pop-up window from the flexible display 210.

According to an embodiment, when the specified time elapses after the notification is provided, the processor 250 may remove the notification from the flexible display 210.

According to an embodiment, when the area corresponding to the first SIM 221 is changed to be in an unfolded state while the processor 250 is providing the notification related to the first SIM 221, the processor 250 may display the execution screen of the application corresponding to the notification related to the first SIM 221 on the flexible display 210. For example, when the area corresponding to the first SIM 221 is changed to be in the unfolded state, the processor 250 may display the execution screen of the application corresponding to the notification related to the first SIM 221 in at least one unfolded area corresponding to the first SIM 221. For example, the processor 250 may display the execution screen of the application corresponding to the notification related to the first SIM 221 in at least part of the flexible display 210 having a state where an area corresponding to the first SIM 221 is unfolded. For example, when the flexible display 210 includes an area corresponding to the first SIM 221, an area corresponding to the second SIM 223, and a common use area, the processor 250 may display the execution screen of the application corresponding to the notification related to the first SIM 221 in the area corresponding to the first SIM 221 and the common use area.

According to an embodiment, while at least part of the area corresponding to the second SIM 223 is folded, the processor 250 may display the execution screen of the application (e.g., the application corresponding to the notification related to the first SIM 221) related to the first SIM 221 on the flexible display 210. For example, while the area corresponding to the first SIM 221 is expanded, and at least part of the area corresponding to the second SIM 223 is folded, the processor 250 may display the execution screen of the application related to the first SIM 221 in an area other than a folded area corresponding to the second SIM 223. For example, as described above, after receiving the notification related to the first SIM 221, the processor 250 may display the execution screen of the application related to the first SIM 221 on the flexible display 210 by changing a state of the area corresponding to the first SIM 221 of the flexible display 210 from a folded state to an unfolded state.

According to an embodiment, when at least part of the area corresponding to the second SIM 223 changes from the folded state to the unfolded state, the processor 250 may display a home screen in an unfolded area corresponding to the second SIM 223. For example, the home screen may be one of a home screen corresponding to the first SIM 221, a home screen corresponding to the second SIM 223, and a home screen common to the first SIM 221 and the second SIM 223.

According to an embodiment, while the processor 250 displays the execution screen of the application (e.g., an application corresponding to a notification related to the first SIM 221) related to the first SIM 221 on the flexible display 210 in a state where at least part of the area corresponding to the second SIM 223 is folded, the processor 250 may receive a notification related to the second SIM 223 from the outside.

According to an embodiment, the processor 250 may provide the notification related to the second SIM 223 to a specified area based on the state of the flexible display 210. According to an embodiment, the specified area may be an area formed along a folded portion of an area corresponding to the second SIM 223 in the flexible display 210. For example, the specified area may be an area adjacent to the folded area corresponding to the second SIM 223 while an area corresponding to the second SIM 223 is folded. For example, the specified area may include at least part of an edge area of the flexible display 210 in a state where an area corresponding to the second SIM 223 is folded.

According to an embodiment, when the area corresponding to the second SIM 223 is changed to be in an unfolded state while the processor 250 is providing the notification related to the second SIM 223, the processor 250 may display the execution screen of the application corresponding to the notification related to the first SIM 221 in the area corresponding to the first SIM 221 and then may display an execution screen of an application corresponding to a notification related to the second SIM 223 in an area corresponding to the second SIM 223. According to an embodiment, the area corresponding to the first SIM 221 and the area corresponding to the second SIM 223 may be set by a user input. For example, the processor 250 may simultaneously display an execution screen of an application corresponding to a notification related to each of the SIMs 220 in the set area corresponding to the first SIM 221 and the set area corresponding to the second SIM 223.

According to an embodiment, the processor 250 may provide, on the flexible display 210 (e.g., the area corresponding to the first SIM 221 and/or the area corresponding to the second SIM 223), a user interface for displaying an execution screen of an application corresponding to a notification related to the first SIM 221 or an execution screen of an application corresponding to a notification related to the second SIM 223 to a full screen of the flexible display 210. For example, the processor 250 may provide a user interface for at least temporarily displaying the execution screen of the application related to the one SIM 220 on the full screen. According to an embodiment, while the processor 250 is displaying the execution screen of an application related to the one SIM 220 on the full screen, the processor 250 may provide a user interface for displaying an execution screen of an application related to each of the plurality of SIMs 220 together.

According to an embodiment, while the flexible display 210 is fully unfolded, the processor 250 may execute a first application in an area corresponding to the first SIM 221 based on the first SIM 221 and may execute a second application in an area corresponding to the second SIM 223 based on the second SIM 223. For example, the processor 250 may display an execution screen of the first application in an area corresponding to the first SIM 221 and may display the execution screen of the second application in an area corresponding to the second SIM 223.

According to an embodiment, when the processor 250 fails to perform a function related to the first application by using the first SIM 221, the processor 250 may determine whether a function related to the first application is capable of being performed by using the second SIM 223. For example, each of the first SIM 221 and the second SIM 223 may correspond to a different telecommunications service provider, a different communication fee, and/or a different communication method, or may have a difference in an available data communication amount. For example, to perform a specific function of the application, it may be necessary that the SIM 220 supports the corresponding setting (e.g., a telecommunications service provider or a communication method), or resources (e.g., a communication data capacity, a talk time, or the number of messages) allocated to the SIM 220 are sufficient. For example, when the amount of available communication data is insufficient in the first SIM 221, the processor 250 may determine whether an available communication data amount is sufficient, through the second SIM 223. For example, when a specific communication method is not available in the first SIM 221, the processor 250 may determine whether the specific communication method is capable of being used in the second SIM 223. For example, when the first SIM 221 has used all available resources (e.g., a communication data capacity, a talk time, or the number of messages) according to a specified communication rate, the processor 250 may determine whether the second SIM 223 is capable of using a corresponding resource.

According to an embodiment, when the processor 250 is capable of performing a function related to the first application by using the second SIM 223, the processor 250 may provide a user interface for determining whether to use the second SIM 223. According to an embodiment, the user interface for determining whether to use the second SIM 223 may include Information indicating that a function related to the first application is incapable of being performed by using the first SIM 221, and items for selecting whether to perform the function related to the first application by using the second SIM 223. According to an embodiment, the user interface for determining whether to use the second SIM 223 may include an item for selecting whether to use the corresponding method when there is a method (e.g., paying an extra charge for the first SIM 221) of using the first SIM 221.

According to an embodiment, the processor 250 may perform a function related to the first application by using the second SIM 223 based on a user input received by using the user interface for determining whether to use the second SIM 223. For example, when the processor 250 receives a user input for allowing the use of the second SIM 223 through a user interface for determining whether to use the second SIM 223, the processor 250 may perform a function related to the first application by using the second SIM 223. For example, when the processor 250 receives a user input for not allowing the use of the second SIM 223 through a user interface for determining whether to use the second SIM 223, the processor 250 may not perform the function related to the first application. For example, when the processor 250 receives a user input for not allowing the use of the second SIM 223 through a user interface for determining whether to use the second SIM 223, the processor 250 may output an indication indicating that a function related to the first application is incapable of being performed.

According to an embodiment, when the processor 250 is capable of performing a function related to the first application by using the second SIM 223 without providing a user interface for determining whether to use the second SIM 223, the processor 250 may automatically perform a function related to the first application by using the second SIM 223.

According to an embodiment, the processor 250 may provide a user interface for setting an area of the flexible display 210 corresponding to each of the SIMs 220 included in the electronic device 200. According to an embodiment, the user interface for setting an area of the flexible display 210 may include information (e.g., information of an area capable of being expanded or contracted) of the flexible display 210, information of the corresponding area for each of the currently set SIMs 220, information of each of the SIMs 220 included in the electronic device 200, and/or a UI item for setting the corresponding area for each of the SIMs 220.

According to an embodiment, the processor 250 may set an area of the flexible display 210 corresponding to each of the SIMs 220 included in the electronic device 200 based on a user input received through the user interface for setting the area of the flexible display 210. For example, the processor 250 may set the flexible display 210 to be divided into areas corresponding to at least part of the plurality of SIMs 220 included in the electronic device 200 based on a user input. For example, when the electronic device 200 includes the first SIM 221 and the second SIM 223, on the basis of a user input, the processor 250 may set the whole flexible display 210 to an area corresponding to the first SIM 221, may set the whole flexible display 210 as an area corresponding to the second SIM 223, or may set the flexible display 210 to include an area corresponding to the first SIM 221 and an area corresponding to the second SIM 223.

In the description of FIG. 2, it will be assumed that an operation is performed in a folded or unfolded state when the flexible display 210 is a foldable display, but is not limited thereto. According to various embodiments, the same or similar operation is possible in an expanded state or contracted state of an area exposed to the outside of an electronic device having a slideable display or a rollable display.

Figure 3:
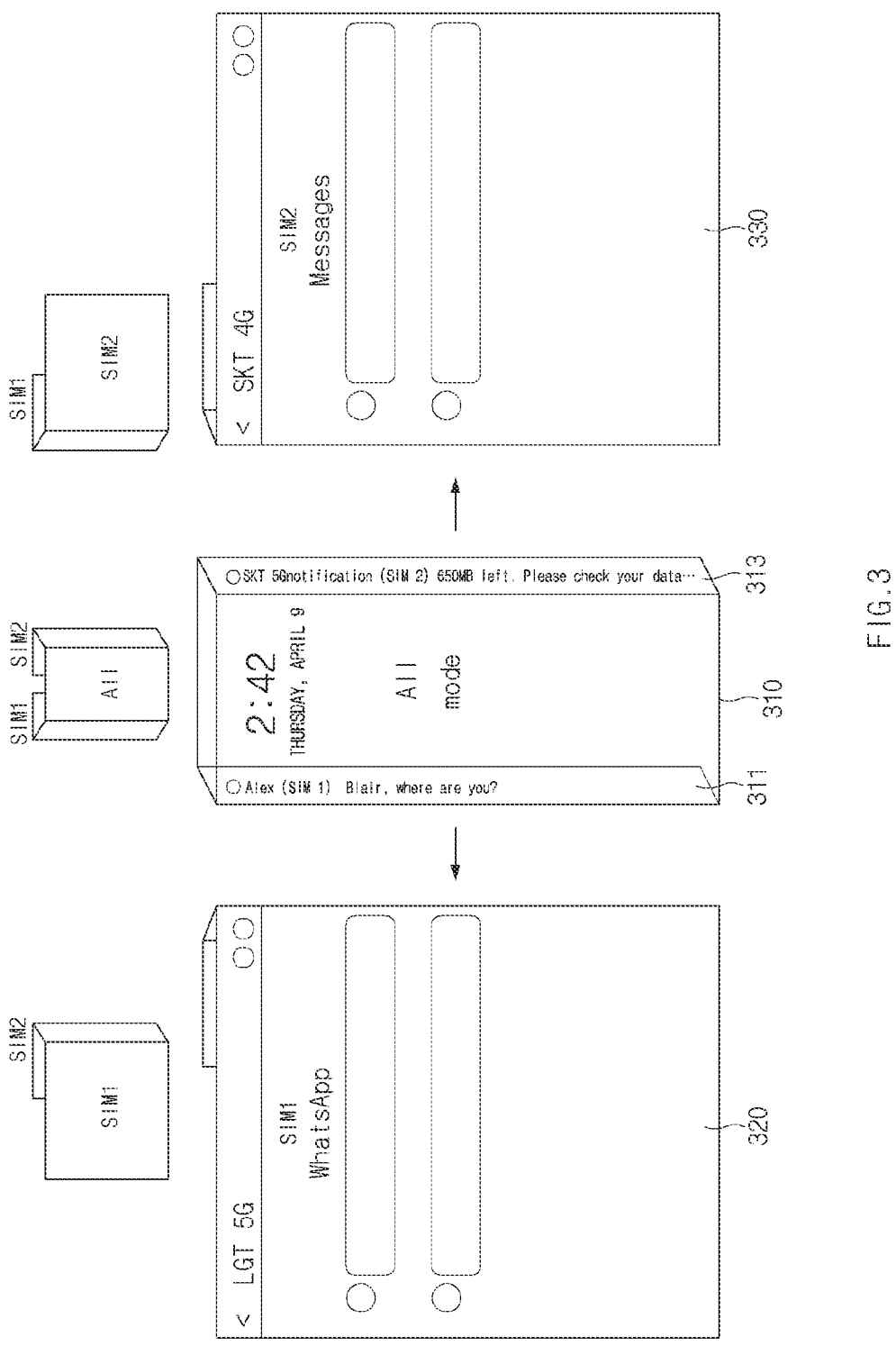
FIG. 3 is a diagram for describing an operation of an electronic device, according to an example embodiment.

FIG. 3 is a diagram for describing an operation of an electronic device, according to an embodiment. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

According to an embodiment, an electronic device (e.g., the electronic device 101 in FIG. 1 or the electronic device 200 in FIG. 2) may include a flexible display (e.g., the display module 160 in FIG. 1 or the flexible display 210 in FIG. 2, each comprising at least one display) including an area corresponding to a first SIM (e.g., the SIM 196 in FIG. 1 or the first SIM 221 in FIG. 2) and an area corresponding to a second SIM (e.g., the SIM 196 in FIG. 1 or the second SIM 223 in FIG. 2), which are capable of being at least partially folded or unfolded. For example, the flexible display may include a foldable display in which portions in two different directions are capable of being folded.

According to an embodiment, the flexible display may include the area corresponding to the first SIM, the area corresponding to the second SIM, and a common use area. For example, a left folding portion of the flexible display may be set as an area corresponding to the first SIM; a right folding portion of the flexible display may be set as an area corresponding to the second SIM; and a central portion of the flexible display may be set as a common use area.

For example, referring to reference numeral 310, while both the left and right portions (e.g., the area corresponding to the first SIM and the area corresponding to the second SIM) of the flexible display are folded, the center portion may be commonly used for the first SIM and the second SIM. For example, when the electronic device receives a notification 311 related to the first SIM and/or a notification 313 related to the second SIM, the notification 311 related to the first SIM may be provided to an edge portion adjacent to an area corresponding to the first SIM, and the notification 313 related to the second SIM may be provided to an edge portion adjacent to an area corresponding to the second SIM. According to an embodiment, when a specified time elapses after the electronic device provides the notifications 311 and 313, the electronic device may remove the notifications 311 and 313 from the flexible display. According to an embodiment, when receiving a specified user input (e.g., a touch input) on the notifications 311 and 313, the electronic device may differently change a form of providing the notifications

311 and 313 (e.g., outputting a pop-up window corresponding to the notifications 311 and 313) for receiving a user input.

According to an embodiment, when the folded portion corresponding to the notifications 311 and 313 is unfolded on the flexible display within a specified time after the electronic device receives the notifications 311 and 313, the electronic device may display an execution screen of an application corresponding to the notifications 311 and 313 on the flexible display. For example, referring to reference numeral 320, when the area corresponding to the first SIM changes from a folded state to an unfolded state after the notification 311 related to the first SIM is received, the electronic device may display an execution screen of an application (e.g., WhatsApp) corresponding to a notification related to the first SIM in a unfolded area corresponding to the first SIM and the common use area. For example, referring to reference numeral 330, when the area corresponding to the second SIM changes from a folded state to an unfolded state after the notification 313 related to the second SIM is received, the electronic device may display an execution screen of an application (e.g., Messages) corresponding to a notification related to the second SIM in an unfolded area corresponding to the second SIM and the common use area.

Figure 4:
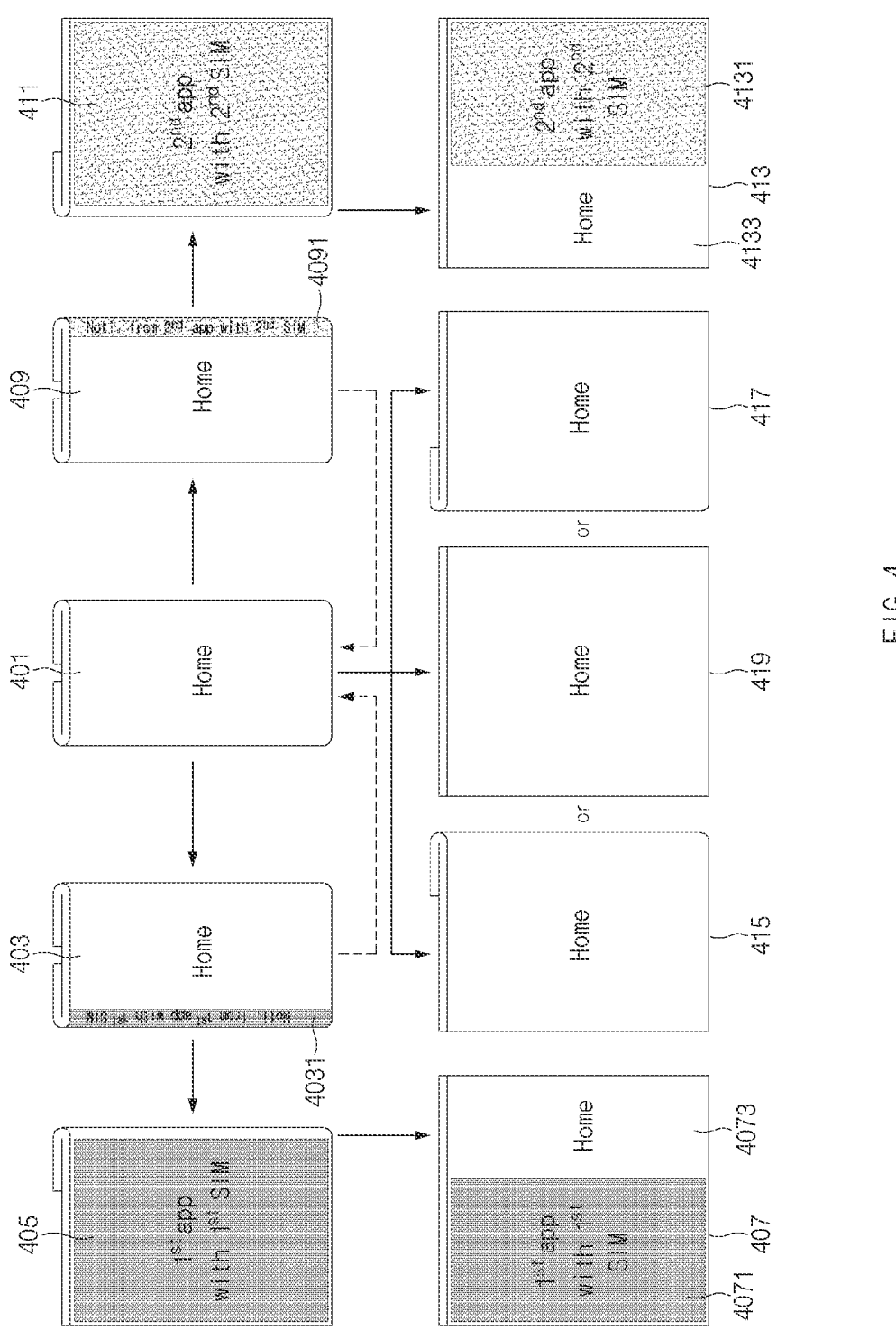
FIG. 4 is a diagram for describing an operation of an electronic device, according to an example embodiment.

FIG. 4 is a diagram for describing an operation of an electronic device, according to an embodiment. Hereinafter, descriptions identical to those of FIG. 3 will be omitted or briefly described. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

According to an embodiment, an electronic device (e.g., the electronic device 101 in FIG. 1 or the electronic device 200 in FIG. 2) may include a flexible display (e.g., the display module 160 in FIG. 1 or the flexible display 210 in FIG. 2) including an area corresponding to a first SIM (e.g., the SIM 196 in FIG. 1 or the first SIM 221 in FIG. 2) and an area corresponding to a second SIM (e.g., the SIM 196 in FIG. 1 or the second SIM 223 in FIG. 2), which are capable of being at least partially folded or unfolded. For example, the flexible display may include an area, which is foldable on a left side and which corresponds to the first SIM, an area, which is foldable on a right side and which corresponds to the second SIM, and a central common use area.

Referring to reference numeral 401, while both left and right portions (e.g., the area corresponding to the first SIM and the area corresponding to the second SIM) of the flexible display are folded, the electronic device may display a home screen in a common use area.

Referring to reference numeral 403, when the electronic device receives a first notification 4031 related to the first SIM, the electronic device may provide the first notification 4031 to a specified area based on the state of the flexible display. For example, the electronic device may provide the first notification 4031 to an area positioned along an edge where the area corresponding to the first SIM is folded. According to an embodiment, when a specified time elapses after the first notification 4031 is provided, the electronic device may remove the first notification 4031 from the flexible display and may return to state 401.

Referring to reference numeral 405, when the area corresponding to the first SIM is unfolded within the specified time after the first notification 4031 is provided, the electronic device may display an execution screen of a first application corresponding to the first notification 4031 in the unfolded area corresponding to the first SIM and the common use area. For example, the electronic device may execute the first application based on the first SIM and then may display the execution screen of the first application on the flexible display in a state where the area corresponding to the first SIM is unfolded.

Referring to reference numeral 407, when the folded area corresponding to the second SIM is unfolded while the electronic device is displaying an execution screen 4071 of the first application, the electronic device may display a home screen 4073 in an unfolded area corresponding to the second SIM. For example, while maintaining the execution screen 4071 of the first application displayed in the area corresponding to the first SIM and the common use area, the electronic device may display the home screen 4073 in an area corresponding to the second SIM. According to various embodiments, the home screen 4073 may be at least one of a home screen corresponding to the first SIM, a home screen corresponding to the second SIM, and a common home screen of the first and second SIMs.

Referring to reference numeral 409, when the electronic device receives a second notification 4091 related to the second SIM, the electronic device may provide the second notification 4091 to a specified area based on the state of the flexible display. For example, the electronic device may provide the second notification 4091 to an area positioned along an edge where the area corresponding to the second SIM is folded. According to an embodiment, when the specified time elapses after the second notification 4091 is provided, the electronic device may remove the second notification 4091 from the flexible display and may return to state 401.

Referring to reference numeral 411, when the area corresponding to the second SIM is unfolded within a specified time after the second notification 4091 is provided, the electronic device may display an execution screen of a second application corresponding to the second notification 4091 in the unfolded area corresponding to the second SIM and the common use area. For example, the electronic device may execute the second application based on the second SIM and then may display the execution screen of the second application on the flexible display in a state where the area corresponding to the second SIM is unfolded.

Referring to reference numeral 413, when the folded area corresponding to the first SIM is unfolded while the electronic device is displaying an execution screen 4131 of the second application, the electronic device may display a home screen 4133 in an unfolded area corresponding to the first SIM. For example, while maintaining the execution screen 4131 of the second application displayed in the area corresponding to the second SIM and the common use area, the electronic device may display the home screen 4133 in an area corresponding to the first SIM. According to various embodiments, the home screen 4133 may be at least one of a home screen corresponding to the first SIM, a home screen corresponding to the second SIM, and a common home screen of the first and second SIMs.

Referring to reference numerals 415, 417, and 419, when the area corresponding to the first SIM and/or the area corresponding to the second SIM is unfolded without receiving the notification 4031 related to the first SIM or the notification 4091 related to the second SIM, the electronic device may display a home screen on the unfolded flexible display. According to various embodiments, the electronic device may have a home screen corresponding to each of a plurality of SIMs. For example, the electronic device may have a home screen corresponding to the first SIM, a home screen corresponding to the second SIM, and/or a common home screen of the first SIM and the second SIM. For example, the electronic device may display a home screen corresponding to the first SIM in an area corresponding to the first SIM, may display a home screen corresponding to the second SIM in an area corresponding to the second SIM, and may display a common home screen of the first SIM and the second SIM in the common use area.

Figure 5:
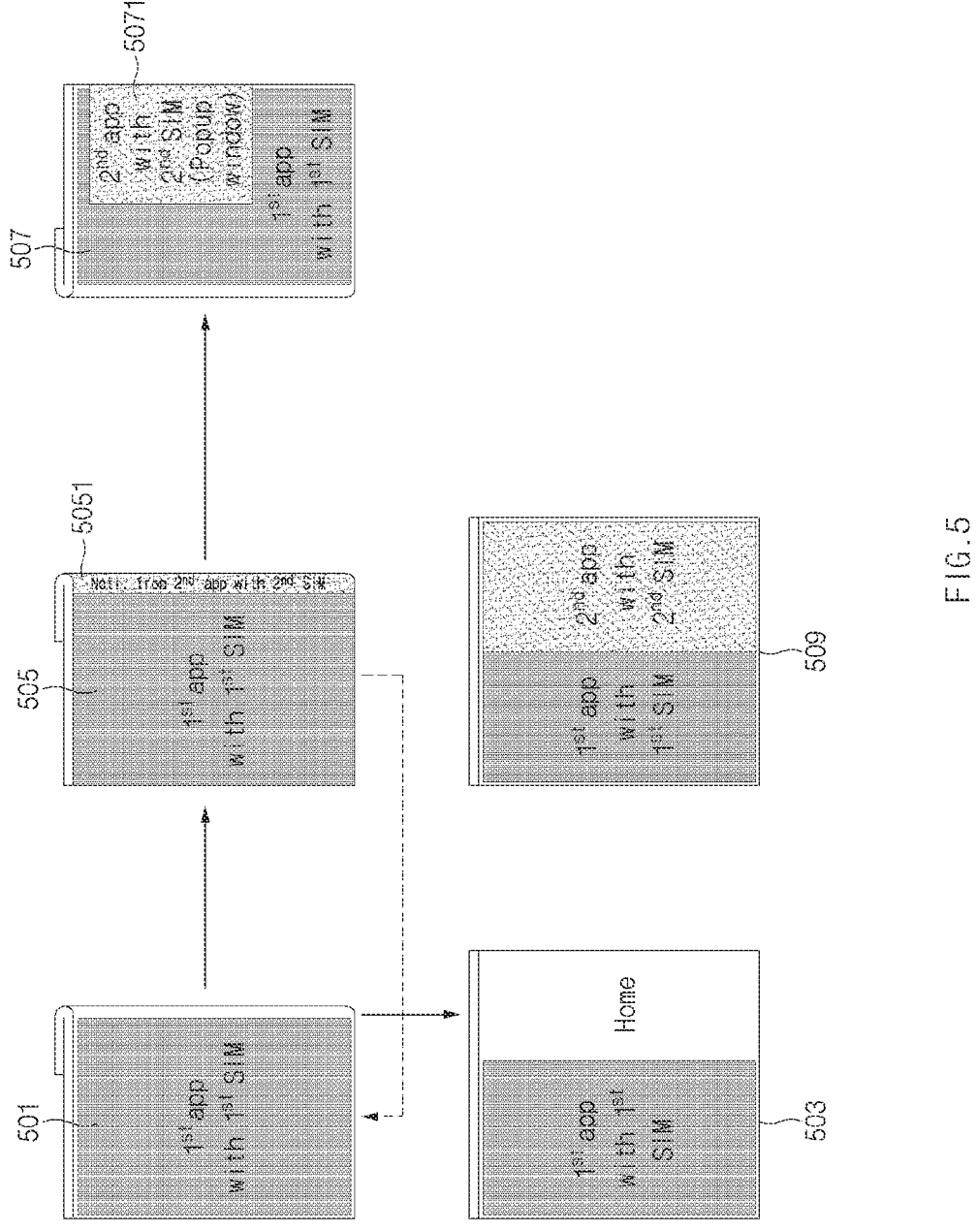
FIG. 5 is a diagram for describing an operation of an electronic device, according to an example embodiment.

FIG. 5 is a diagram for describing an operation of an electronic device, according to an embodiment. Hereinafter, descriptions identical to those of FIGS. 3 and 4 will be omitted or briefly described. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

According to an embodiment, an electronic device (e.g., the electronic device 101 in FIG. 1 or the electronic device 200 in FIG. 2) may include a flexible display (e.g., the display module 160 in FIG. 1 or the flexible display 210 in FIG. 2) including an area corresponding to a first SIM (e.g., the SIM 196 in FIG. 1 or the first SIM 221 in FIG. 2) and an area corresponding to a second SIM (e.g., the SIM 196 in FIG. 1 or the second SIM 223 in FIG. 2), which are capable of being at least partially folded or unfolded. For example, the flexible display may include an area, which includes a portion is capable of being folded on a left side and which corresponds to the first SIM, and an area, which includes a portion is capable of being folded on a right side and which corresponds to the second SIM. For example, at least part of the area of the flexible display corresponding to the first SIM may be contracted (folded) or expanded (unfolded), and at least part of the area corresponding to the second SIM may be contracted (folded) or expanded (unfolded). For example, in FIG. 5, it is assumed that half of the left side of the flexible display is set to an area corresponding to the first SIM and half of the right side of the flexible display is set to an area corresponding to the second SIM, but example embodiments are not limited thereto. An area corresponding to each SIM may be set in various manners by a user input.

Referring to reference numeral 501, while a portion corresponding to the first SIM is unfolded, and at least part of a portion corresponding to the second SIM is folded, the electronic device may display the execution screen of the first application executed based on the first SIM on a flexible display.

Referring to reference numeral 503, when at least one portion of the contracted (folded) area corresponding to the second SIM is expanded (unfolded) without receiving a notification 5051 related to the second SIM while the execution screen of the first application is displayed, the electronic device may display a home screen on at least one portion of an expanded (unfolded) area corresponding to the second SIM.

Referring to reference numeral 505, when the electronic device receives the notification 5051 related to the second SIM while displaying the execution screen of the first application, the electronic device may provide the notification 5051 to a specified area. For example, the electronic device may provide the notification 5051 to an area in which at least one portion of an area corresponding to the second SIM is positioned along an edge to be adjacent to a contracted (folded) portion. For example, when a specified time elapses after the electronic device provides the notification 5051, the electronic device may remove the notification 5051 and may return to state 501.

Referring to reference numeral 507, when the electronic device receives a specified user input (e.g., a touch input (e.g., swipe)) in the notification 5051, the electronic device may change a form of providing the notification 5051 to another form (e.g., a pop-up window 5071). For example, the electronic device may output the pop-up window 5071 corresponding to the notification 5051 on the execution screen of the first application.

Referring to reference numeral 509, when at least one portion of the area corresponding to the second SIM changes from the contracted (folded) state to the expanded (unfolded) state while the electronic device is providing the notification 5051, the electronic device may execute a second application corresponding to the notification 5051 and then may display the execution screen of the second application in an area corresponding to the second SIM. For example, while a flexible display is fully unfolded, the electronic device may display the execution screen of the first application in an area corresponding to the first SIM and may simultaneously display the execution screen of the second application in the area corresponding to the second SIM.

Figure 6:
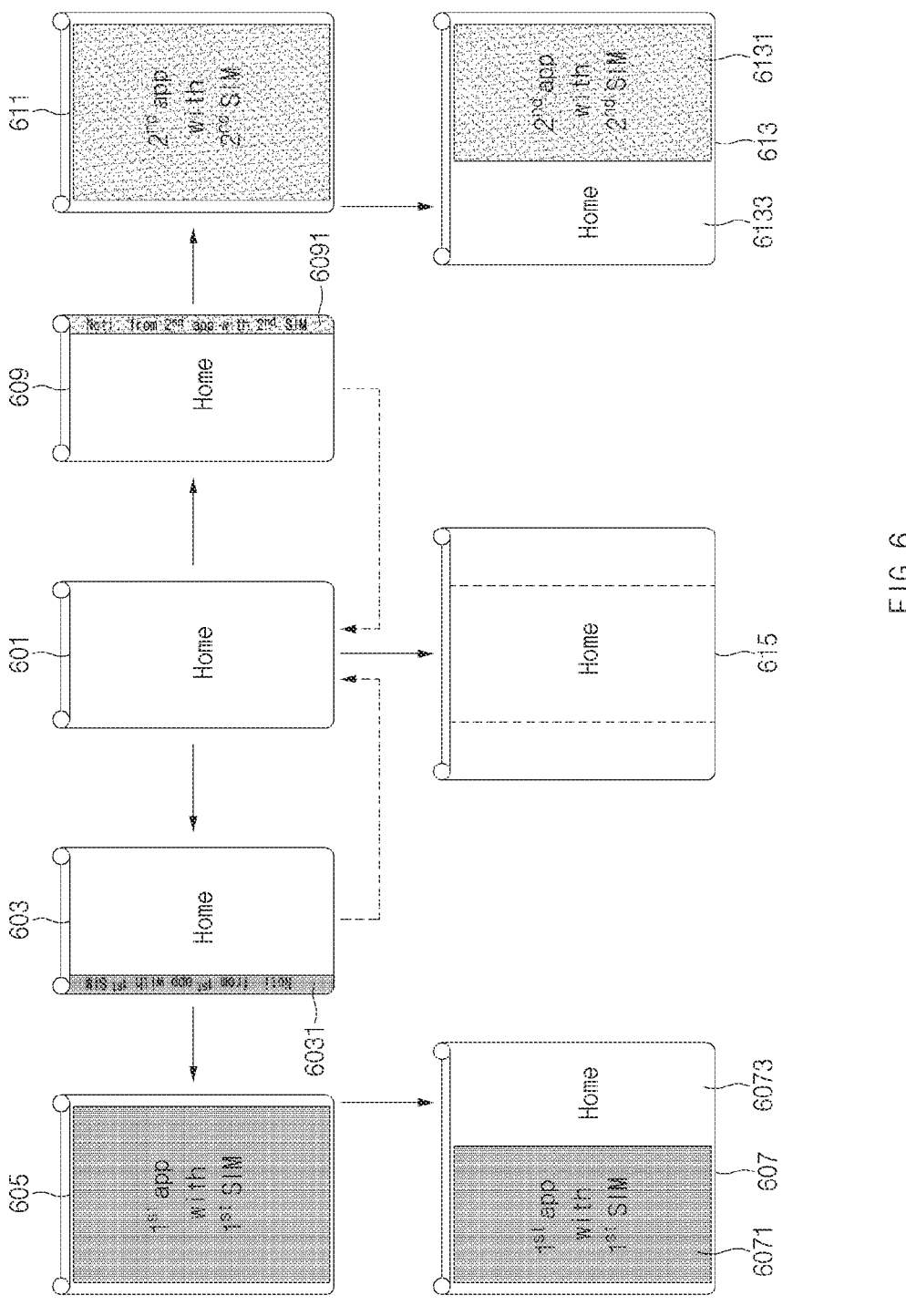
FIG. 6 is a diagram for describing an operation of an electronic device, according to an example embodiment.

FIG. 6 is a diagram for describing an operation of an electronic device, according to an embodiment. Hereinafter, descriptions identical to those of FIGS. 3 to 5 will be omitted or briefly described. For example, FIG. 6 shows that a flexible display (e.g., the display module 160 in FIG. 1 or the flexible display 210 in FIG. 2) included in an electronic device (e.g., the electronic device 101 in FIG. 1 or the electronic device 200 in FIG. 2) is a slideable display or a rollable display. Hereinafter, it is assumed that the flexible display operates in an expanded state or contracted state of an area exposed to the outside of the electronic device of the slideable display when the flexible display is a slideable display or a rollable display, but is not limited thereto. According to various embodiments, the same or similar operation is possible in the folded state or unfolded state of the foldable display.

According to an embodiment, the flexible display may include an area, which is capable of being expanded or contracted on a left side and which corresponds to the first SIM (e.g., the SIM 196 in FIG. 1 or the first SIM 221 in FIG. 2), an area, which is capable of being expanded or contracted on a right side and which corresponds to the second SIM (e.g., the SIM 196 in FIG. 1 or the second SIM 223 in FIG. 2), and a central common use area. For example, at least part of an area exposed to the outside of the electronic device in the flexible display may be expanded or contracted. For example, an area corresponding to the first SIM and an area corresponding to the second SIM may be inserted into the inside of the electronic device (e.g., housing) and may change to a contracted state covered by the housing or change to an expanded state exposed to the outside of the electronic device (e.g., housing).

Referring to reference numeral 601, while both left and right portions (e.g., the area corresponding to the first SIM and the area corresponding to the second SIM) of the flexible display are contracted, the electronic device may display a home screen in a common use area.

Referring to reference numeral 603, when the electronic device receives a first notification 6031 related to the first SIM, the electronic device may provide the first notification 6031 to a specified area based on the state of the flexible display. For example, the electronic device may provide the first notification 6031 to an area positioned along a boundary (e.g., edge) portion where the area corresponding to the first SIM is contracted. According to an embodiment, when a specified time elapses after the first notification 6031 is provided, the electronic device may remove the first notification 6031 from the flexible display and may return to state 601.

Referring to reference numeral 605, when the area corresponding to the first SIM is unfolded within the specified time after the first notification 6031 is provided, the electronic device may display an execution screen of a first application corresponding to the first notification 6031 in the unfolded area corresponding to the first SIM and the common use area. For example, the electronic device may execute the first application based on the first SIM and then may display the execution screen of the first application on the flexible display in a state where the area corresponding to the first SIM is unfolded.

Referring to reference numeral 607, when the contracted area corresponding to the second SIM is expanded while the electronic device is displaying an execution screen 6071 of the first application, the electronic device may display a home screen 6073 in the expanded area corresponding to the second SIM. For example, while maintaining the execution screen 6071 of the first application displayed in the area corresponding to the first SIM and the common use area, the electronic device may display the home screen 6073 in an area corresponding to the second SIM.

Referring to reference numeral 609, when the electronic device receives a second notification 6091 related to the second SIM, the electronic device may provide the second notification 6091 to a specified area based on the state of the flexible display. For example, the electronic device may provide the second notification 6091 to an area positioned along a boundary (e.g., edge) area where the area corresponding to the second SIM is contracted. According to an embodiment, when the specified time elapses after the second notification 6091 is provided, the electronic device may remove the second notification 6091 from the flexible display and may return to state 601.

Referring to reference numeral 611, when the area corresponding to the second SIM is expanded within a specified time after the second notification 6091 is provided, the electronic device may display an execution screen of a second application corresponding to the second notification 6091 in the expanded area corresponding to the second SIM and the common use area. For example, the electronic device may execute the second application based on the second SIM and then may display the execution screen of the second application on the flexible display in a state where the area corresponding to the second SIM is expanded.

Referring to reference numeral 613, when the contracted area corresponding to the first SIM is expanded while the electronic device is displaying an execution screen 6131 of the first application, the electronic device may display a home screen 6133 in the expanded area corresponding to the first SIM. For example, while maintaining the execution screen 6131 of the second application displayed in the area corresponding to the second SIM and the common use area, the electronic device may display the home screen 6133 in an area corresponding to the first SIM.

Referring to reference numeral 615, when the area corresponding to the first SIM and/or the area corresponding to the second SIM is unfolded without receiving the notification 6031 related to the first SIM or the notification 6091 related to the second SIM, the electronic device may display a home screen on the unfolded flexible display. According to various embodiments, the electronic device may have a home screen corresponding to each of a plurality of SIMs. For example, the electronic device may display a home screen corresponding to the first SIM in an area corresponding to the first SIM, may display a home screen corresponding to the second SIM in an area corresponding to the second SIM, and may display a common home screen of the first SIM and the second SIM in the common use area.

Figure 7A:
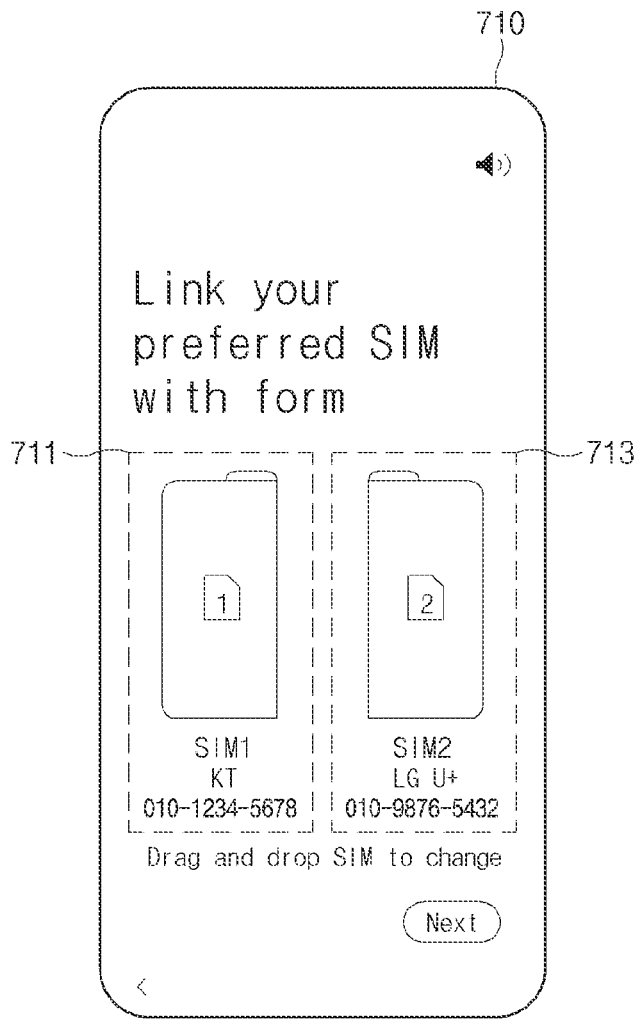
FIGS. 7A to 7C illustrate examples of a SIM setting screen of an electronic device, according to various example embodiments.
Figure 7B:
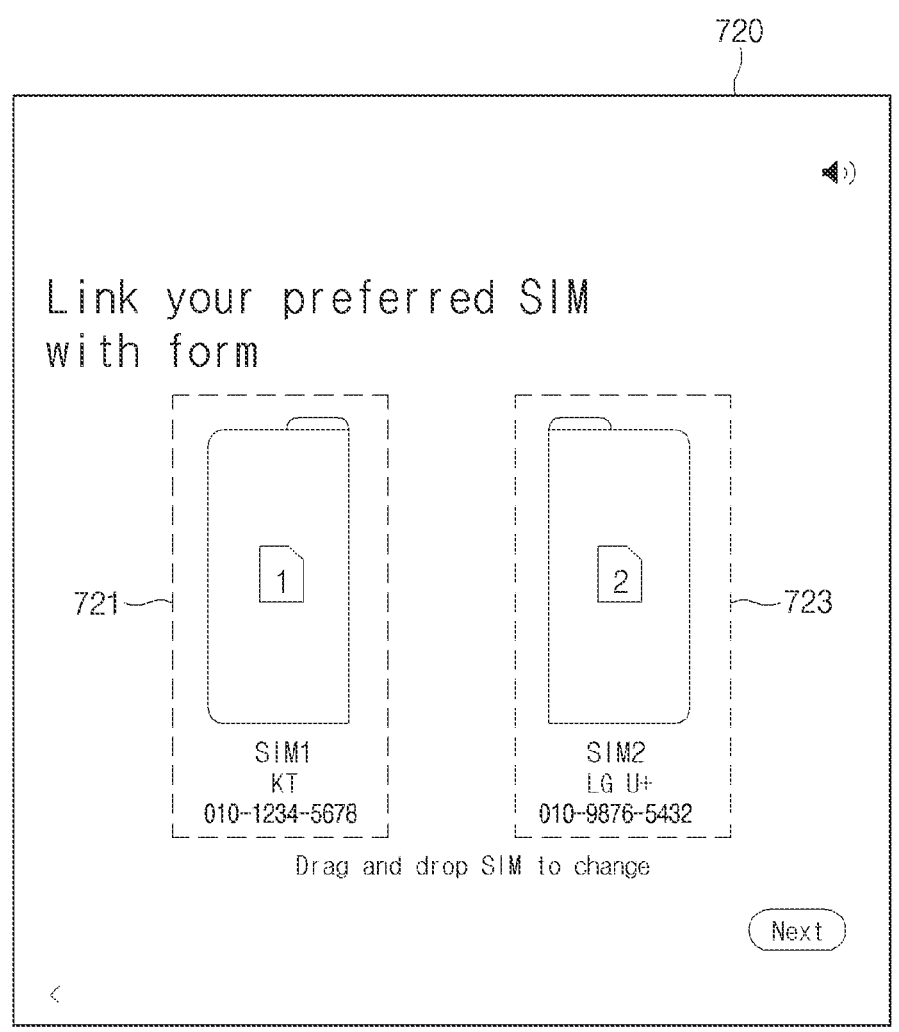
Figure 7C:
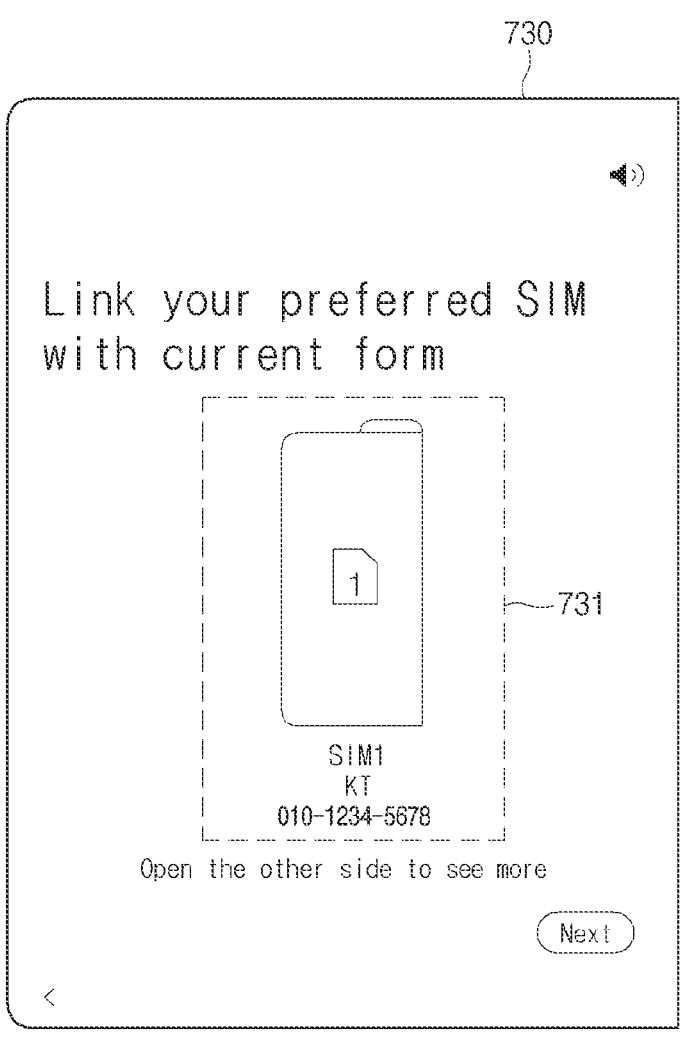

FIGS. 7A to 7C illustrate examples of a SIM setting screen of an electronic device, according to various embodiments. For example, FIG. 7A shows a fully contracted (folded) state of a flexible display (e.g., the display module 160 in FIG. 1 or the flexible display 210 in FIG. 2) of an electronic device (e.g., the electronic device 101 in FIG. 1 or the electronic device 200 in FIG. 2); FIG. 7B shows a fully expanded (unfolded) state of the flexible display; and, FIG. 7C shows a contracted (folded) state of only a part (one side) of the flexible display.

According to an embodiment, SIM setting screens 710, 720, and 730 may include information 711, 713, 721, 723, and 731 about an area setting state for each SIM included in the electronic device. For example, referring to FIGS. 7A and 7B, when the electronic device includes a first SIM and a second SIM, the SIM setting screens 710 and 720 may include areas 711 and 721 including the shape of an area corresponding to the first SIM and information of the first SIM, and areas 713 and 723 including the shape of an area corresponding to the second SIM and information of the second SIM. According to an embodiment, the SIM setting screens 710 and 720 may include guide information about a method for changing settings of an area corresponding to a SIM. For example, referring to FIG. 7C, when only a part (one side) of the flexible display is in a contracted (folded) state, the SIM setting screen 730 may include information 731 (e.g., information of the first SIM) of a SIM corresponding to an expanded or contracted state (unfolded or folded state) of the current flexible display. For example, to set different SIMs or SIMs for other areas of a flexible display, the SIM setting screen 730 may include guide information for changing the shape of the flexible display.

Figure 8A:
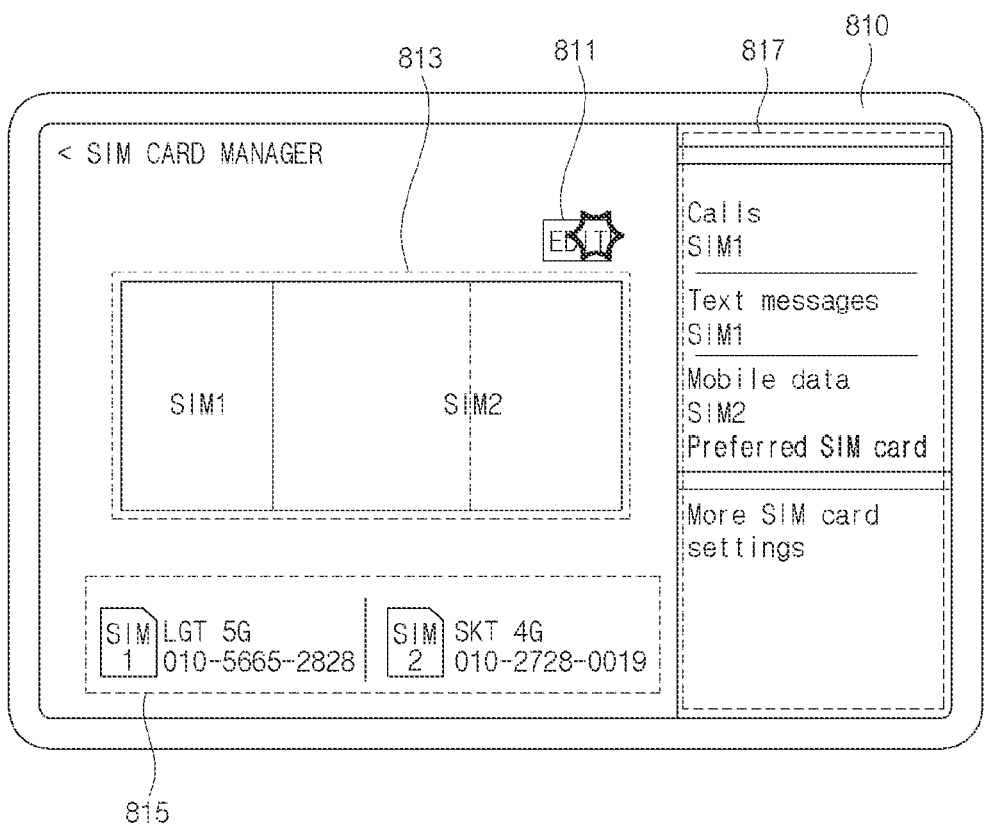
FIGS. 8A to 8C illustrate examples of a SIM setting screen of an electronic device, according to various example embodiments.
Figure 8B:
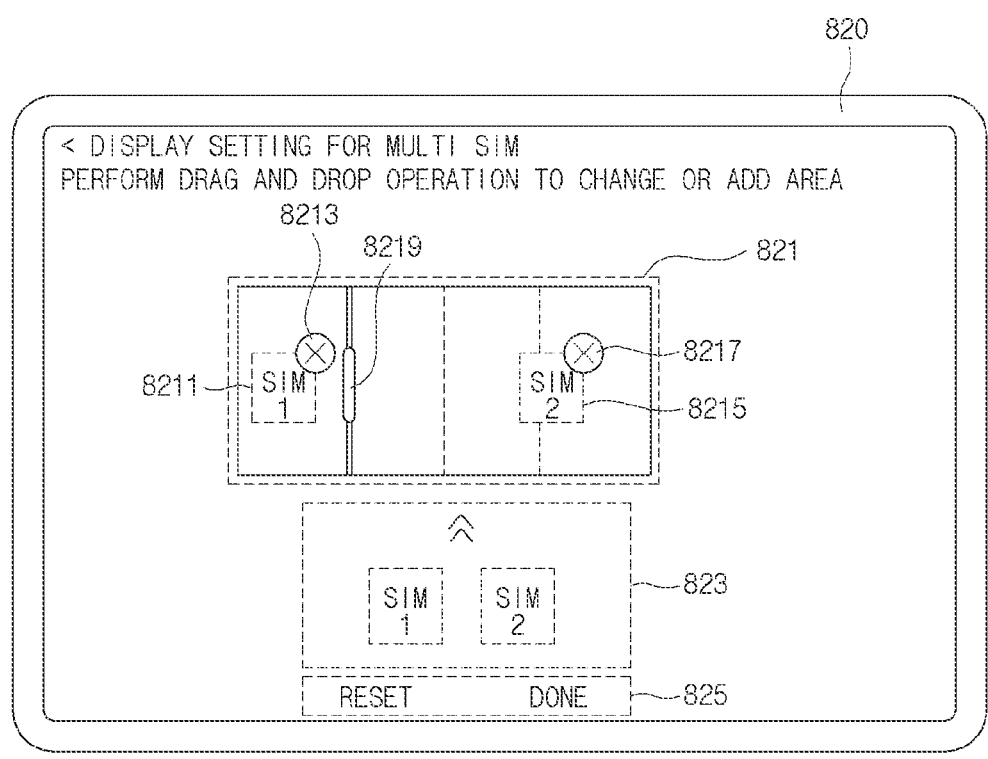
Figure 8C:
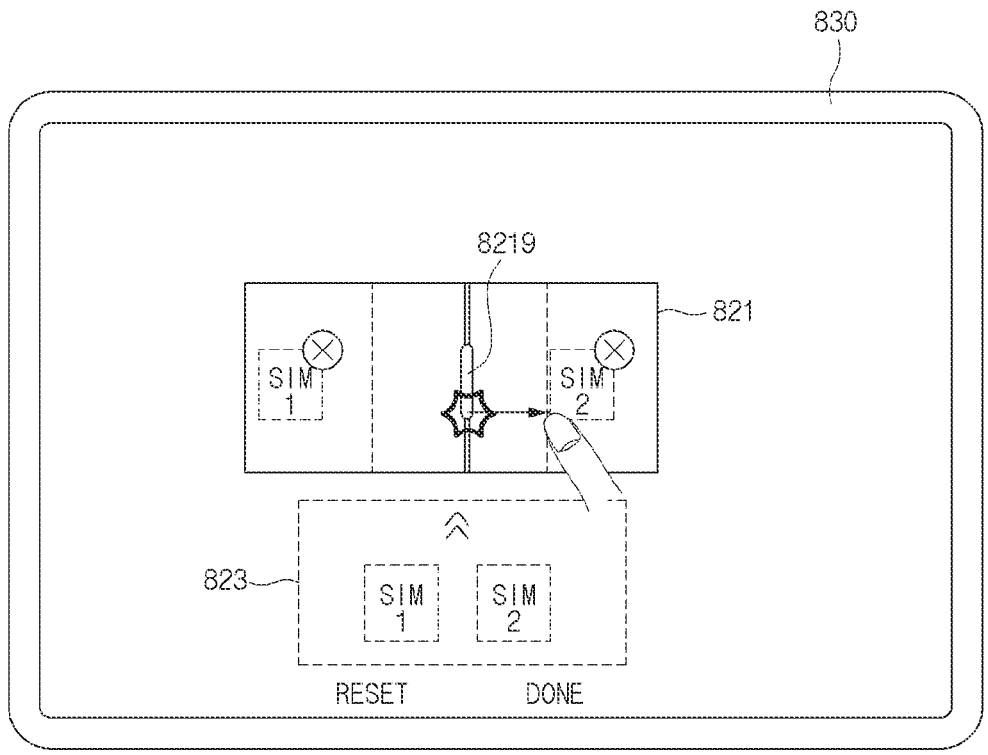

FIGS. 8A to 8C illustrate examples of a SIM setting screen of an electronic device, according to various embodiments.

According to an embodiment, an electronic device (e.g., the electronic device 101 in FIG. 1 or the electronic device 200 in FIG. 2) may provide SIM setting screens 810, 820, and 830 for setting an area of a flexible display (e.g., the display module 160 in FIG. 1 or the flexible display 210 in FIG. 2) for each SIM (e.g., the SIM 196 of FIG. 1 or the SIM 220 of FIG. 2) included in the electronic device.

Referring to FIG. 8A, the SIM setting screen 810 may include a button 811 for editing SIM settings, an area 813 indicating information of a flexible display area for each SIM currently set, an area 815 indicating SIM information included in the electronic device, and an area 817 indicating information of major functions of the electronic device and preferred SIM for each function. For example, the area 813 indicating information of a flexible display area for each SIM currently set may include SIM information set for each divided area in the whole area of the flexible display. For example, the area 815 indicating SIM information included in the electronic device may include information (e.g., telecommunications service provider information, communication method information, and/or phone number information) of each SIM included in the electronic device. For example, the area 817 indicating information of major functions of the electronic device and the corresponding preferred SIM may include information of a SIM having a priority for a call, message, and/or data communication function.

Referring to FIGS. 8B and 8C, the SIM setting screens 820 and 830 may provide an interface for setting a flexible display area for each SIM. For example, the SIM setting screens 820 and 830 of FIGS. 8B and 8C may be activated when a user input is received on the button 811 for editing SIM settings of the SIM setting screen 810 of FIG. 8A. For example, the SIM setting screens 820 and 830 may include an area 821 for setting a flexible display area corresponding to each SIM, an area 823 indicating information of a SIM included in the electronic device, and a button area 825 for initializing or completing SIM settings. For example, the area 821 for setting the flexible display area corresponding to each SIM may include areas of the flexible display divided to indicate the current SIM setting state, and information 8211 and 8215 of SIMs set in each area of the flexible display. For example, the area 821 for setting the flexible display area corresponding to each SIM may include may include buttons 8213 and 8217, which is positioned to be adjacent to information 8211 and 8215 of the set SIM and which is used to release settings of the corresponding SIM. For example, when a user input is received on the buttons 8213 and 8217, the SIM set in the corresponding area may be released. For example, the area 821 for setting the flexible display area corresponding to each SIM may include a UI item 8219 for adjusting an area of the display in which the SIM is set. For example, the UI item 8219 may be moved depending on a user input. A size of an area corresponding to each SIM in the flexible display may be adjusted depending on the movement of the UI item 8219. According to an embodiment, when the distinguishable area of the flexible display is determined (e.g., when the foldable portion of the foldable display is determined), the UI item 8219 may indicate an area set by being snapped to a corresponding portion when a drag operation is performed in response to a user input.

According to various embodiments, the SIM setting screens 810, 820, and 830 shown in FIGS. 8A to 8C are examples and are not limited thereto. The configuration and placement of the SIM setting screens 810, 820, and 830 may be changed.

Figure 9A:
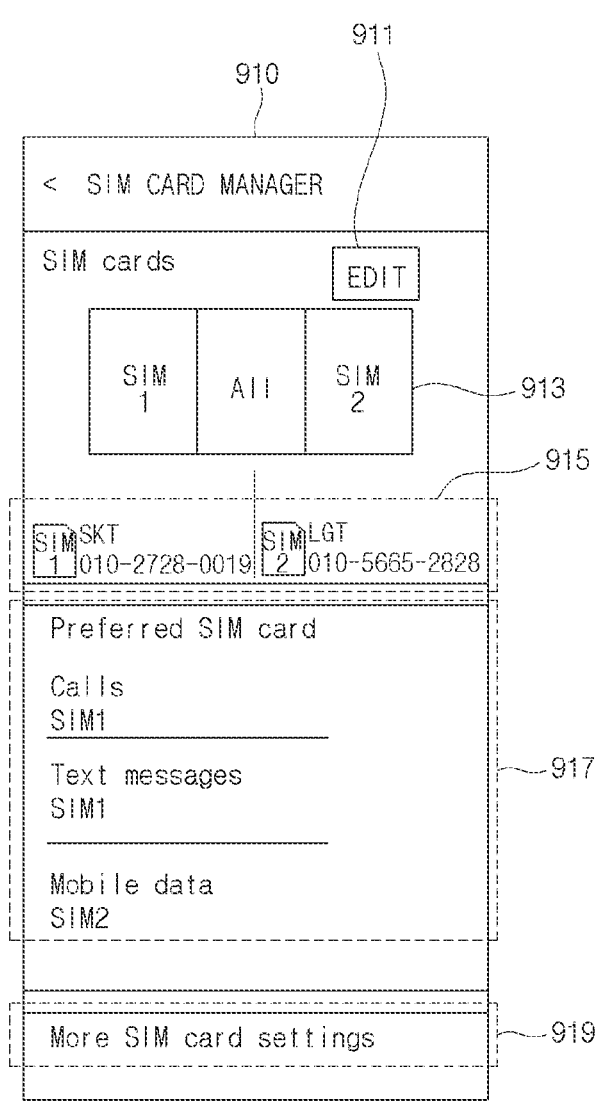
FIGS. 9A to 9C illustrate examples of a SIM setting screen of an electronic device, according to various example embodiments.
Figure 9B:
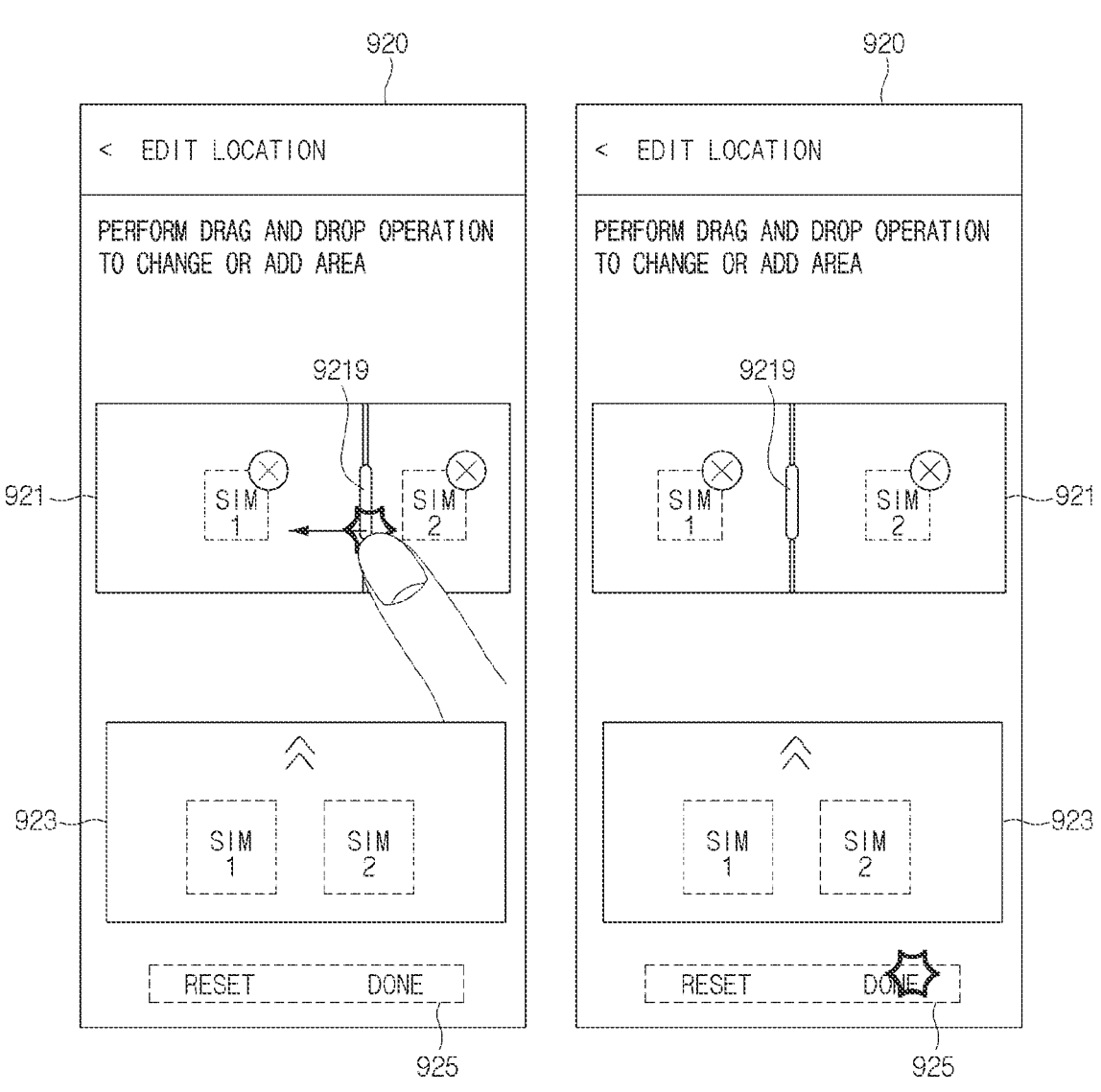
Figure 9C:
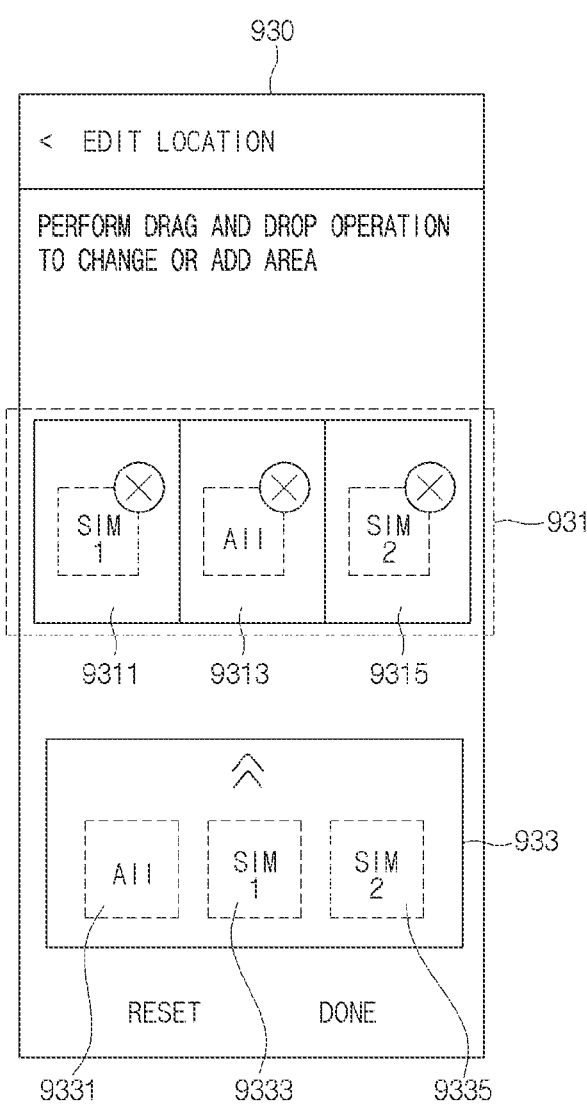

FIGS. 9A to 9C illustrate examples of a SIM setting screen of an electronic device, according to various embodiments. Hereinafter, descriptions identical to those of FIGS. 8A to 8C will be omitted or briefly described.

According to an embodiment, an electronic device (e.g., the electronic device 101 in FIG. 1 or the electronic device 200 in FIG. 2) may provide SIM setting screens 910, 920, and 930 for setting an area of a flexible display (e.g., the display module 160 in FIG. 1 or the flexible display 210 in FIG. 2) for each SIM (e.g., the SIM 196 of FIG. 1 or the SIM 220 of FIG. 2) included in the electronic device.

Referring to FIG. 9A, the SIM setting screen 910 may include a button 911 for editing SIM settings, an area 913 indicating information of a flexible display area for each SIM currently set, an area 915 indicating SIM information included in the electronic device, an area 917 indicating information of major functions of the electronic device and preferred SIM for each function, and an area 919 for detailed settings for a SIM card. For example, the electronic device may activate the SIM setting screens 920 and 930 of FIG. 9B or 9C based on the user input received through the button 911. For example, the electronic device may change the main functions of the electronic device and settings of the preferred SIM for each function based on the user input received in the area 919 for detailed settings for the SIM card.

Referring to FIG. 9B, the SIM setting screen 920 may provide an interface for setting a flexible display area for each SIM. For example, the SIM setting screen 920 may include an area 921 for setting a flexible display area corresponding to each SIM, an area 923 indicating information of a SIM included in the electronic device, and a button area 925 for initializing or completing SIM settings. For example, the area 921 for setting the flexible display area corresponding to each SIM may include areas of the flexible display divided to indicate the current SIM setting state, information of SIMs set in each area of the flexible display, and a UI item 9219 for adjusting the area of the display where the SIM is set. For example, the UI item 9219 may be moved depending on a user input. A size of an area corresponding to each SIM in the flexible display may be adjusted depending on the movement of the UI item 9219. For example, when a user input is received on button "DONE" of the button area 925 after the UI item 9219 is adjusted based on a user input, SIM settings may be completed.

Referring to FIG. 9C, an area 933 indicating SIM information of an electronic device included in the SIM setting screen 930 may include an icon 9333 corresponding to a first SIM included in the electronic device, an icon 9335 corresponding to a second SIM, and an icon 9331 corresponding to all SIMs (e.g., the first SIM and the second SIM). For example, a user may drag an icon included in the area 933 indicating SIM information to the area 931 for setting a flexible display area corresponding to each SIM, and thus may set the SIM corresponding to the dragged icon in the corresponding area of the flexible display. For example, FIG. 9C shows that a left area is set as an area corresponding to the first SIM, a center area is set as a common use area corresponding to all SIMs, and a right area is set as an area corresponding to the second SIM while a flexible display is divided into three areas. E.g., see 9311, 9313, and/or 9315 in FIG. 9C.

According to various embodiments, the SIM setting screens 910, 920, and 930 shown in FIGS. 9A to 9C are examples and are not limited thereto. The configuration and placement of the SIM setting screens 910, 920, and 930 may be changed.

Figure 10A:
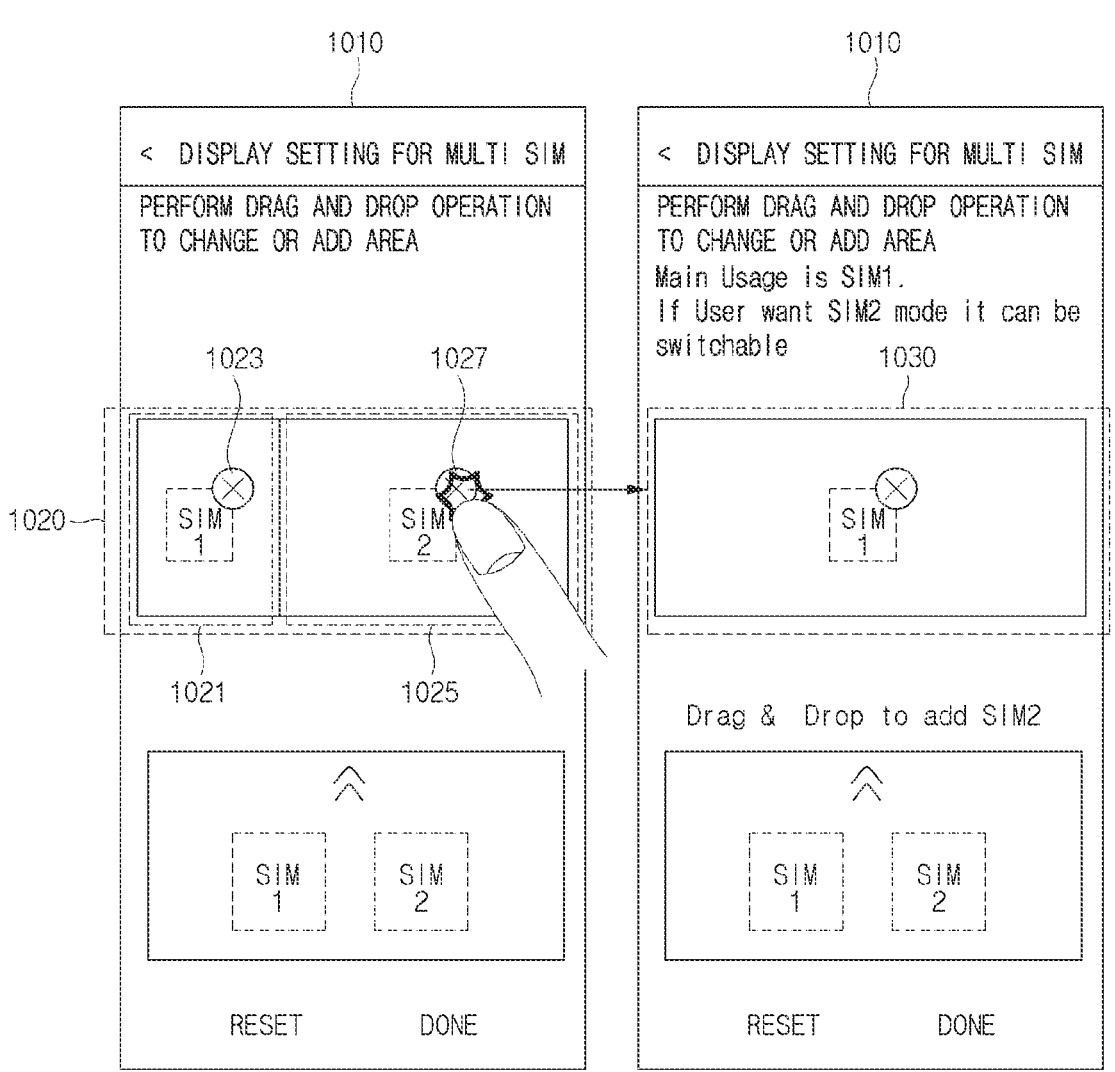
FIGS. 10A and 10B illustrate examples of a SIM setting screen of an electronic device, according to various example embodiments.
Figure 10B:
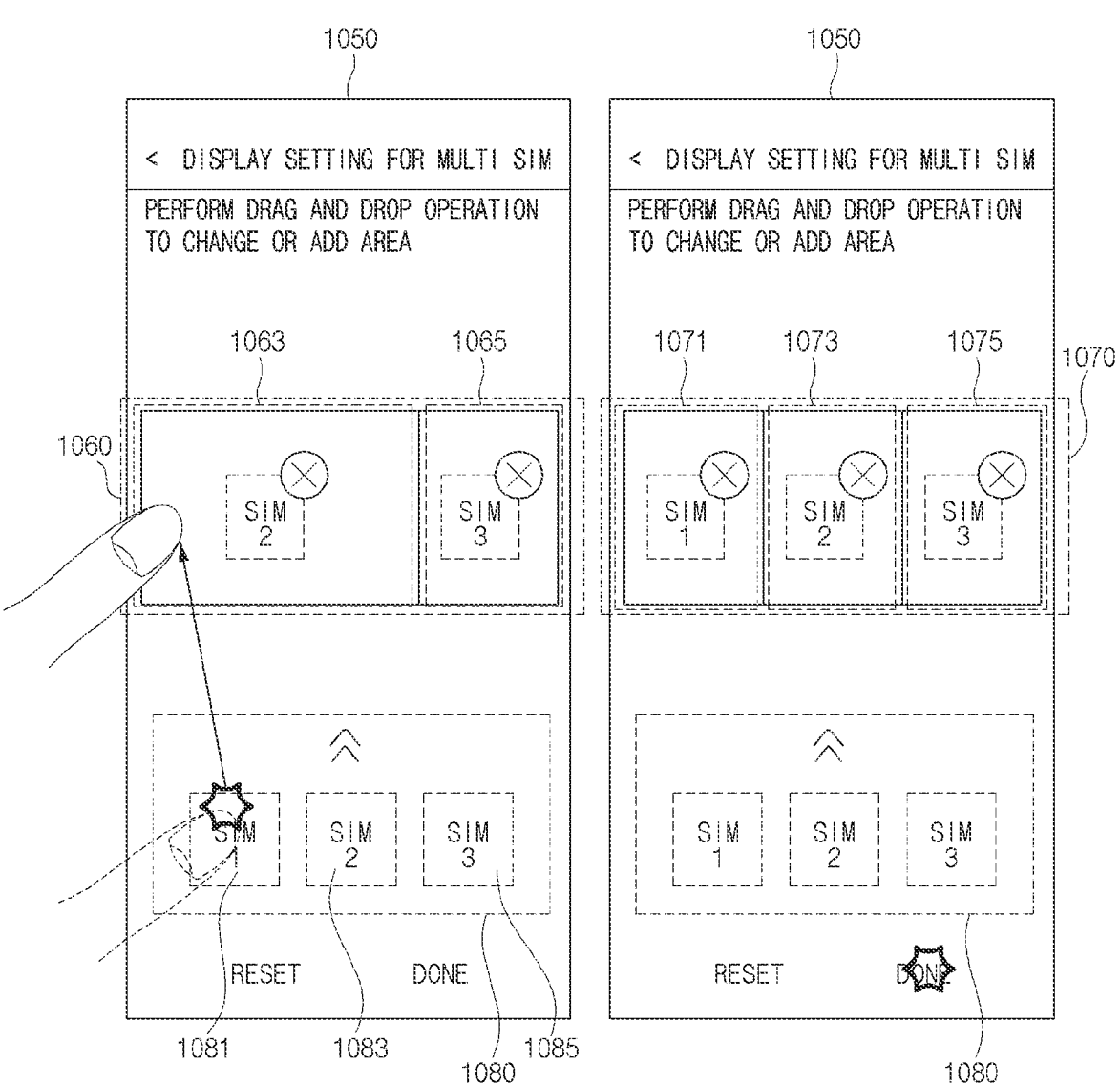

FIGS. 10A and 10B illustrate examples of a SIM setting screen of an electronic device, according to various embodiments. Hereinafter, descriptions identical to those of FIGS. 8A to 8C will be omitted or briefly described.

According to an embodiment, an electronic device (e.g., the electronic device 101 in FIG. 1 or the electronic device 200 in FIG. 2) may provide SIM setting screens 1010 and 1050 for setting an area of a flexible display (e.g., the display module 160 in FIG. 1 or the flexible display 210 in FIG. 2) for each SIM (e.g., the SIM 196 of FIG. 1 or the SIM 220 of FIG. 2) included in the electronic device.

Referring to FIG. 10A, an area 1020 for setting a flexible display area corresponding to each SIM of the SIM setting screen 1010 may include areas 1021 and 1025 including SIM information set in the divided area of the flexible display. For example, each of the areas 1021 and 1025 including the set SIM information may include buttons 1023 and 1027 for canceling the setting of the corresponding SIM. For example, when a user input is received on a button (e.g., the button 1027) of an area where the second SIM is set, the second SIM set in the corresponding area may be released, and the entire area of the flexible display may be set as an area corresponding to the unreleased first SIM. E.g., see 1030 in FIG. 10A.

Referring to FIG. 10B, an area 1080 indicating SIM information of an electronic device included in the SIM setting screen 1050 may include an icon 1081 corresponding to the first SIM included in the electronic device, an icon 1083 corresponding to the second SIM, and an icon 1085 corresponding to a third SIM. For example, the electronic device may set the SIM corresponding to the dragged icon in the corresponding area of the flexible display based on a user input for dragging an icon included in the area 1080 indicating SIM information to areas 1060 and 1070 indicating the set SIM state. For example, the area 1060 indicating the set SIM state before a SIM setting change may indicate the state of the SIM set in each area of the current flexible display. For example, the area 1060 indicating the set SIM state before the SIM setting change may include an area 1063 indicating that the second SIM is set in the left and center areas of the flexible display, and an area 1065 indicating that the third SIM is set in the right area of the flexible display. For example, when the icon 1081 corresponding to the first SIM is dragged to the left side of the area 1063 based on a user input, the first SIM may be set in the corresponding area. For example, the area 1070 indicating the set SIM state after the SIM setting change may be displayed after an area 1071 indicating that the first SIM is set to the left area of the flexible display is added, in response to dragging the icon 1081 corresponding to the first SIM. For example, the area 1070 indicating the set SIM state after the SIM configuration change may include the area 1071 indicating that the first SIM is set in the left area of the flexible display, an area 1073 indicating that the second SIM is set in the center area, and an area 1075 indicating that the third SIM is set in the right area.

According to various embodiments, the SIM setting screens 1010 and 1050 shown in FIGS. 10A and 10B are examples and are not limited thereto. The configuration and placement of the SIM setting screens 1010 and 1050 may be changed.

Figure 11:
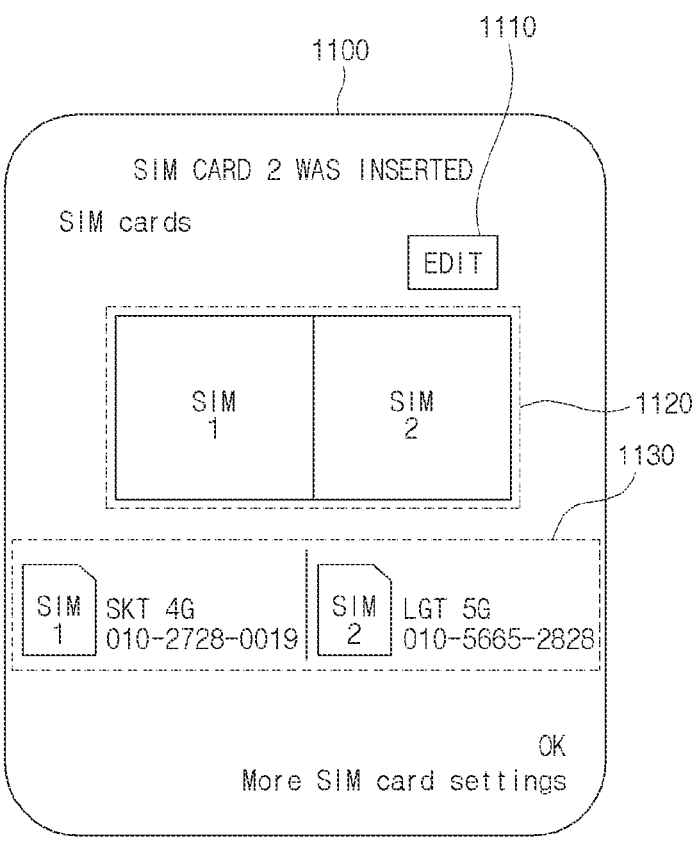
FIG. 11 is a diagram for describing an operation of an electronic device, according to an example embodiment.

FIG. 11 is a diagram for describing an operation of an electronic device, according to an embodiment. Hereinafter, descriptions identical to those of FIGS. 8A to 8C, 9A to 9C, and 10A and 10B will be omitted or briefly described.

According to an embodiment, when a new SIM is added to electronic device or an existing SIM is removed, the electronic device (e.g., the electronic device 101 in FIG. 1 or the electronic device 200 in FIG. 2) may provide a SIM setting screen 1100 (e.g., the SIM setting screens 810, 820, and 830 of FIGS. 8A to 8C, the SIM setting screens 910, 920, and 930 of FIGS. 9A to 9C, or the SIM setting screens 1010 and 1050 of FIGS. 10A and 10B) for setting an area of a flexible display for each SIM included in the electronic device.

According to an embodiment, the SIM setting screen 1100 may include a button 1110 for editing SIM settings, an area 1120 indicating information of the flexible display area for each SIM currently set, and an area 1130 indicating information of a SIM included in the electronic device. According to an embodiment, the SIM setting screen may include information indicating that a new SIM has been added or an existing SIM has been removed.

According to an embodiment, the electronic device may provide the SIM setting screen 1100 for setting an area of a flexible display for each SIM included in the electronic device based on the location or situation of the electronic device. For example, when a region (e.g., country) where the electronic device is located is changed, the electronic device may output the SIM setting screen 1100 together with the information of the SIM available in the changed region.

According to various embodiments, the SIM setting screen 1100 shown in FIG. 11 is an example and is not limited thereto. The configuration and placement of the SIM setting screen 1100 may be changed.

Figure 12A:
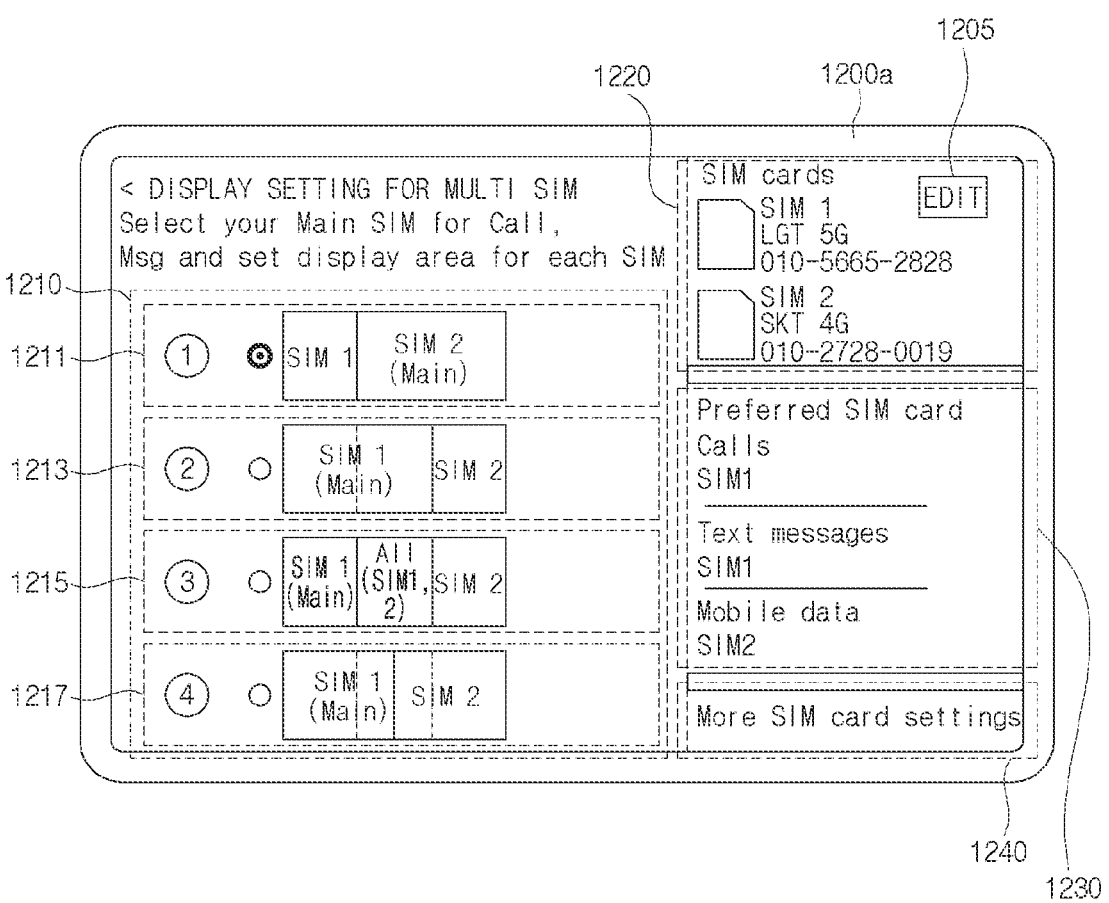
FIGS. 12A and 12B illustrate examples of a SIM setting screen of an electronic device, according to various example embodiments.
Figure 12B:
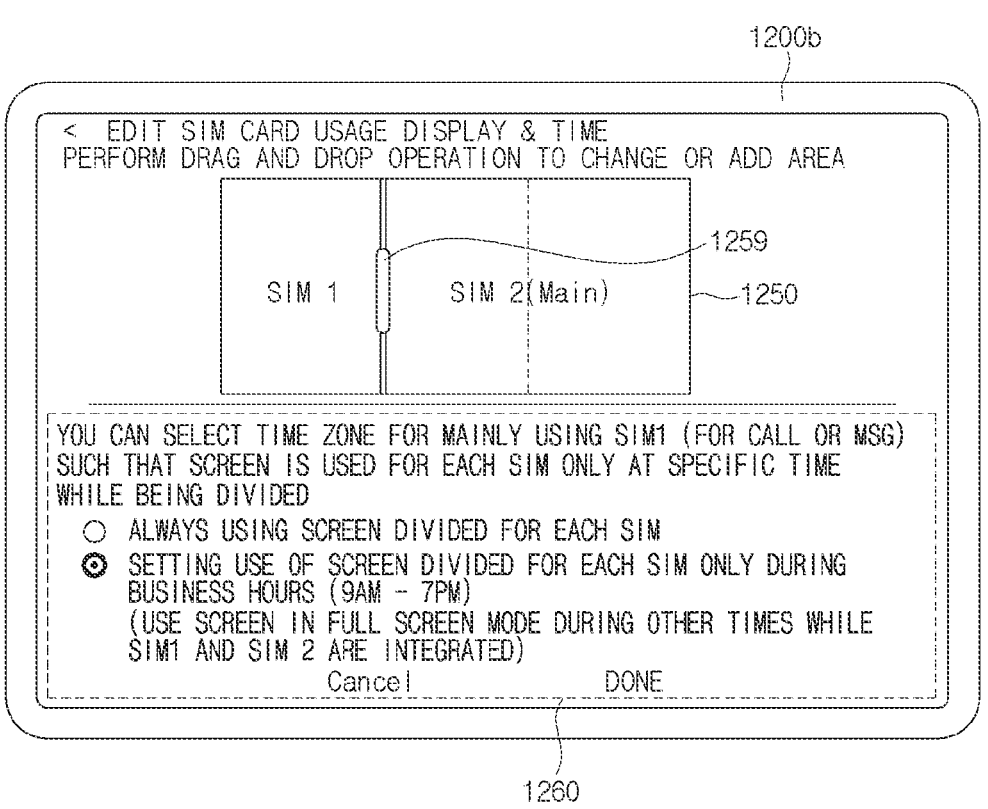

FIGS. 12A and 12B illustrate examples of a SIM setting screen of an electronic device, according to various embodiments. Hereinafter, descriptions identical to those of FIGS. 8A to 8C, 9A to 9C, 10A and 10B, and 11 will be omitted or briefly described.

According to an embodiment, an electronic device (e.g., the electronic device 101 in FIG. 1 or the electronic device 200 in FIG. 2) may provide SIM setting screens 1200a and 1200b for setting an area of a flexible display for each SIM (e.g., the SIM 196 of FIG. 1 or the SIM 220 of FIG. 2) included in the electronic device.

Referring to FIG. 12A, the SIM setting screen 1200a may include a button 1205 for editing SIM settings, an area 1210 indicating an available SIM setting form, an area 1220 indicating SIM information included in the electronic device, an area 1230 indicating information of major functions of the electronic device and preferred SIM for each function, and an area 1240 for detailed settings for a SIM card.

For example, the area 1210 indicating an available SIM setting form may provide available SIM setting forms 1211, 1213, 1215, 1217 depending on a SIM (e.g., a first SIM and a second SIM) included in the current electronic device, and may set an area corresponding to each SIM in the flexible display in a form selected depending on a user input. For example, the flexible display may be divided into three areas: the left area, the center area, and the right area. In this case, the first form 1211 indicates a form in which the left area of the flexible display is set as an area corresponding to the first SIM, and the center and right areas thereof are set as an area corresponding to the second SIM; the second form 1213 indicates a form in which the left and center areas of the flexible display are set as an area corresponding to the first SIM and the right area thereof is set as an area corresponding to the second SIM; the third form 1215 indicates a form in which the left area of the flexible display is set as an area corresponding to the first SIM, the center area thereof is set as a common use area (e.g., the area corresponding to the first SIM and second SIM), and the right area thereof is set as an area corresponding to the second SIM; and the fourth form 1217 indicates a form in which half of the left area of the flexible display is set as an area corresponding to the first SIM and half of the right area thereof is set as an area corresponding to the second SIM. For example, the electronic device may set an area of the flexible display corresponding to each SIM based on a user input for selecting one of the first to fourth forms 1211, 1213, 1215, and 1217.

For example, the electronic device may activate the SIM setting screen 1200b of FIG. 12B based on the user input received through the button 1205. For example, the electronic device may change the main functions of the electronic device and settings of the preferred SIM for each function based on the user input received in the area 1240 for detailed settings for the SIM card.

Referring to FIG. 12B, the SIM setting screen 1200b may include an area 1250 for setting the flexible display area for each SIM, and an interface 1260 for setting a conditions for identifying and using a display area for each SIM. For example, the area 1250 for setting the flexible display area for each SIM may include a UI item 1259 for adjusting the size of the area of the flexible display for each set SIM. According to an embodiment, the SIM setting screen 1200b may include the interface 1260 for selecting whether to identify and use the area of the flexible display for each SIM depending on the time, place, and/or function. For example, the electronic device may be configured to selectively identify and use the area of the flexible display for each SIM only for a specific time, specific place, or specific function based on a user input through the interface 1260.

According to various embodiments, the SIM setting screens 1200a and 1200b shown in FIGS. 12A and 12B are examples and are not limited thereto. The configuration and placement of the SIM setting screens 1200a and 1200b may be changed.

FIGS. 13A to 13D illustrate examples of a screen displayed on a display according to setting an area corresponding to a SIM in an electronic device, according to various embodiments. For example, in FIGS. 13A to 13D, it is assumed that a flexible display (e.g., the display module 160 in FIG. 1 or the flexible display 210 in FIG. 2) of an electronic device (e.g., the electronic device 101 in FIG. 1 or the electronic device 200 in FIG. 2) is divided into three areas (a left area, a center area, and a right area) based on a form factor, and the electronic device includes a first SIM (e.g., the first SIM 221 in FIG. 2) and a second SIM (e.g., the second SIM 223 in FIG. 2), but example embodiments are not limited thereto.

Figure 13A:
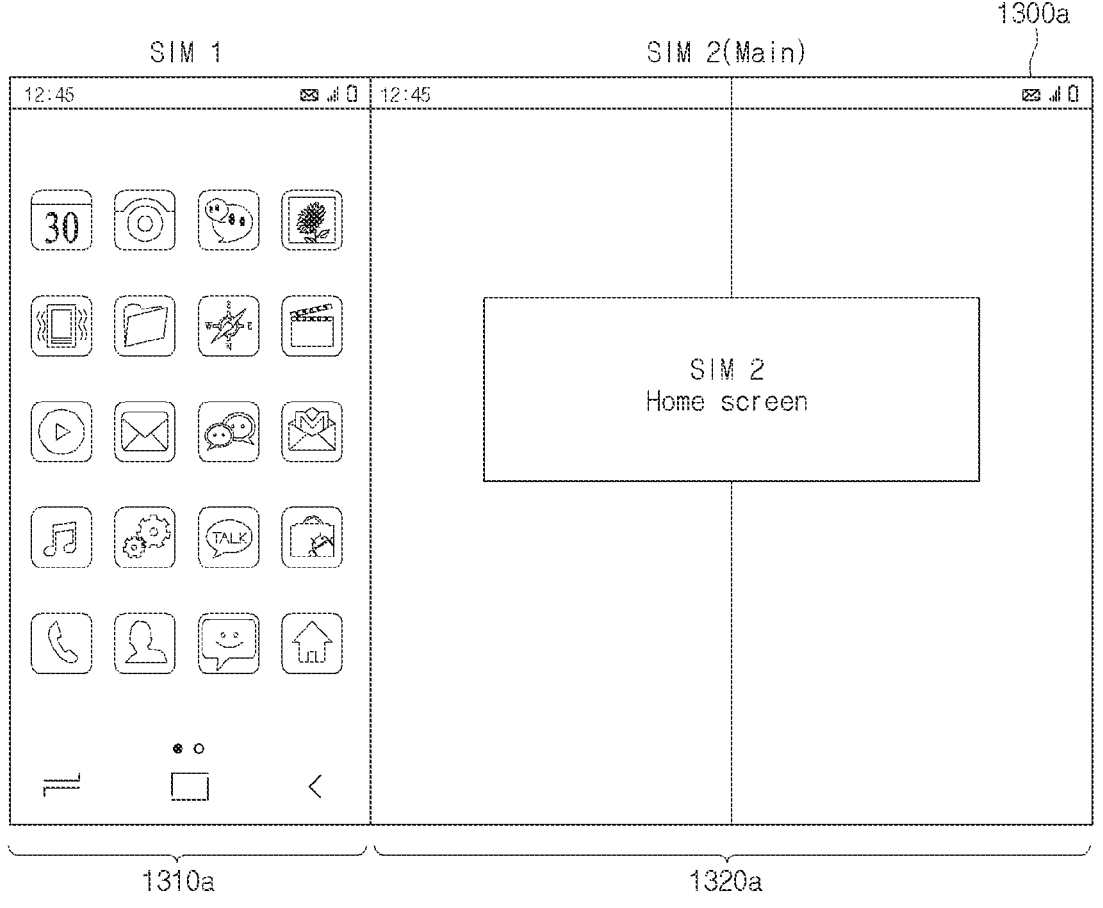

For example, FIG. 13A shows screen 1300a on which a left area 1310a of the flexible display is set as an area corresponding to the first SIM, and center and right areas 1320a are set as an area corresponding to the second SIM. For example, the electronic device may display a home screen corresponding to the first SIM in the area 1310a corresponding to the first SIM and may display a home screen corresponding to the second SIM in the area 1320a.

Figure 13B:
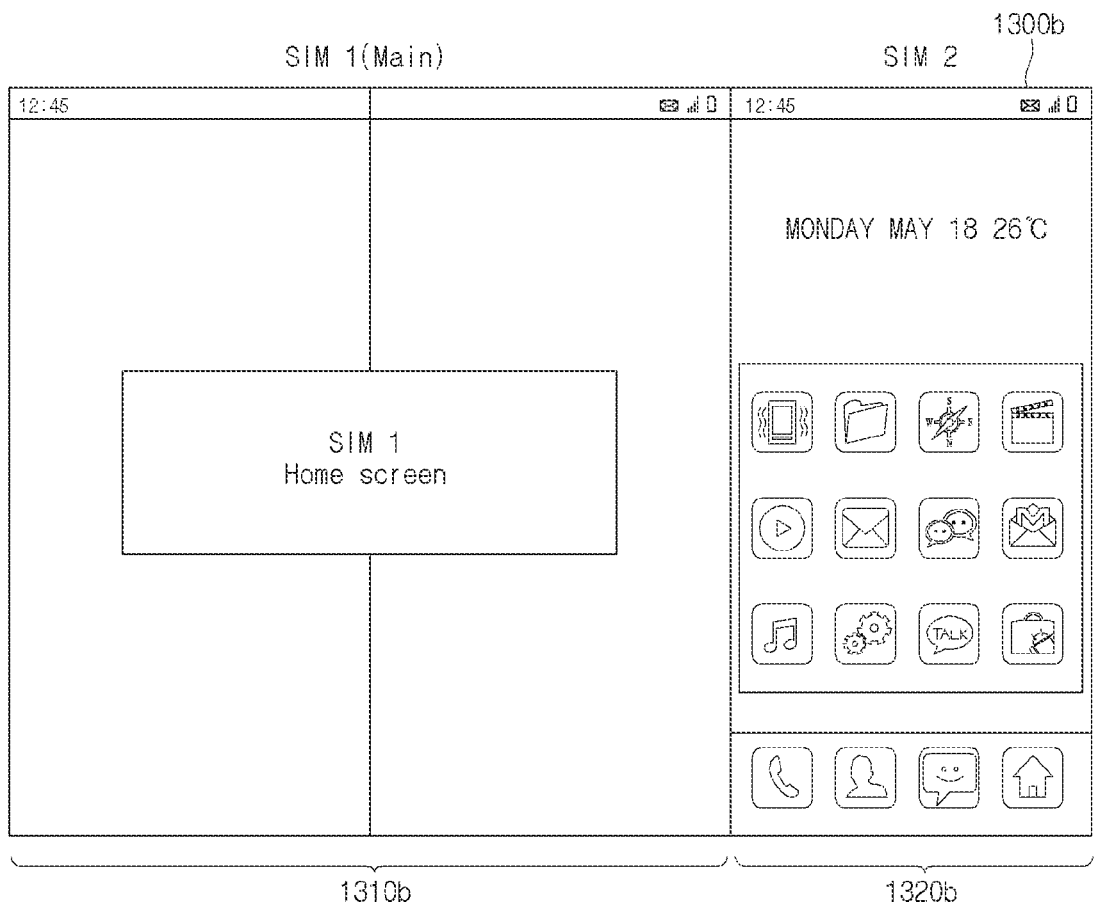

For example, FIG. 13B shows screen 1300b on which left and center areas 1310b of the flexible display are set as an area corresponding to the first SIM, and a right area 1320b is set as an area corresponding to the second SIM. For example, the electronic device may display a home screen corresponding to the first SIM in the area 1310b corresponding to the first SIM and may display a home screen corresponding to the second SIM in the area 1320b.

For example, FIG. 13C shows screen 1300c on which a left area 1310c of the flexible display is set as the area corresponding to the first SIM, a right area 1320c is set as an area corresponding to the second SIM, and a center area 1330c is set as a common use area of the first SIM and the second SIM. For example, the electronic device may display a home screen corresponding to only the first SIM in the area 1310c corresponding to the first SIM, may display a home screen corresponding to only the second SIM in the area 1320c corresponding to the second SIM, and may display a home screen corresponding to both the first SIM and the second SIM in the common use area 1330c. For example, the electronic device may display a home screen including only an application corresponding to the first SIM in the area 1310c corresponding to the first SIM, except for an application capable of being used in common between the first SIM and the second SIM; the electronic device may display a home screen including only an application corresponding to the second SIM in the area 1320c corresponding to the second SIM, except for an application capable of being used in common between the first SIM and the second SIM; and, the electronic device may display a home screen including an application commonly used by the first SIM and the second SIM in the common use area 1330c. According to an embodiment, as illustrated in FIG. 13C, in a state where a flexible display is contracted (e.g., a state in which only the center area of the flexible display is activated), the common use area 1330c positioned in the middle may be used as an area of either the first SIM or the second SIM depending on a direction in which the flexible display extends. For example, when the area 1310c corresponding to the first SIM is expanded in a state where the flexible display is fully contracted, the electronic device may use both the left area 1310c and the common use area 1330c of the flexible display as a screen corresponding to the first SIM. When the area 1320c corresponding to the second SIM is expanded in a state where the flexible display is fully contracted, the electronic device may use both the right area 1320c and the common use area 1330c of the flexible display as a screen corresponding to the second SIM.

For example, FIG. 13D shows screen 1300d on which half of a left area 1310d of the flexible display is set as an area corresponding to the first SIM, and half of a right area 1320d is set as an area corresponding to the second SIM. For example, the area of the flexible display corresponding to each SIM may be set differently from a form factor of the flexible display. For example, even when the flexible display has a form factor capable of being divided into a left area, a center area, and a right area depending on the expansion or contraction (e.g., folding or unfolding) of the flexible display, an area corresponding to each SIM may be set as half of the left area 1310d or half of the right area 1320d of the flexible display differently from the form factor. For example, the electronic device may display a home screen corresponding to the first SIM in the area 1310d corresponding to the first SIM and may display a home screen corresponding to the second SIM in the area 1320d corresponding to the second SIM.

Figure 14:
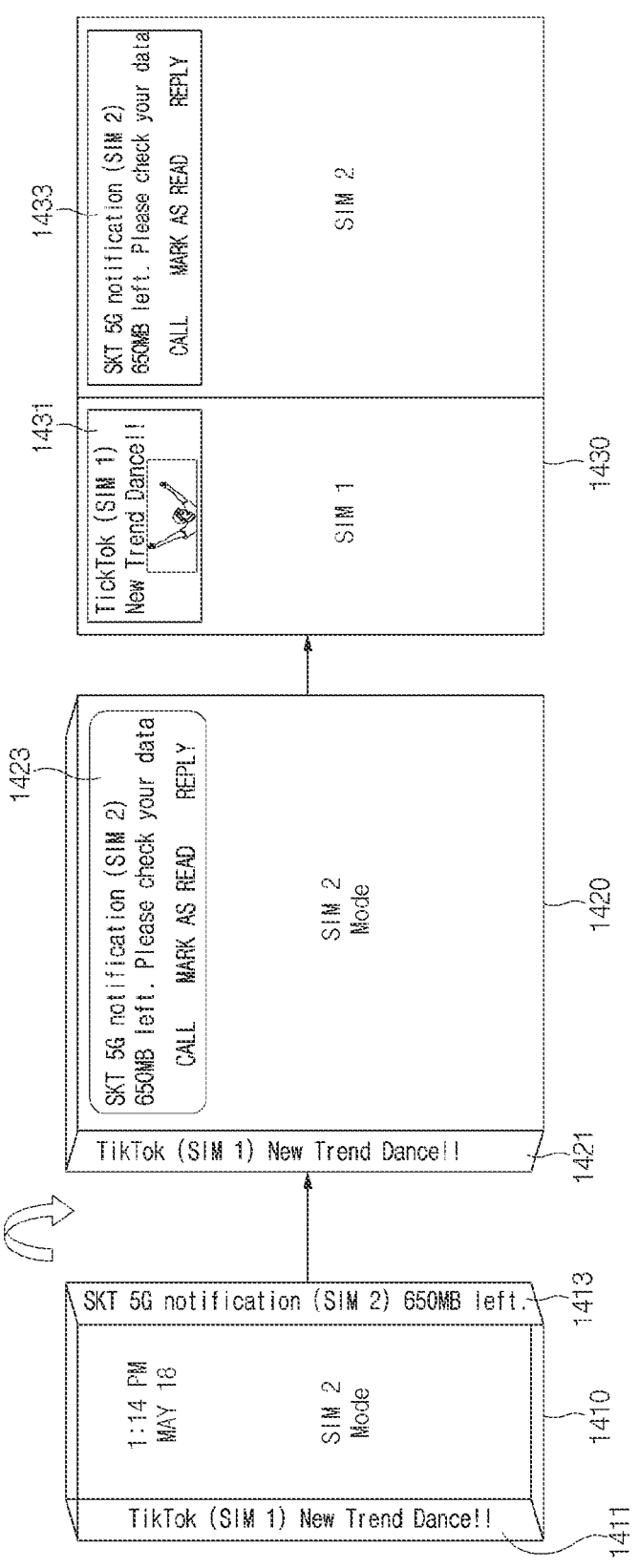
FIG. 14 is a diagram for describing an operation of an electronic device, according to an example embodiment.

FIG. 14 is a diagram for describing an operation of an electronic device, according to an embodiment. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display. For example, FIG. 14 shows that a left folding area of a flexible display (e.g., the display module 160 in FIG. 1 or the flexible display 210 in FIG. 2) of an electronic device (e.g., the electronic device 101 in FIG. 1 or the electronic device 200 in FIG. 2) is set as an area corresponding to the first SIM (e.g., the first SIM 221 in FIG. 2), and a center area and a right folding area thereof are set as an area corresponding to the second SIM (e.g., the second SIM 223 in FIG. 2).

For example, referring to reference numeral 1410, while the flexible display is contracted, the electronic device may provide a notification 1411 related to the first SIM and a notification 1413 related to the second SIM. For example, the electronic device may provide the notification 1411 related to the first SIM to a specified area (e.g., a left edge area) near a contracted boundary of an area corresponding to the first SIM, and may provide the notification 1413 related to the second SIM to a specified area (e.g., a right edge area) near a boundary where a portion of an area corresponding to the second SIM is contracted.

For example, referring to reference numeral 1420, when a portion of an area corresponding to the reduced second SIM is expanded, the electronic device may provide a quick panel 1423 corresponding to a notification related to the second SIM while maintaining a notification 1421 related to the first SIM near the boundary of the contracted area corresponding to the first SIM.

For example, referring to reference numeral 1430, when the contracted area corresponding to the first SIM is expanded, the electronic device may provide a quick panel 1431 corresponding to a notification related to the first SIM while maintaining the quick panel 1433 corresponding to a notification related to the second SIM.

Figure 15A:
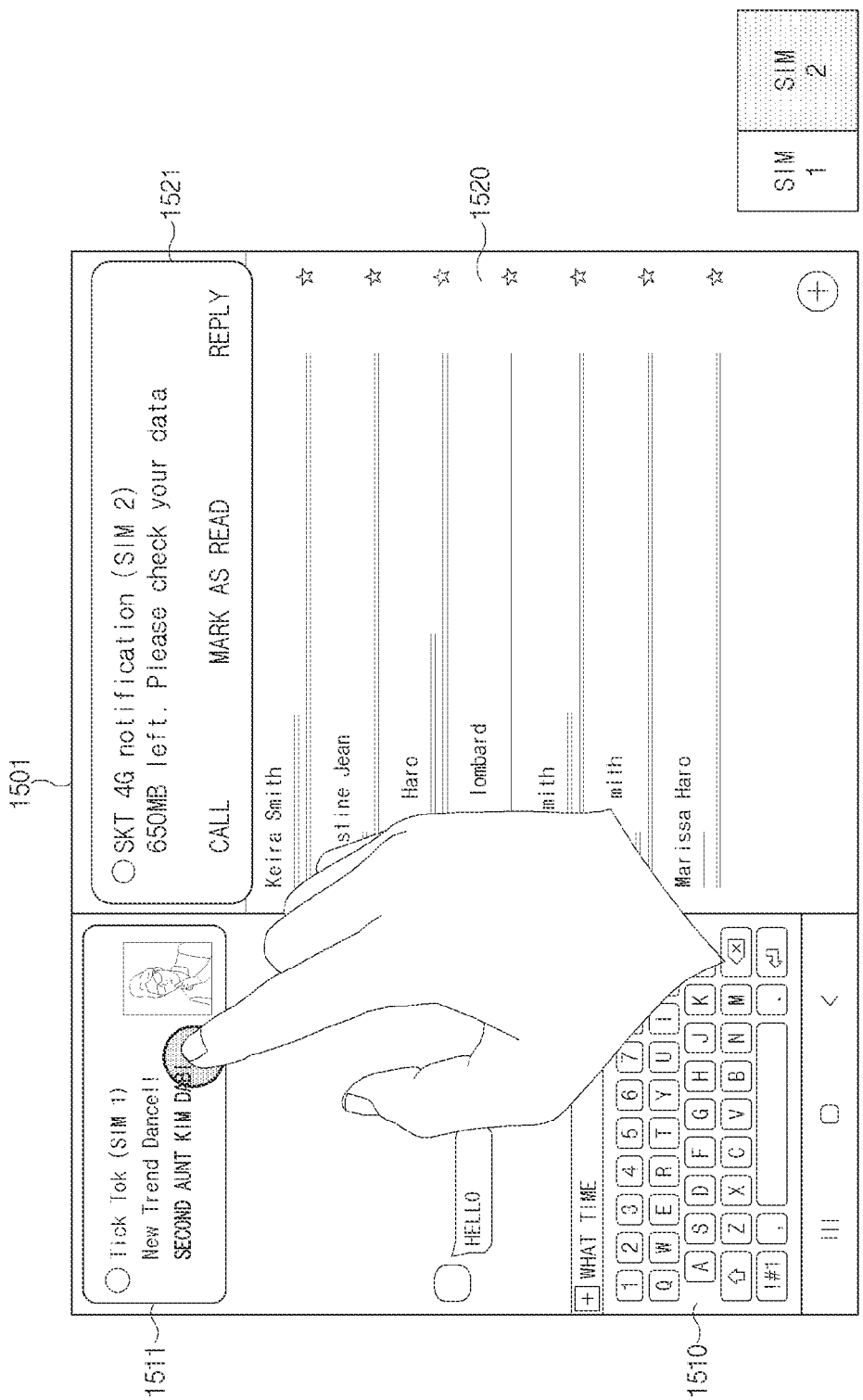
FIGS. 15A to 15C are diagrams for describing an operation of an electronic device, according to an example embodiment.
Figure 15B:
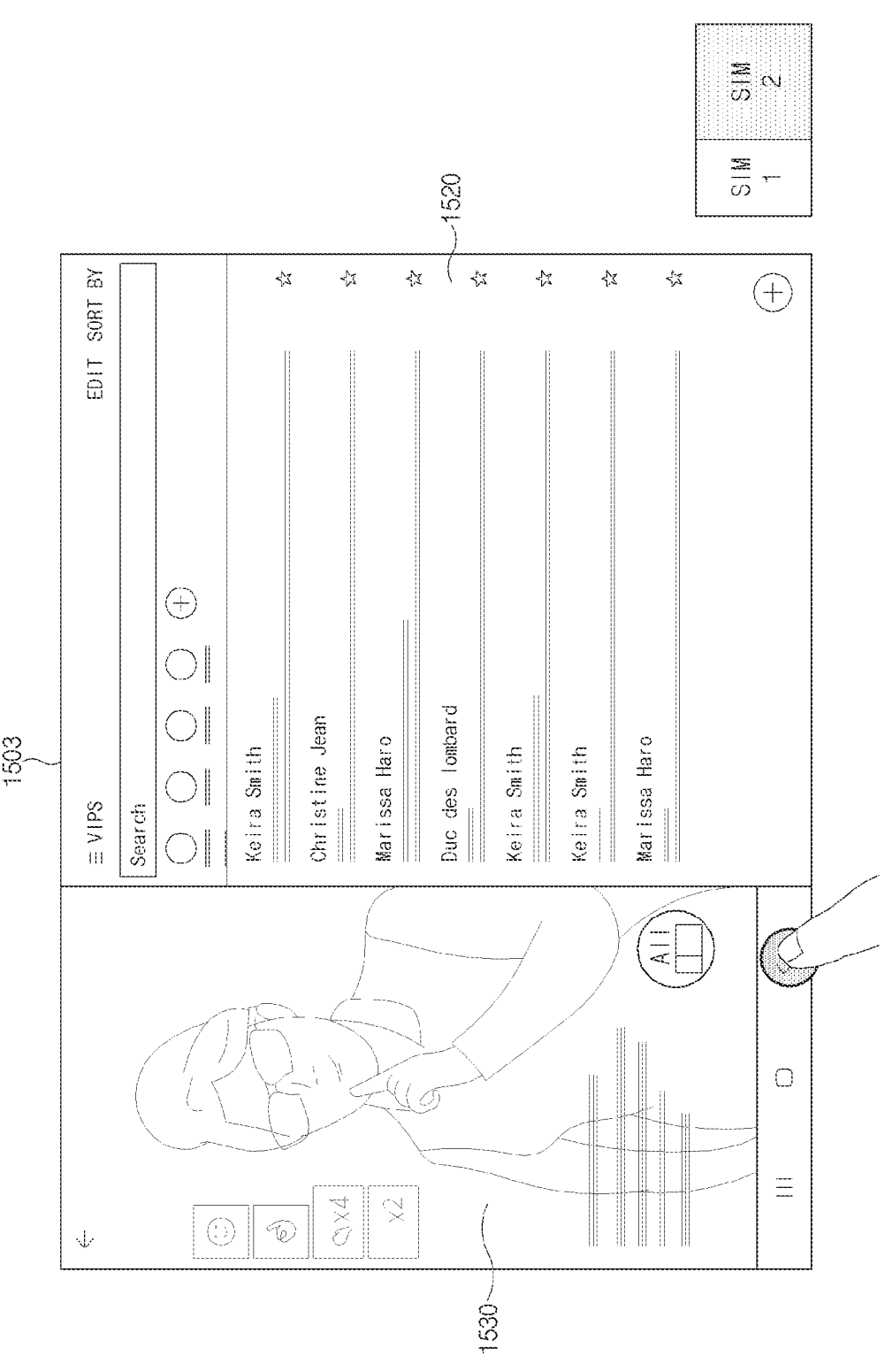
Figure 15C:
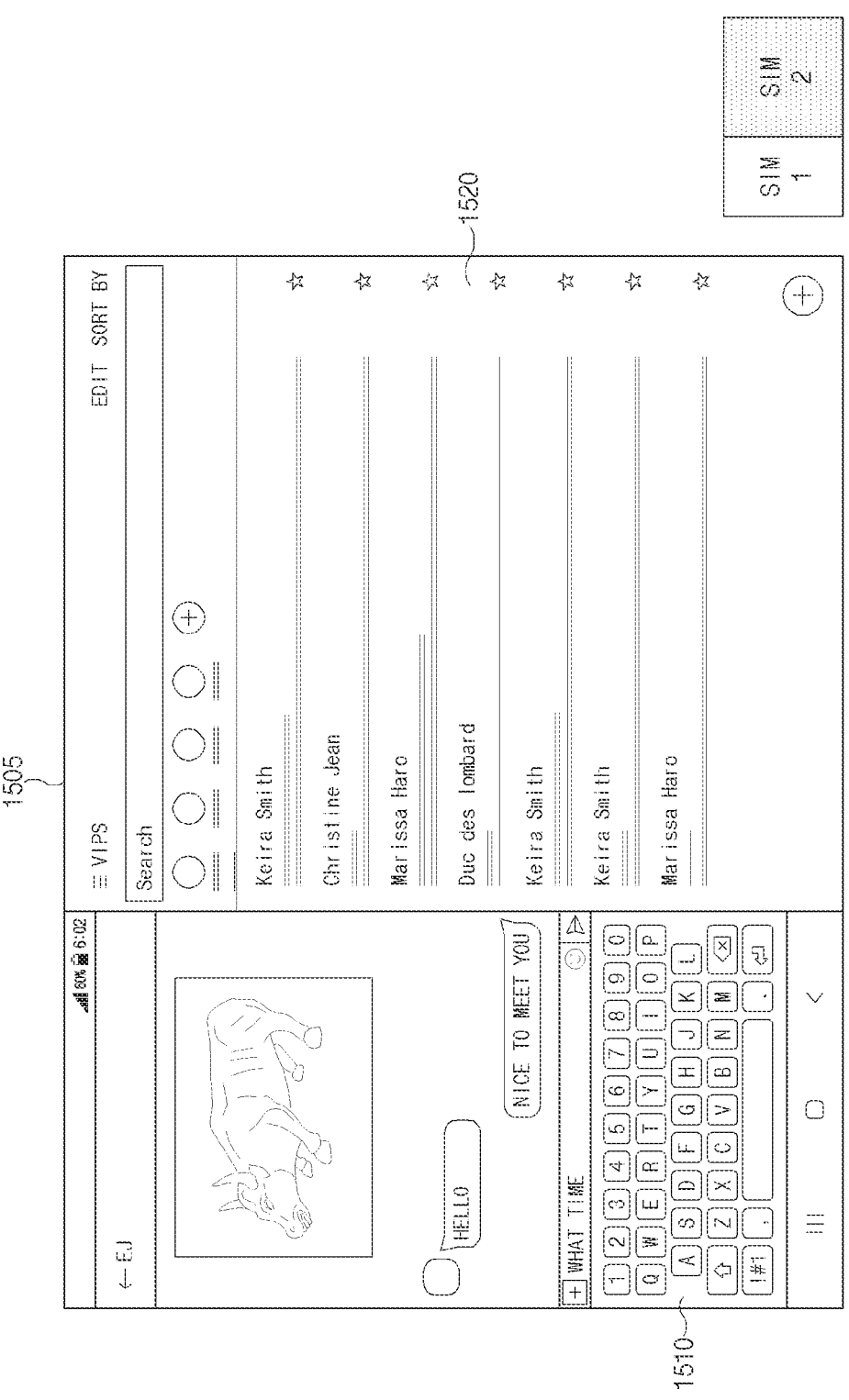

FIGS. 15A to 15C are diagrams for describing an operation of an electronic device, according to an embodiment. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

Referring to FIG. 15A, according to an embodiment, in a state where a flexible display (e.g., the display module 160 in FIG. 1 or the electronic device 210 in FIG. 2) is fully unfolded, an electronic device (e.g., the electronic device 101 in FIG. 1 or the electronic device 200 in FIG. 2) may execute a first application in an area corresponding to a first SIM (e.g., the first SIM 221 in FIG. 2) based on the first SIM, and may execute a second application in an area corresponding to a second SIM (e.g., the second SIM 223 in FIG. 2) based on the second SIM. For example, the electronic device may display a screen 1501 including an execution screen 1510 of the first application and an execution screen 1520 of the second application on a flexible display.

According to an embodiment, when receiving a first notification related to the first SIM, the electronic device may output a first notification in a form of a first quick panel 1511 to an area corresponding to the first SIM. When receiving a second notification related to the second SIM, the electronic device may output a second notification in a form of a second quick panel 1521 to an area corresponding to the second SIM.

According to an embodiment, when receiving a user input on the notification, the electronic device may display an execution screen of an application corresponding to the notification in the corresponding area. For example, referring to FIG. 15B, while maintaining the execution screen 1520 of a second application in the area corresponding to the second SIM, the electronic device may change the execution screen 1510 of the first application displayed in the area corresponding to the first SIM to an execution screen 1530 of a third application corresponding to a first notification on the basis of receiving a user input on the first quick panel 1511. For example, the electronic device may display a screen 1503 including the execution screen 1530 of the third application and the execution screen 1520 of the second application on a flexible display. According to an embodiment, the electronic device may remove the first quick panel 1511 or the second quick panel 1521 from the flexible display after a specified time elapses. According to an embodiment, when the electronic device performs continuous tasks by using the first application or the electronic device is performing an important task by using the first application (e.g., during a video call, during watching a video, or during writing a document or email), the electronic device may at least temporarily display the execution screen 1530 of the third application through an area corresponding to the second SIM while maintaining the execution screen 1510 of the first application.

According to an embodiment, the electronic device may independently operate applications executed (displayed) in an area corresponding to the first SIM and an area corresponding to the second SIM. For example, referring to FIG. 15C, when the electronic device receives a user input for displaying a previous screen (a previous application) from a user after displaying the execution screen of the third application, the electronic device may change the execution screen 1530 of the third application displayed in the area corresponding to the first SIM into the execution screen 1510 of the first application. For example, the electronic device may display a screen 1505 including the execution screen 1510 of the first application and the execution screen 1520 of the second application on the flexible display again.

Figure 16A:
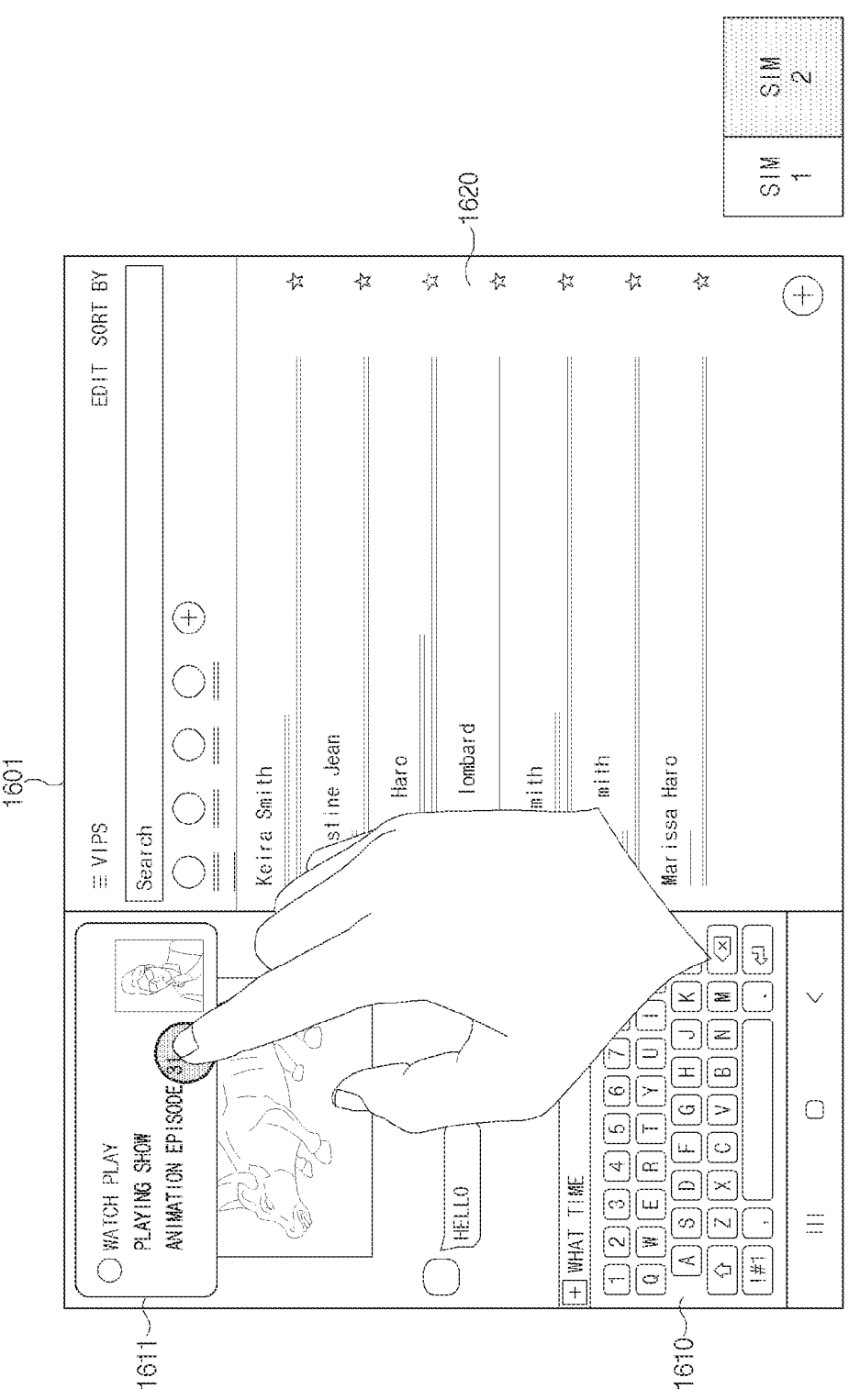
FIGS. 16A to 16C are diagrams for describing an operation of an electronic device, according to an example embodiment.
Figure 16B:
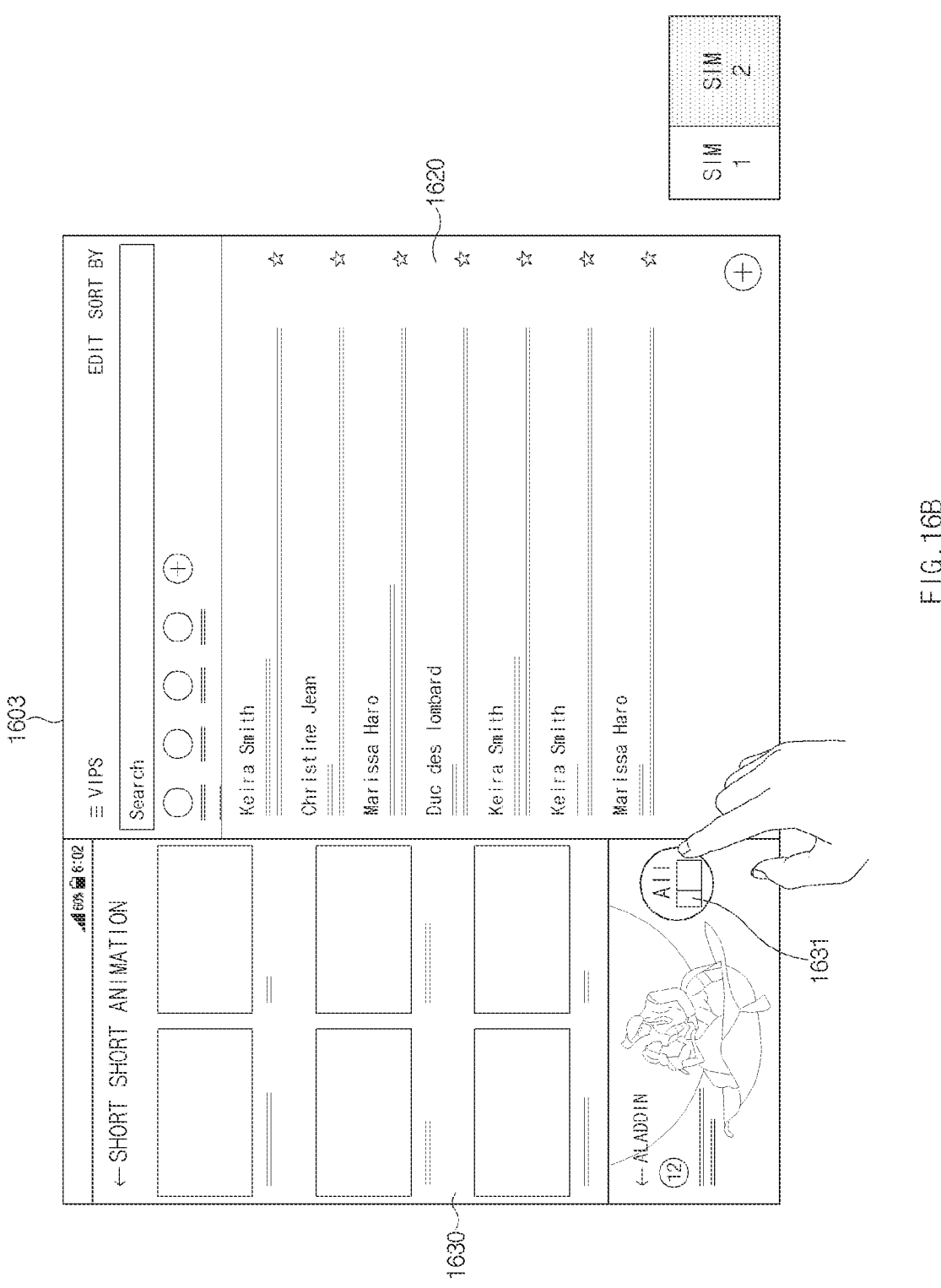
Figure 16C:
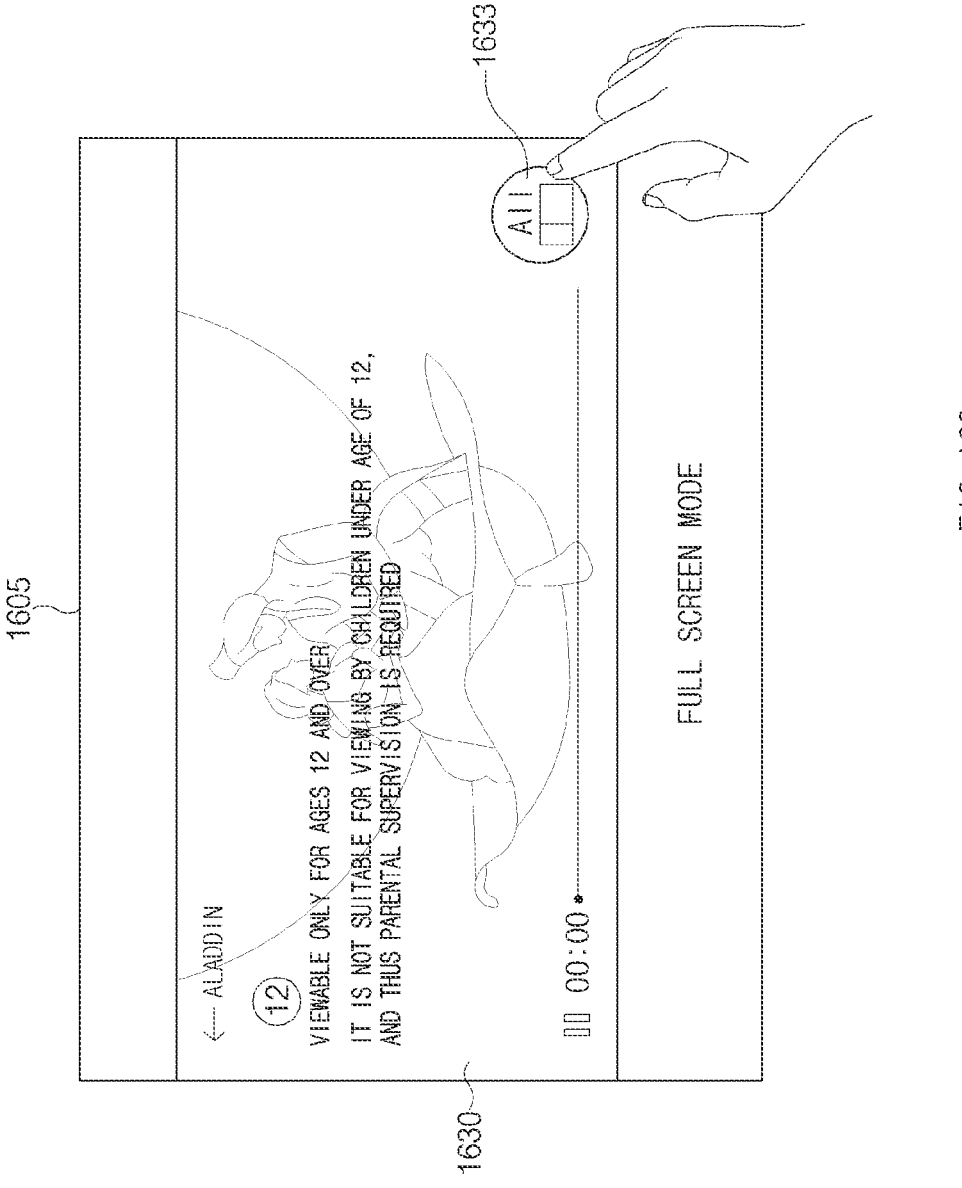

FIGS. 16A to 16C are diagrams for describing an operation of an electronic device, according to an embodiment. Hereinafter, descriptions identical to those of FIGS. 15A to 15C will be omitted or briefly described. Hereinafter, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

Referring to FIG. 16A, according to an embodiment, in a state where a flexible display (e.g., the display module 160 in FIG. 1 or the electronic device 210 in FIG. 2) is fully unfolded, an electronic device (e.g., the electronic device 101 in FIG. 1 or the electronic device 200 in FIG. 2) may execute the first application in the area corresponding to a first SIM (e.g., the first SIM 221 in FIG. 2) based on the first SIM, and may execute a second application in an area corresponding to a second SIM (e.g., the second SIM 223 in FIG. 2) based on the second SIM. For example, the electronic device may display a screen 1601 including an execution screen 1610 of the first application and an execution screen 1620 of the second application on a flexible display. According to an embodiment, when receiving the first notification related to the first SIM, the electronic device may output a first notification in a form of a quick panel 1611 to an area corresponding to the first SIM.

According to an embodiment, when receiving a user input on the notification, the electronic device may display an execution screen of an application corresponding to the notification in the corresponding area. For example, referring to FIG. 16B, while maintaining the execution screen 1620 of a second application in the area corresponding to the second SIM, the electronic device may change the execution screen 1610 of the first application displayed in the area corresponding to the first SIM to an execution screen 1630 of a third application corresponding to a first notification on the basis of receiving a user input on the quick panel 1611. For example, the electronic device may display a screen 1603 including the execution screen 1630 of the third application and the execution screen 1620 of the second application on a flexible display. According to an embodiment, when the execution screen displayed on the flexible display is changed, or the electronic device receives a user input (e.g., a touch input) on the execution screen, the electronic device may provide a user interface 1631 for displaying an execution screen being displayed as a full screen of the flexible display. For example, FIG. 16B illustrates that the user interface 1631 is displayed on the execution screen 1630 of the third application after the execution screen displayed in the area corresponding to the first SIM is changed from the execution screen 1610 of the first application to the execution screen 1630 of the third application.

For example, referring to FIG. 16C, when receiving a user input on the user interface 1631, the electronic device may at least temporarily display the execution screen 1630 of the third application, which has been displayed in the area corresponding to the first SIM, on a full screen 1605 of the flexible display. For example, the electronic device may at least temporarily set and use the whole flexible display as an area corresponding to the first SIM. According to an embodiment, the electronic device may provide a user interface 1633 for changing a screen to be in a previous state (e.g., a divided state) on the execution screen 1630 of the third application displayed as a full screen. For example, when receiving a user input on the user interface 1633, as shown in FIG. 16B, the electronic device may display the execution screen 1630 of the third application and the execution screen 1620 of the second application on the flexible display again. For example, the electronic device may identify and use a flexible display into an area corresponding to the first SIM and an area corresponding to the second SIM.

Figure 17A:
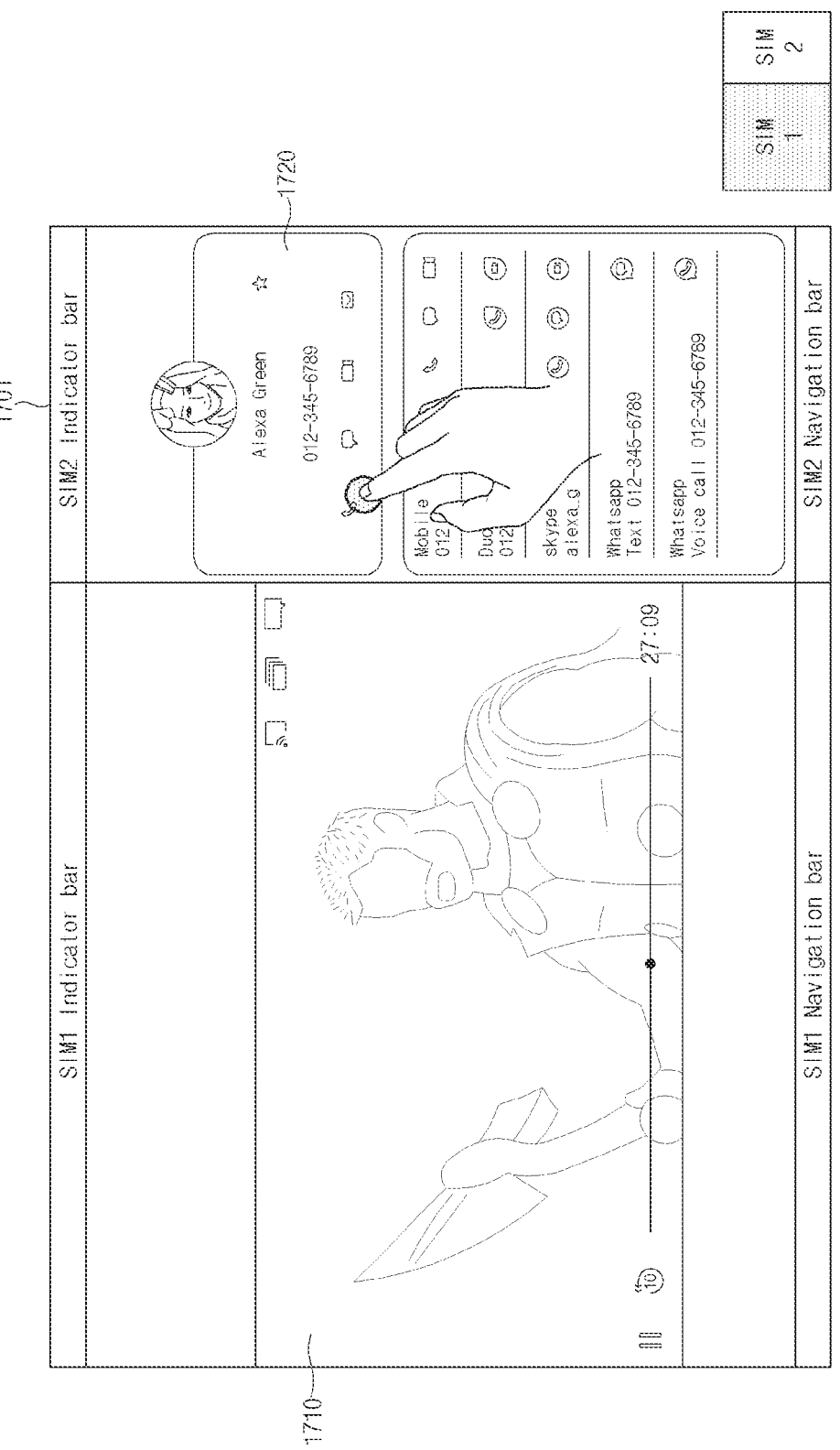
FIGS. 17A to 17C are diagrams for describing an operation of an electronic device, according to an example embodiment.
Figure 17B:
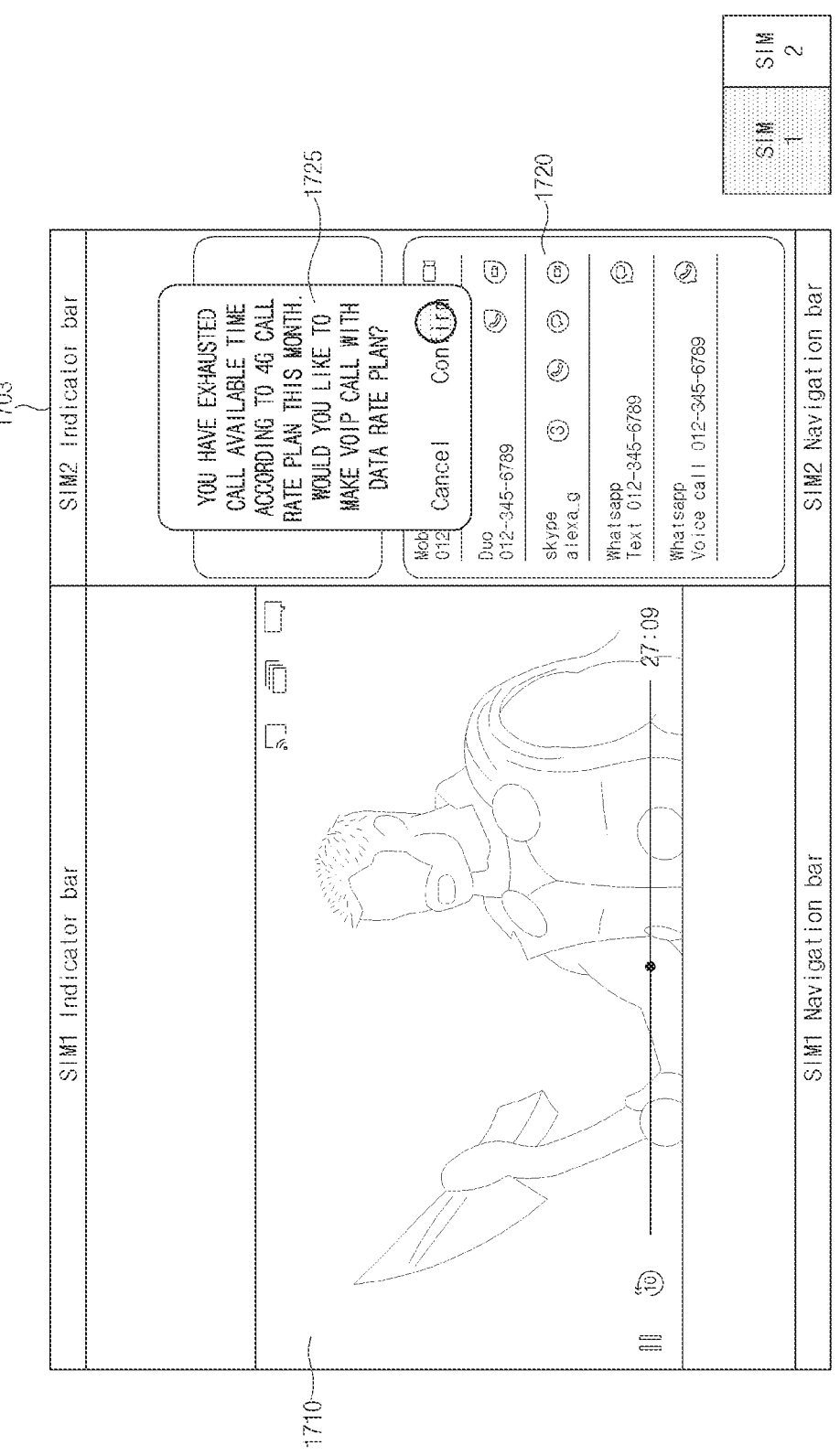
Figure 17C:
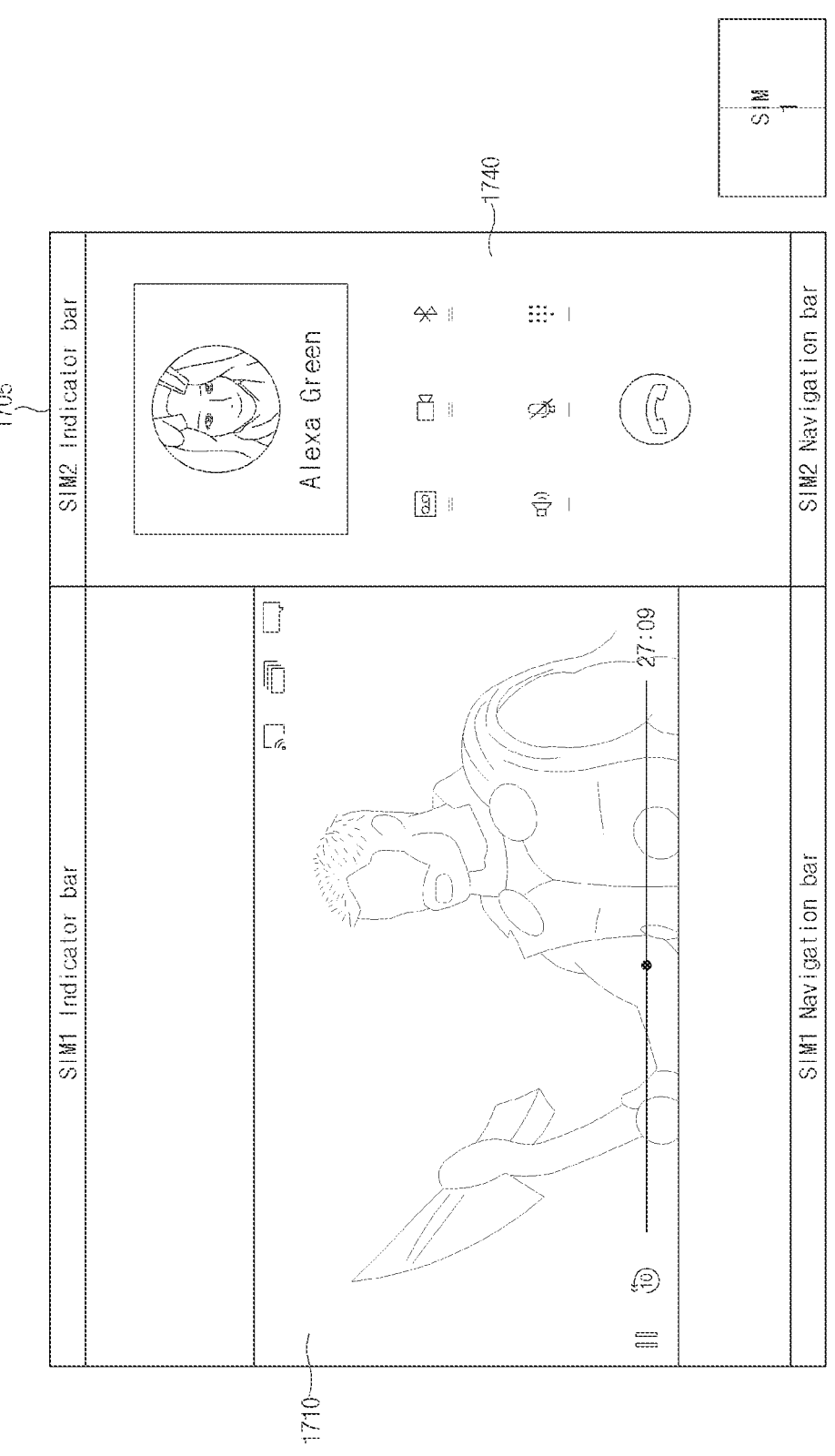

FIGS. 17A to 17C are diagrams for describing an operation of an electronic device, according to an embodiment.

According to an embodiment, an electronic device (e.g., the electronic device 101 in FIG. 1 or the electronic device 200 in FIG. 2) may execute a first application in an area corresponding to the first SIM (e.g., the first SIM 221 in FIG. 2) of a flexible display (e.g., the display module 160 in FIG. 1 or the flexible display 210 in FIG. 2) based on the first SIM, and may execute a second application in the area corresponding to the second SIM of the flexible display based on the second SIM (e.g., the second SIM 223 in FIG. 2). For example, referring to FIG. 17A, the electronic device may display a screen 1701 including an execution screen 1710 of the first application and an execution screen 1720 of the second application on a flexible display.

According to an embodiment, when the electronic device fails to perform a function related to a specific application by using the corresponding SIM, the electronic device may determine whether a function related to a specific application is capable of being performed by using another SIM, and may provide a user interface for identifying whether to use another SIM. For example, referring to FIG. 17B, when the electronic device fails to perform a call function of a second application by using a second SIM (e.g., a call available time according to a communication fee of the second SIM has completely been exhausted), the electronic device may provide a user interface 1725 for determining whether to perform a call function of the second application based on the first SIM.

According to an embodiment, the electronic device may perform a function of an application based on a user input received through the user interface 1725/1740. For example, referring to FIG. 17C, the electronic device may perform a call function of a second application based on the first SIM.

According to various embodiments, the execution screen and application shown in FIGS. 17A to 17C are examples and are not limited thereto.

Figure 18A:
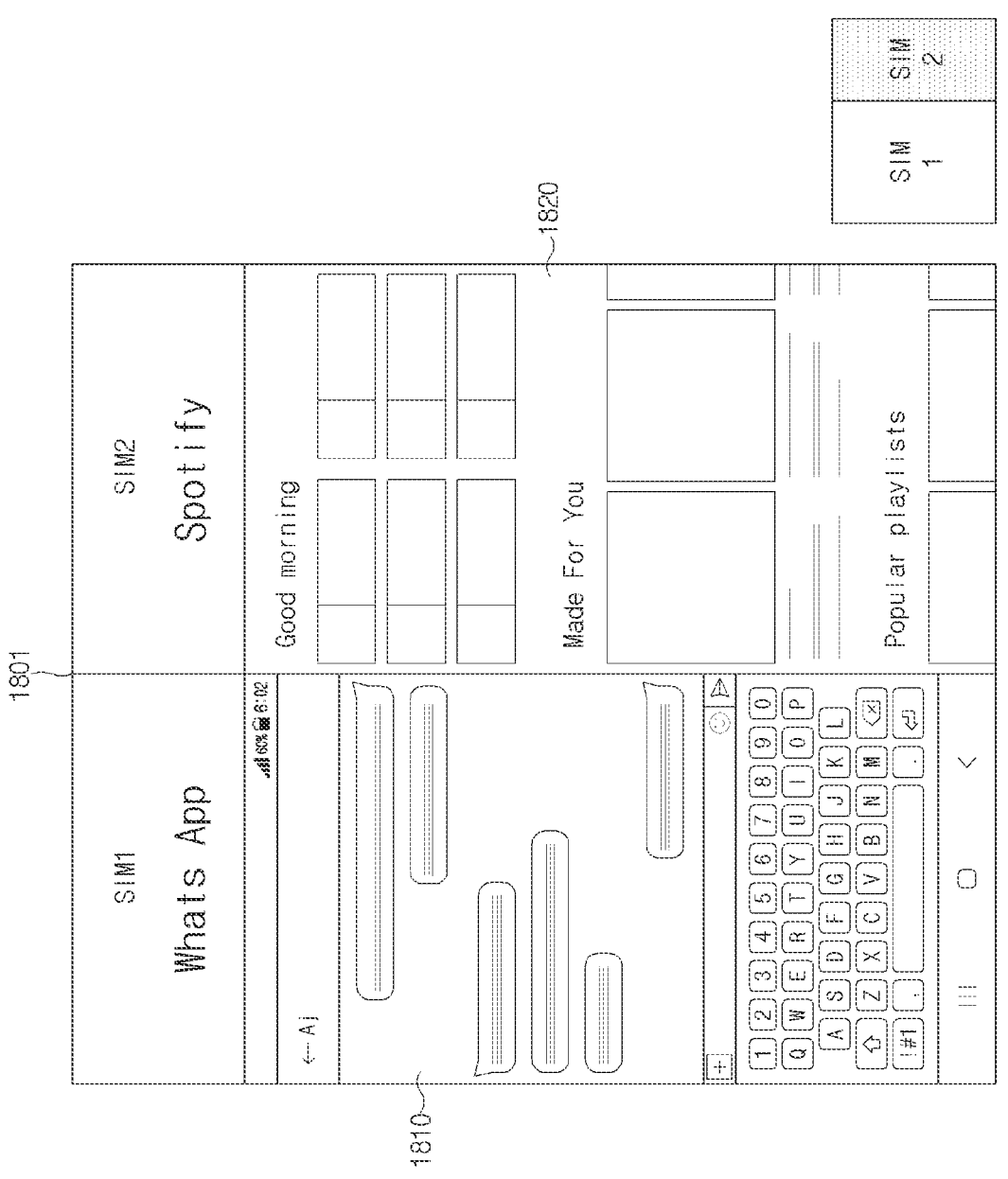
FIGS. 18A to 18C are diagrams for describing an operation of an electronic device, according to an example embodiment.
Figure 18B:
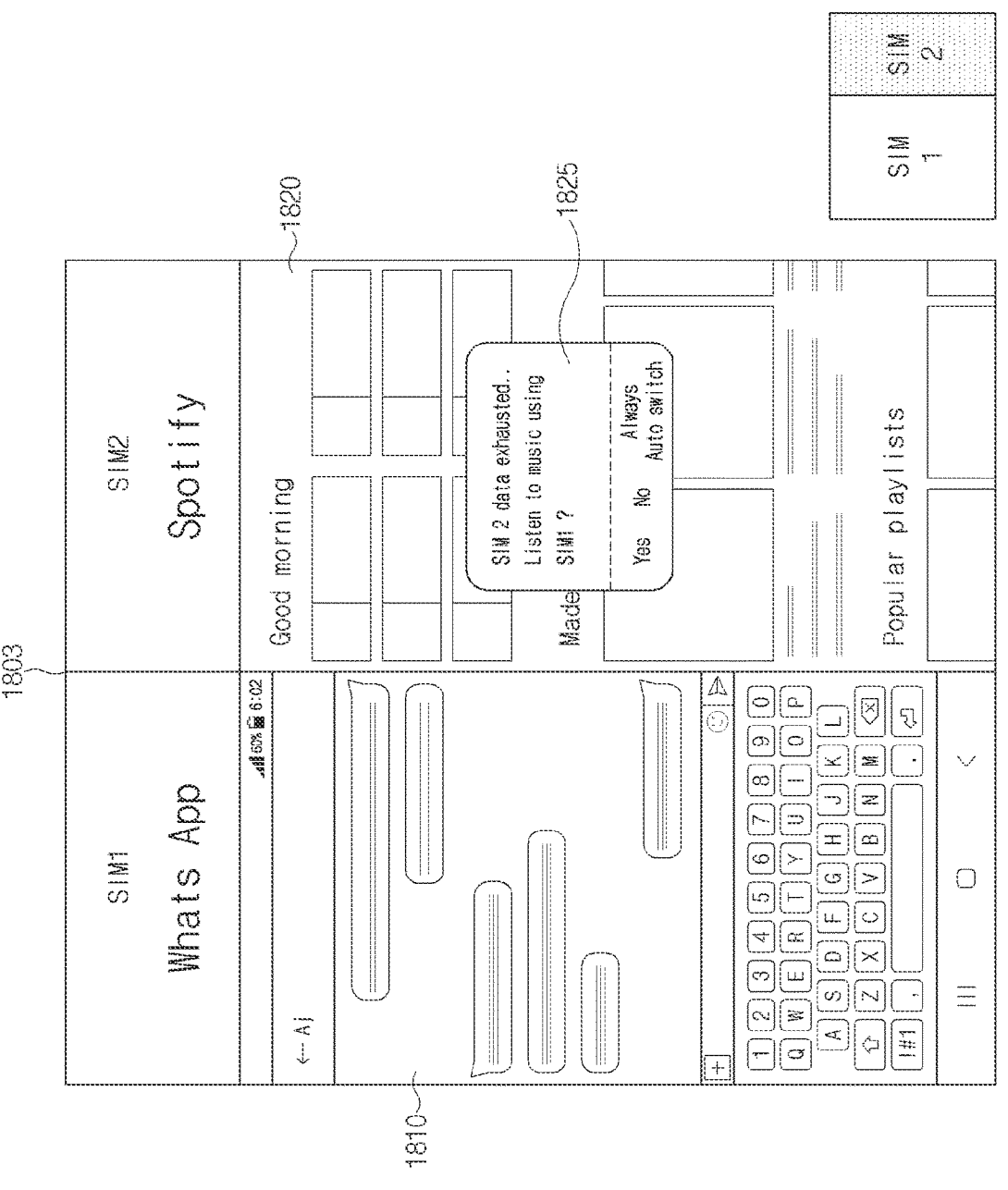
Figure 18C:
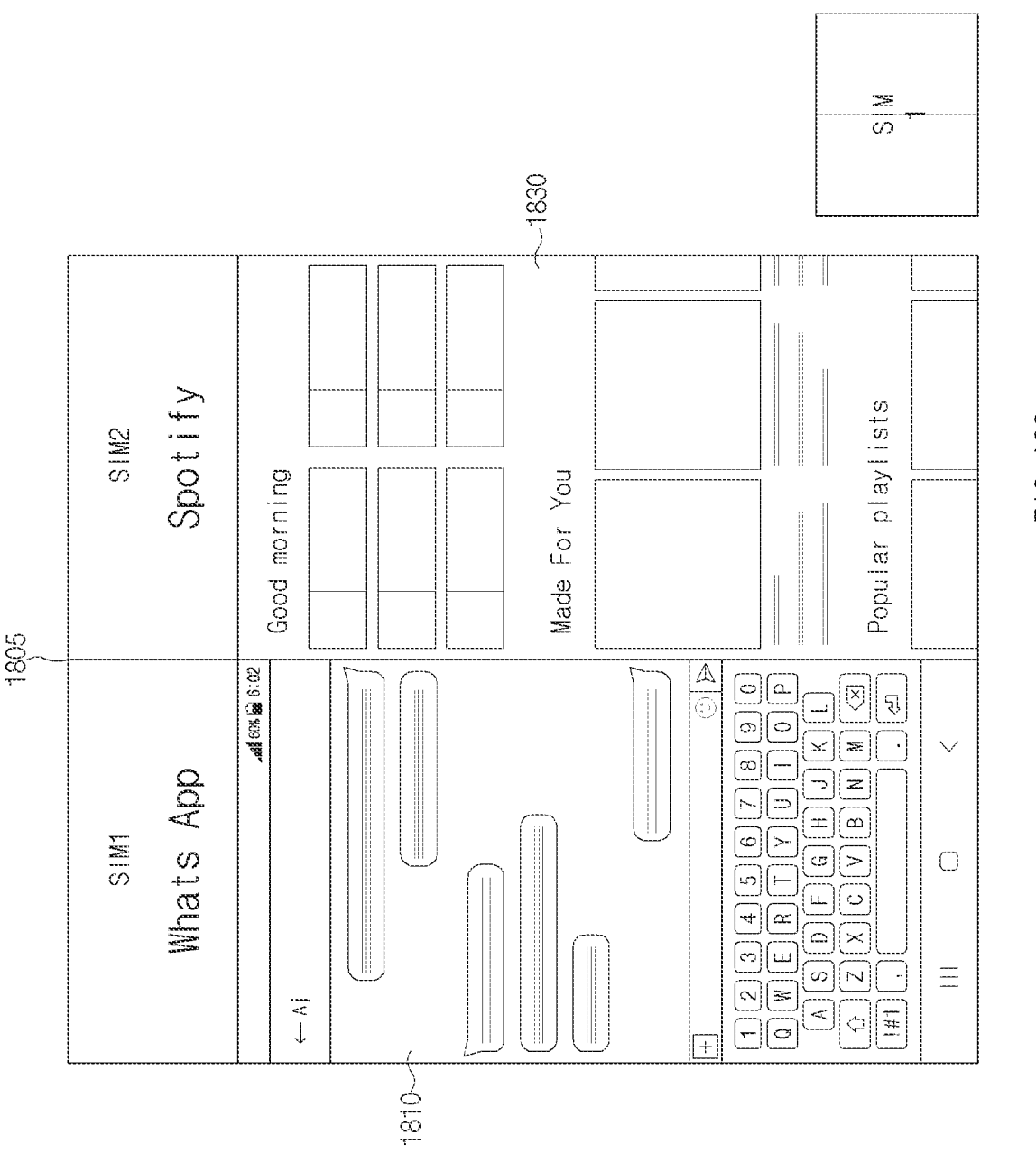

FIGS. 18A to 18C are diagrams for describing an operation of an electronic device, according to an embodiment. Hereinafter, descriptions identical to those of FIGS. 17A to 17C will be omitted or briefly described.

According to an embodiment, an electronic device (e.g., the electronic device 101 in FIG. 1 or the electronic device 200 in FIG. 2) may execute a first application in an area corresponding to the first SIM (e.g., the first SIM 221 in FIG.

2) of a flexible display (e.g., the display module 160 in FIG. 1 or the flexible display 210 in FIG. 2) based on the first SIM, and may execute a second application in the area corresponding to the second SIM of the flexible display based on the second SIM (e.g., the second SIM 223 in FIG. 2). For example, referring to FIG. 18A, the electronic device may display a screen 1801 including an execution screen 1810 of the first application and an execution screen 1820 of the second application on the flexible display.

According to an embodiment, when the electronic device fails to perform a function related to a specific application by using the corresponding SIM, the electronic device may determine whether a function related to a specific application is capable of being performed by using another SIM, and may provide a user interface for identifying whether to use another SIM. For example, referring to FIG. 18B, when the electronic device fails to perform a music streaming function of a second application by using a second SIM (e.g., the amount of data traffic according to a communication fee of the second SIM has completely been exhausted), the electronic device may provide a user interface 1825 for determining whether to perform a music streaming function of the second application based on the first SIM.

According to an embodiment, the electronic device may perform a function of an application based on a user input received through the user interface 1825. For example, referring to FIG. 18C, the electronic device may perform a music streaming function of the second application based on the first SIM.

According to various embodiments, the execution screen and application shown in FIGS. 18A to 18C are examples and are not limited thereto.

According to an example embodiment, an electronic device may include a first subscriber identity module (SIM), a second SIM, a flexible display, of which at least part is capable of being folded or unfolded and which includes an area corresponding to a first SIM and an area corresponding to a second SIM, a communication circuit, a memory, and a processor operatively connected, directly or indirectly, to the first SIM, the second SIM, the flexible display, the communication circuit, and the memory. The memory may store instructions that, when executed, cause the processor to receive a notification related to the first SIM from an outside through the communication circuit, to provide the notification related to the first SIM in a specified area based on a state of the flexible display when at least part of the area corresponding to the first SIM is folded in the flexible display, and to display an execution screen of an application corresponding to the notification related to the first SIM on the flexible display when the area corresponding to the first SIM is changed to be unfolded while the notification related to the first SIM is provided. Each processor herein comprises processing circuitry.

According to an embodiment, the specified area may be an area formed along a folded portion of the area corresponding to the first SIM in the flexible display.

According to an embodiment, the instructions may cause the processor to change a form of providing the notification when receiving a specified user input in the specified area within a specified time after the notification is provided.

According to an embodiment, the instructions may cause the processor to display a pop-up window indicating the notification in the area corresponding to the first SIM when the area corresponding to the first SIM is unfolded when the notification related to the first SIM is received.

According to an embodiment, the instructions may cause the processor to remove the notification from a flexible display when a specified time elapses after the notification is provided.

According to an embodiment, the instructions may cause the processor to display a home screen in the area, which is unfolded and which corresponds to the second SIM when at least part of the area corresponding to the second SIM changes from a folded state to an unfolded state while the execution screen of the application corresponding to the notification related to the first SIM is displayed.

According to an embodiment, the instructions may cause the processor to receive a notification related to the second SIM from an outside through the communication circuit while the execution screen of the application corresponding to the notification related to the first SIM is displayed, to provide a notification related to the second SIM in a specified area corresponding to the second SIM when at least part of an area corresponding to the second SIM is folded in the flexible display, and to display the execution screen of the application corresponding to the notification related to the first SIM in the area corresponding to the first SIM and to display an execution screen of an application corresponding to the notification related to the second SIM in the area corresponding to the second SIM when the area corresponding to the second SIM is changed to be in an unfolded state while the notification related to the second SIM is provided.

According to an embodiment, the instructions may cause the processor to provide a user interface configured to display the execution screen of the application corresponding to the notification related to the first SIM or the execution screen of the application corresponding to the notification related to the second SIM through a full screen of the flexible display in at least one of the area corresponding to the first SIM and the area corresponding to the second SIM.

According to an embodiment, the instructions may cause the processor to execute a first application in the area corresponding to the first SIM based on the first SIM and to execute a second application in the area corresponding to the second SIM based on the second SIM while the flexible display is fully unfolded, to determine whether the function related to the first application is capable of being performed by using the second SIM when failing to perform a function related to the first application by using the first SIM, to provide a user interface for determining whether to use the second SIM when being capable of performing the function related to the first application by using the second SIM, and to perform the function related to the first application by using the second SIM based on a user input received by using the user interface.

According to an embodiment, while the flexible display is fully unfolded, the flexible display may include the area corresponding to the first SIM, the area corresponding to the second SIM, and a common use area. The instructions may cause the processor to output information related to only the first SIM to the area corresponding to the first SIM, to output information related to only the second SIM to the area corresponding to the second SIM, and to output information related to both the first SIM and the second SIM to the common use area.

According to an embodiment, the instructions may cause the processor to provide a user interface for setting an area corresponding to each SIM included in the electronic device and to set the area corresponding to the first SIM and an area corresponding to a second SIM based on a user input received through the user interface.

According to an embodiment, the instructions may cause the processor to provide the user interface when a new SIM is added to the electronic device or at least one SIM is removed from the electronic device.

FIG. 19 is a flowchart of an operating method of an electronic device (e.g., the electronic device 101 in FIG. 1 or the electronic device 200 in FIG. 2), according to an embodiment. Hereinafter, in the description of FIGS. 19 to 23, it will be assumed that an operation is performed in a folded or unfolded state when the flexible display is a foldable display, but is not limited thereto. According to various embodiments, the same or similar operation is possible in an expanded state or contracted state of an area exposed to the outside of an electronic device having a slideable display or a rollable display.

According to an embodiment, in operation 1910, the electronic device may receive a notification related to a first SIM from the outside. For example, the notification may include various types of information including phone calls, messages, and SNS. According to an embodiment, the electronic device may include a plurality of SIMs (e.g., a first SIM and a second SIM). According to an embodiment, the flexible display may include an area, which is capable of being at least partially contracted or expanded and corresponds to the first SIM, and, which is capable of being at least partially contracted or expanded and corresponds to the second SIM. According to an embodiment, the flexible display may include the area corresponding to the first SIM, the area corresponding to the second SIM, and a common use area. For example, at least part of an area of the flexible display corresponding to the first SIM and an area of the flexible display corresponding to the second SIM may be expanded or contracted (e.g., folded or unfolded).

According to an embodiment, in operation 1920, when at least part of the area corresponding to the first SIM in the flexible display is in a folded state, the electronic device may provide a notification related to the first SIM to a specified area based on the state of the flexible display. According to an embodiment, the specified area may be an area formed along a folded portion of an area corresponding to the first SIM in the flexible display. For example, the specified area may be an area adjacent to the folded area corresponding to the first SIM while an area corresponding to the first SIM is folded. For example, the specified area may include at least part of an edge area of the flexible display in a state where an area corresponding to the first SIM is folded.

According to an embodiment, when the electronic device receives a specified user input (e.g., a touch input (e.g., swipe)) in the specified area within a specified time after the notification related to the first SIM is provided, the electronic device may change a provision form of the notification. For example, when the electronic device receives a specified user input in the specified area within a specified time, the electronic device may provide a notification in a form of a pop-up window.

According to an embodiment, when an area corresponding to the first SIM is unfolded when a notification related to the first SIM is received, the electronic device may output a pop-up window indicating the notification in the area corresponding to the first SIM.

According to an embodiment, when the specified time elapses after the notification is provided, the electronic device may remove the notification from the flexible display.

According to an embodiment, when the area corresponding to the first SIM is changed to be in an unfolded state while the notification related to the first SIM is provided, in operation 1930, the electronic device may display the execution screen of the application corresponding to the notification related to the first SIM on the flexible display. For example, when the area corresponding to the first SIM is changed to be in the unfolded state, the electronic device may display the execution screen of the application corresponding to the notification related to the first SIM in at least one unfolded area corresponding to the first SIM. For example, the electronic device may display the execution screen of the application corresponding to the notification related to the first SIM in at least part of the flexible display having a state where an area corresponding to the first SIM is unfolded. For example, when the flexible display includes an area corresponding to the first SIM, an area corresponding to the second SIM, and a common use area, the electronic device may display the execution screen of the application corresponding to the notification related to the first SIM in the area corresponding to the first SIM and the common use area.

Figure 20:
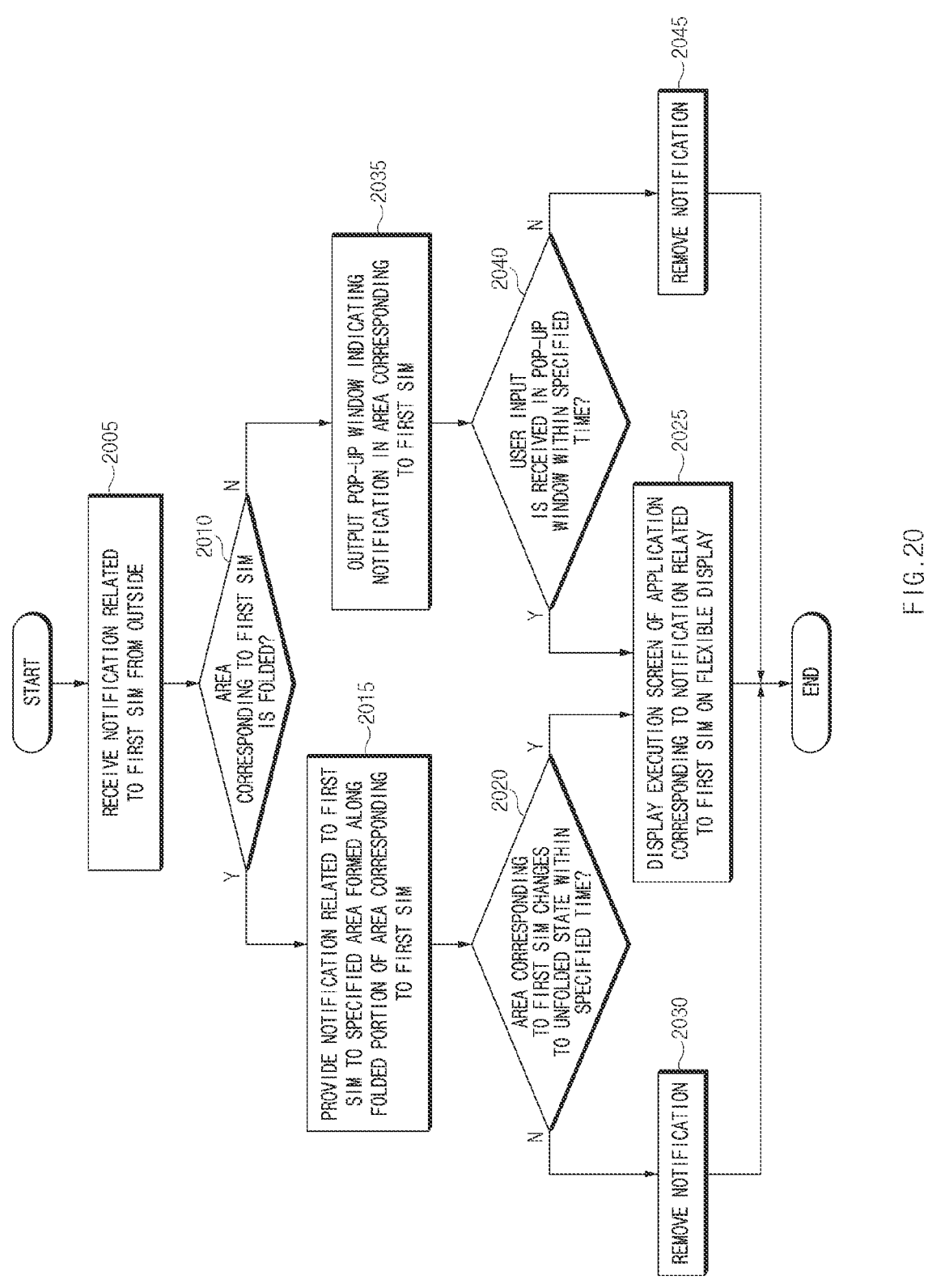
FIG. 20 is a flowchart of an operating method of an electronic device according to an example embodiment.

FIG. 20 is a flowchart of an operating method of an electronic device (e.g., the electronic device 101 in FIG. 1 or the electronic device 200 in FIG. 2), according to an embodiment. Hereinafter, descriptions identical to those of FIG. 19 will be omitted or briefly described.

According to an embodiment, in operation 2005, an electronic device may receive a notification related to a first SIM from the outside.

According to an embodiment, in operation 2010, the electronic device may determine whether an area corresponding to the first SIM is folded. According to an embodiment, when an area corresponding to the first SIM is folded, the electronic device may perform operation 2015. When the area corresponding to the first SIM is not contracted, the electronic device may perform operations 2035.

According to an embodiment, in operation 2015, the electronic device may provide a notification related to the first SIM to a specified area formed along the folded portion of the area corresponding to the first SIM. For example, the specified area may include at least part of an edge area of the flexible display adjacent to the folded area corresponding to the first SIM while the area corresponding to the first SIM is folded.

According to an embodiment, in operation 2020, the electronic device may determine whether the area corresponding to the first SIM changes to an unfolded state within a specified time. According to an embodiment, when the area corresponding to the first SIM changes to the unfolded state within the specified time, the electronic device may perform operation 2025. When the area corresponding to the first SIM does not change to the unfolded state within the specified time, the electronic device may perform operation 2030.

According to an embodiment, in operation 2025, the electronic device may display the execution screen of the application corresponding to a notification related to the first SIM on the flexible display. For example, when the area corresponding to the first SIM is changed to be in the unfolded state, the electronic device may display the execution screen of the application corresponding to the notification related to the first SIM in at least one unfolded area corresponding to the first SIM. For example, the electronic device may display the execution screen of the application corresponding to the notification related to the first SIM in at least part of the flexible display having a current state.

According to an embodiment, in operation 2030, the electronic device may remove the notification from the flexible display. For example, the electronic device may remove the notification related to the first SIM in the specified area.

According to an embodiment, in operation 2035, the electronic device may output a pop-up window indicating a notification in an area corresponding to the first SIM.

According to an embodiment, in operation 2040, the electronic device may determine whether a user input is received in the pop-up window within a specified time. According to an embodiment, when the user input is received in the pop-up window within the specified time, the electronic device may perform operation 2025. When no user input is received in the pop-up window within the specified time, the electronic device may perform operation 2045.

According to an embodiment, in operation 2045, the electronic device may remove the notification. For example, an electronic device may remove the pop-up window indicating a notification in an area corresponding to the first SIM.

Figure 21:
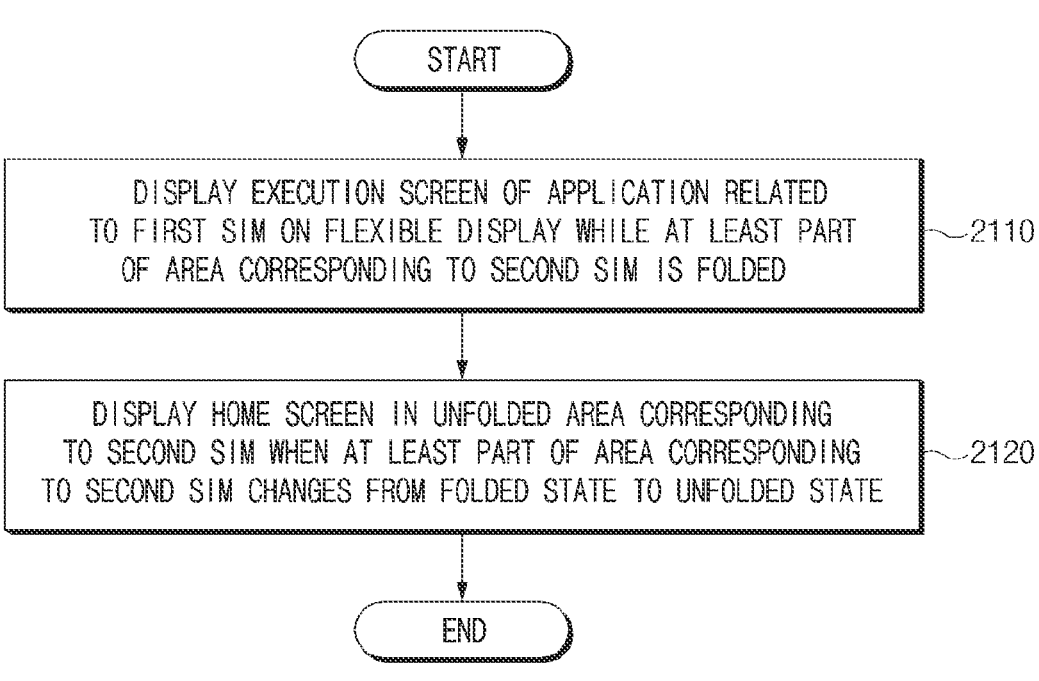
FIG. 21 is a flowchart of an operating method of an electronic device according to an example embodiment.

FIG. 21 is a flowchart of an operating method of an electronic device (e.g., the electronic device 101 in FIG. 1 or the electronic device 200 in FIG. 2), according to an embodiment. Hereinafter, descriptions identical to those of FIGS. 19 and 20 will be omitted or briefly described.

According to an embodiment, in operation 2110, an electronic device may display an execution screen of an application related to a first SIM on a flexible display while at least part of an area corresponding to a second SIM is folded. For example, while the area corresponding to the first SIM is expanded, and at least part of the area corresponding to the second SIM is folded, the electronic device may display the execution screen of the application related to the first SIM in an area other than a folded area corresponding to the second SIM. According to an embodiment, operation 2110 may correspond to operation 1930 of FIG. 19 or operation 2025 of FIG. 20.

According to an embodiment, when at least part of the area corresponding to the second SIM changes from the folded state to the unfolded state, in operation 2120, the electronic device may display a home screen in an unfolded area corresponding to the second SIM. For example, the home screen may be one of a home screen corresponding to the first SIM, a home screen corresponding to the second SIM, and a home screen common to the first SIM and the second SIM.

FIG. 22 is a flowchart of an operating method of an electronic device (e.g., the electronic device 101 in FIG. 1 or the electronic device 200 in FIG. 2), according to an embodiment. Hereinafter, descriptions identical to those of FIGS. 19 to 21 will be omitted or briefly described.

According to an embodiment, in operation 2210, an electronic device may display an execution screen of an application related to a first SIM on a flexible display while at least part of an area corresponding to a second SIM is folded. For example, while the area corresponding to the first SIM is expanded, and at least part of the area corresponding to the second SIM is folded, the electronic device may display the execution screen of the application related to the first SIM in an area other than a folded area corresponding to the second SIM. According to an embodiment, operation 2110 may correspond to operation 1930 of FIG. 19 or operation 2025 of FIG. 20.

According to an embodiment, in operation 2220, an electronic device may receive a notification related to a second SIM from the outside.

According to an embodiment, in operation 2230, the electronic device may provide a notification related to the second SIM to a specified area based on the state of the flexible display. According to an embodiment, the specified area may be an area formed along a folded portion of an area corresponding to the second SIM in the flexible display. For example, the specified area may be an area adjacent to the folded area corresponding to the second SIM while an area corresponding to the second SIM is folded. For example, the specified area may include at least part of an edge area of the flexible display in a state where an area corresponding to the second SIM is folded.

According to an embodiment, when the area corresponding to the second SIM is changed to be in an unfolded state while the electronic device is providing the notification related to the second SIM, in operation 2240, the electronic device may display the execution screen of the application corresponding to the notification related to the first SIM in the area corresponding to the first SIM and then may display an execution screen of an application corresponding to a notification related to the second SIM in an area corresponding to the second SIM. According to an embodiment, the area corresponding to the first SIM and the area corresponding to the second SIM may be set by a user input. For example, the electronic device may simultaneously display an execution screen of an application corresponding to a notification related to each of the SIMs in the set area corresponding to the first SIM and the set area corresponding to the second SIM. According to an embodiment, the electronic device may provide, on the flexible display (e.g., the area corresponding to the first SIM and/or the area corresponding to the second SIM), a user interface for displaying an execution screen of an application corresponding to a notification related to the first SIM or an execution screen of an application corresponding to a notification related to the second SIM to a full screen of the flexible display. For example, the electronic device may provide a user interface for at least temporarily displaying the execution screen of the application related to the one SIM on the full screen. According to an embodiment, while the electronic device is displaying the execution screen of an application related to the one SIM on the full screen, the electronic device may provide a user interface for displaying an execution screen of an application related to each of the plurality of SIMs together.

FIG. 23 is a flowchart of an operating method of an electronic device (e.g., the electronic device 101 in FIG. 1 or the electronic device 200 in FIG. 2), according to an embodiment. Hereinafter, descriptions identical to those of FIGS. 19 to 22 will be omitted or briefly described.

According to an embodiment, while the flexible display is fully unfolded, in operation 2310, the electronic device may execute a first application in an area corresponding to the first SIM based on the first SIM and may execute a second application in an area corresponding to the second SIM based on the second SIM. For example, the electronic device may display an execution screen of the first application in an area corresponding to the first SIM and may display the execution screen of the second application in an area corresponding to the second SIM.

According to an embodiment, when the electronic device fails to perform a function related to the first application by using the first SIM, in operation 2320, the electronic device may determine whether a function related to the first application is capable of being performed by using the second SIM. For example, each of the first SIM and the second SIM may correspond to a different telecommunications service provider, a different communication fee, and/or a different communication method, or may have a difference in an available data communication amount. For example, to perform a specific function of the application, it may be necessary that the SIM supports the corresponding setting (e.g., a telecommunications service provider or a communication method), or resources (e.g., a communication data capacity, a talk time, or the number of messages) allocated to the SIM are sufficient. For example, when the amount of available communication data is insufficient in the first SIM, the electronic device may determine whether an available communication data amount is sufficient, through the second SIM. For example, when a specific communication method is not available in the first SIM, the electronic device may determine whether the specific communication method is capable of being used in the second SIM. For example, when the first SIM has used all available resources (e.g., a communication data capacity, a talk time, or the number of messages) according to a specified communication rate, the electronic device may determine whether the second SIM is capable of using a corresponding resource.

According to an embodiment, when the electronic device is capable of performing a function related to the first application by using the second SIM, in operation 2330, the electronic device may provide a user interface for determining whether to use the second SIM. According to an embodiment, the user interface may include Information indicating that a function related to the first application is incapable of being performed by using the first SIM, and items for selecting whether to perform the function related to the first application by using the second SIM. According to an embodiment, the user interface may include an item for selecting whether to use the corresponding method when there is a method (e.g., paying an extra charge for the first SIM) of using the first SIM.

According to an embodiment, in operation 2340, the electronic device may perform a function related to the first application by using the second SIM based on a user input received by using the user interface. For example, when receiving a user input for allowing the use of the second SIM through the user interface, the electronic device may perform a function related to the first application by using the second SIM. For example, when receiving a user input for not allowing the use of the second SIM through the user interface, the electronic device may not perform the function related to the first application. For example, when receiving a user input for not allowing the use of the second SIM through the user interface, the electronic device may output an indication indicating that a function related to the first application is incapable of being performed.

According to an embodiment, when the electronic device is capable of performing a function related to the first application by using the second SIM without providing a user interface in operation 2330 and operation 2340, the electronic device may automatically perform a function related to the first application by using the second SIM.

According to an embodiment, when the electronic device fails to perform a specific function (e.g., a function of a specific application) based on a specific SIM among a plurality of SIMs, the electronic device may perform the specific function by using another SIM, thereby efficiently and smoothly providing functions desired by a user in a multi-SIM environment.

Figure 24:
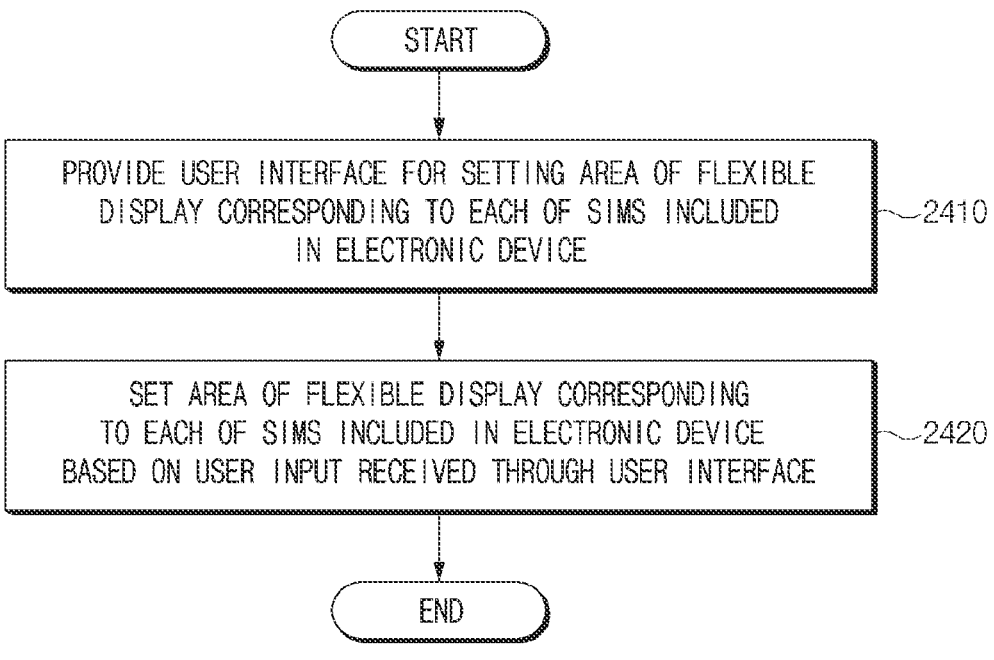
FIG. 24 is a flowchart of an operating method of an electronic device, according to an example embodiment.

FIG. 24 is a flowchart of an operating method of an electronic device (e.g., the electronic device 101 in FIG. 1 or the electronic device 200 in FIG. 2), according to an embodiment. Hereinafter, descriptions identical to those of FIGS. 19 to 23 will be omitted or briefly described.

According to an embodiment, in operation 2410, an electronic device may provide a user interface for setting an area of a flexible display corresponding to each of SIMs included in the electronic device. According to an embodiment, the user interface may include information (e.g., information of an area capable of being expanded or contracted) of the flexible display, information of the corresponding area for each of the currently set SIMs, information of each of the SIMs included in the electronic device, and/or a UI item for setting the corresponding area for each of the SIMs.

According to an embodiment, in operation 2420, the electronic device may set an area of the flexible display corresponding to each of the SIMs included in the electronic device based on a user input received through the user interface. For example, the electronic device may set the flexible display 210 to be divided into areas respectively corresponding to at least part of the plurality of SIMs included in the electronic device based on a user input. For example, when the electronic device includes a first SIM and a second SIM, on the basis of a user input, the electronic device may set the whole flexible display to an area corresponding to the first SIM, may set the whole flexible display as an area corresponding to the second SIM, or may set the flexible display to include an area corresponding to the first SIM and an area corresponding to the second SIM.

According to an example embodiment, an operating method of an electronic device including a flexible display, of which at least part is capable of being folded or unfolded and which includes an area corresponding to a first SIM and an area corresponding to a second SIM may include receiving a notification related to the first SIM from an outside, providing a notification related to the first SIM in a specified area based on a state of the flexible display when at least part of the area corresponding to the first SIM is folded in the flexible display, and displaying an execution screen of an application corresponding to the notification related to the first SIM on the flexible display when the area corresponding to the first SIM is changed to be unfolded while the notification related to the first SIM is provided.

According to an embodiment, the method may further include removing the notification from a flexible display when a specified time elapses after the notification is provided.

According to an embodiment, the method may further include displaying a home screen in the area, which is unfolded and which corresponds to the second SIM when at least part of the area corresponding to the second SIM changes from a folded state to an unfolded state while the execution screen of the application corresponding to the notification related to the first SIM is displayed.

According to an embodiment, the method may further include receiving a notification related to the second SIM from an outside through the communication circuit while the execution screen of the application corresponding to the notification related to the first SIM is displayed, providing the notification related to the second SIM in a specified area corresponding to the second SIM when at least part of an area corresponding to the second SIM is folded in the flexible display, and displaying the execution screen of the application corresponding to the notification related to the first SIM in the area corresponding to the first SIM and displaying an execution screen of an application corresponding to the notification related to the second SIM in the area corresponding to the second SIM when the area corresponding to the second SIM is changed to be in an unfolded state while the notification related to the second SIM is provided.

According to an embodiment, the method may further include providing a user interface configured to display the execution screen of the application corresponding to the notification related to the first SIM or the execution screen of the application corresponding to the notification related to the second SIM through a full screen of the flexible display in at least one of the area corresponding to the first SIM and the area corresponding to the second SIM.

According to an embodiment, the method may further include executing a first application in the area corresponding to the first SIM based on the first SIM and executing a second application in the area corresponding to the second SIM based on the second SIM while the flexible display is fully unfolded, determining whether the function related to the first application is capable of being performed by using the second SIM when failing to perform a function related to the first application by using the first SIM, providing a user interface for determining whether to use the second SIM when being capable of performing the function related to the first application by using the second SIM, and performing the function related to the first application by using the second SIM based on a user input received by using the user interface.

According to an embodiment, while the flexible display is fully unfolded, the flexible display may include the area corresponding to the first SIM, the area corresponding to the second SIM, and a common use area. The method may further include outputting information related to only the first SIM to the area corresponding to the first SIM, outputting information related to only the second SIM to the area corresponding to the second SIM, and outputting information related to both the first SIM and the second SIM to the common use area.

According to an embodiment, the method may further include providing a user interface for setting an area corresponding to each SIM included in the electronic device and setting the area corresponding to the first SIM and an area corresponding to a second SIM based on a user input received through the user interface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a first subscriber identity module (SIM);
a second SIM;
a flexible display including a first SIM area configured to display a screen corresponding to the first SIM, a second SIM area configured to display a screen corresponding to the second SIM, and a common use area configured to display a screen corresponding to the first SIM and/or the second SIM, wherein the first SIM area and the second SIM area are capable of being at least partially folded and/or unfolded;
a communication circuit;
at least one processor including processing circuitry and operatively connected to the first SIM, the second SIM, the flexible display, and the communication circuit; and
a memory storing instructions which, when executed individually and/or collectively by the at least one processor, controls the electronic device to:
receive a notification message related to the first SIM from an external device through at least the communication circuit;
display to a user the notification message related to the first SIM in a specified area related to the first SIM based on a state of the flexible display where at least part of the first SIM area is folded in the flexible display, wherein the specified area is an area formed along a folded portion of the flexible display; and
display an execution screen of an application corresponding to the notification related to the first SIM on the first SIM area and the common use area of the flexible display in response to the first SIM area being changed from folded to unfolded while the notification message related to the first SIM is provided,
wherein the first SIM and the second SIM are simultaneously active in the electronic device.

2. The electronic device of claim 1, wherein the memory stores instructions which, when executed individually and/or collectively by the at least one processor, controls the electronic device to:
change a form of providing the notification message, based on receiving, within a specified time after providing the notification and without a change in a form of the flexible display, a specified user input in the specified area related to the first SIM.

3. The electronic device of claim 1, wherein the memory stores instructions which, when executed individually and/or collectively by the at least one processor, controls the electronic device to:

control to display a pop-up window indicating the notification message in the first SIM area, based on the first SIM area being unfolded when the notification message related to the first SIM is received.

4. The electronic device of claim 1, wherein the memory stores instructions which, when executed individually and/or collectively by the at least one processor, controls the electronic device to:
remove the notification message from the flexible display, based on a specified time having elapsed after the notification message is provided.

5. The electronic device of claim 1, wherein the memory stores instructions which, when executed individually and/or collectively by the at least one processor, controls the electronic device to:
control to display a home screen in the second SIM area, based on at least part of the second SIM area changing from a folded state to an unfolded state while the execution screen of the application corresponding to the notification message related to the first SIM is displayed on the first SIM area and the common use area.

6. The electronic device of claim 1, wherein the memory stores instructions which, when executed individually and/or collectively by the at least one processor, controls the electronic device to:
while the execution screen of the application corresponding to the notification message related to the first SIM is displayed, receive a notification message related to the second SIM from an external device through the communication circuit;
when at least part of the second SIM area is folded in the flexible display, provide the notification message related to the second SIM in a specified area related to the second SIM; and
in response to the second SIM area being changed from folded to unfolded while the notification message related to the second SIM is provided, display the execution screen of the application corresponding to the notification message related to the first SIM in the first SIM area and a first portion of the common use area, and display the execution screen of an application corresponding to the notification message related to the second SIM in the second SIM area and a second portion of the common use area.

7. The electronic device of claim 6, wherein the memory stores instructions which, when executed individually and/or collectively by the at least one processor, controls the electronic device to:
provide a user interface configured to display the execution screen of the application corresponding to the notification message related to the first SIM and/or the execution screen of the application corresponding to the notification message related to the second SIM through a full screen of the flexible display in at least a portion of the flexible display.

8. The electronic device of claim 1, wherein the memory stores instructions which, when executed individually and/or collectively by the at least one processor, controls the electronic device to:
while the flexible display is fully unfolded, execute a first application in at least the first SIM area based on the first SIM and execute a second application in at least the second SIM area based on the second SIM;
when failing to perform a function related to the first application by using the first SIM, determine whether the function related to the first application is capable of being performed by using the second SIM;

when being capable of performing the function related to the first application by using the second SIM, provide a user interface for determining whether to use the second SIM; and perform the function related to the first application by using the second SIM based on a user input received by using the user interface.

9. The electronic device of claim 1, wherein the memory stores instructions which, when executed individually and/or collectively by the at least one processor, controls the electronic device to:

control to output information related to only the first SIM to the first SIM area, output information related to only the second SIM to the second SIM area, and output information related to both the first SIM and the second SIM to the common use area.

10. The electronic device of claim 1, wherein the memory stores instructions which, when executed individually and/or collectively by the at least one processor, controls the electronic device to:

provide a user interface for setting an area corresponding to each SIM included in the electronic device; and set at least one of the first SIM area, the second SIM area, or the common use area based on a user input received through the user interface.

11. The electronic device of claim 10, wherein the memory stores instructions which, when executed individually and/or collectively by the at least one processor, controls the electronic device to:

when a new SIM is added to the electronic device or at least one SIM is removed from the electronic device, provide the user interface.

12. An operating method of an electronic device including a flexible display, of which at least part is capable of being folded and/or unfolded and which includes a first SIM area configured to display a screen corresponding to a first SIM, a second SIM area configured to display a screen corresponding to a second SIM, and a common use area configured to display a screen corresponding to the first SIM and/or the second SIM, the method comprising:

receiving a notification message related to the first SIM from an external device;

when at least part of the first SIM area is folded in the flexible display, providing the notification message related to the first SIM in a specified area related to the first SIM based on a state of the flexible display, wherein the specified area is an area formed along a folded portion of the flexible display; and in response to the first SIM area being changed from folded to unfolded while the notification message related to the first SIM is provided, displaying an execution screen of an application corresponding to the notification related to the first SIM on the first SIM area and the common use area of the flexible display, wherein the first SIM and the second SIM are simultaneously active in the electronic device.

13. The method of claim 12, further comprising:

when a specified time elapses after the notification message is provided, removing the notification message from the flexible display.

14. The method of claim 12, further comprising:

when at least part of the second SIM area changes from a folded state to an unfolded state while the execution screen of the application corresponding to the notification message related to the first SIM is displayed on the first SIM area and the common use area, displaying a home screen in the second SIM area, which is unfolded and which corresponds to the second SIM.

15. The method of claim 12, further comprising:

while the execution screen of the application corresponding to the notification message related to the first SIM is displayed, receiving a notification message related to the second SIM from an external device;

when at least part of the second SIM area is folded in the flexible display, providing the notification related to the second SIM in a specified area related to the second SIM; and in response to the second SIM area being changed from folded to unfolded while the notification message related to the second SIM is provided, displaying the execution screen of the application corresponding to the notification related to the first SIM in the first SIM area and a first portion of the common use area and displaying the execution screen of an application corresponding to the notification message related to the second SIM in the second SIM area and a second portion of the common use area.

16. The method of claim 15, further comprising:

providing a user interface configured to display the execution screen of the application corresponding to the notification message related to the first SIM and/or the execution screen of the application corresponding to the notification message related to the second SIM through a full screen of the flexible display in at least a portion of the flexible display.

17. The method of claim 12, further comprising:

while the flexible display is fully unfolded, executing a first application in at least the first SIM area based on the first SIM and executing a second application in at least the second SIM area based on the second SIM;

when failing to perform a function related to the first application at least by using the first SIM, determining whether the function related to the first application is capable of being performed at least by using the second SIM;

when being capable of performing the function related to the first application at least by using the second SIM, providing a user interface for determining whether to use the second SIM; and performing the function related to the first application at least by using the second SIM based on a user input received at least by using the user interface.

18. The method of claim 12, further comprising:

outputting information related to only the first SIM to the first SIM area, outputting information related to only the second SIM to the second SIM area, and outputting information related to both the first SIM and the second SIM to the common use area.

19. The method of claim 12, further comprising:

providing a user interface for setting an area corresponding to each SIM included in the electronic device; and setting at least one of the first SIM area, the second SIM area, or the common use area based on a user input received through the user interface.

* * * * *